(12) United States Patent
Jikomes et al.

(10) Patent No.: US 11,995,704 B2
(45) Date of Patent: *May 28, 2024

(54) METHOD AND COMPUTER-READABLE MEDIUM FOR SELECTION OF CANNABIS-RELATED PRODUCTS AND VISUALIZATION OF CHEMICAL DATA

(71) Applicant: Leafly Holdings, Inc., Seattle, WA (US)

(72) Inventors: Nickolas Jikomes, Seattle, WA (US); Marc Brandon Hensley, Seattle, WA (US); Andrew MacRae, Seattle, WA (US); Matthew Bollen, Seattle, WA (US); Stephanie Smith, Seattle, WA (US); Camille Lim, Seattle, WA (US); Michael Wityk, Seattle, WA (US); Adam Hilborn, New York, NY (US); Sam Starr, Sao Paulo (BR); Santiago Seira, San Francisco, CA (US); Rachael Crocker Duranti, Seattle, WA (US); Christiana Smith, Seattle, WA (US); George Paul Ammatuna, III, Seattle, WA (US); Zack Seuberling, Seattle, WA (US); Renata Leao Duarte, Seattle, WA (US)

(73) Assignee: Leafly Holdings, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/196,993

(22) Filed: May 12, 2023

(65) Prior Publication Data

US 2023/0281694 A1  Sep. 7, 2023

Related U.S. Application Data

(63) Continuation of application No. 17/749,104, filed on May 19, 2022, now Pat. No. 11,687,994, which is a
(Continued)

(51) Int. Cl.
*G06Q 30/00* (2023.01)
*G06F 3/0482* (2013.01)
(Continued)

(52) U.S. Cl.
CPC ....... *G06Q 30/0631* (2013.01); *G06F 3/0482* (2013.01); *G06F 3/04847* (2013.01); *G06Q 30/0607* (2013.01)

(58) Field of Classification Search
None
See application file for complete search history.

(56) References Cited

U.S. PATENT DOCUMENTS 7,308,423 B1  12/2007  Woodward et al.
7,668,761 B2  2/2010   Jenkins et al.
(Continued)

FOREIGN PATENT DOCUMENTS

WO  2017205853 A1  11/2017
WO  2020132370 A1  6/2020

OTHER PUBLICATIONS

Hacienda, Terry, This New App Will Change the Way you Buy Cannabis, 2018, Map 9, The Fresh Toast, pp. 1-3. (Year: 2018).*
(Continued)

*Primary Examiner* — Jeffrey A. Smith
*Assistant Examiner* — Brittany E Bargeon
(74) *Attorney, Agent, or Firm* — Perkins Coie LLP

(57) ABSTRACT

A system for categorizing, visualizing, and recommending cannabis products based on objective data of the chemical composition of products is described. This system allows
(Continued)

cannabis products to be visualized and compared based on their chemical composition, even by laypeople with little or no knowledge of the underlying objective data. A recommendation system is built upon this which can recommend products for consumption, including a user interface for receiving user input, which includes at least one of demographic data, desired level of psychoactivity, or prior experience with the product, a merchant interface for receiving merchant input, including at least one of general data descriptive of the regulated product, lab data descriptive of the regulated products chemical composition, and user data descriptive of subjective effects of the regulated product on a user; and a decision engine making a recommendation of product according to correlation of the lab data with the user data.

18 Claims, 45 Drawing Sheets
(41 of 45 Drawing Sheet(s) Filed in Color)

Related U.S. Application Data continuation of application No. 16/721,905, filed on Dec. 19, 2019, now Pat. No. 11,341,559, which is a continuation-in-part of application No. 16/228,197, filed on Dec. 20, 2018, now Pat. No. 11,205,210.

(60) Provisional application No. 62/898,499, filed on Sep. 10, 2019, provisional application No. 62/866,551, filed on Jun. 25, 2019.

(51) Int. Cl.
*G06F 3/04847* (2022.01)
*G06Q 30/0601* (2023.01)

(56) References Cited

U.S. PATENT DOCUMENTS

| | | | |
|---|---|---|---|
| 7,801,772 B2 | 9/2010 | Woodward et al. | |
| 8,010,411 B2 | 8/2011 | Woodward et al. | |
| 8,880,428 B2 | 11/2014 | Woodward et al. | |
| 9,519,934 B2 | 12/2016 | Calman et al. | |
| 9,916,560 B2 | 3/2018 | Vasantham et al. | |
| 10,319,475 B1 | 6/2019 | Croan et al. | |
| 11,205,210 B2 | 12/2021 | Jikomes et al. | |
| 11,341,559 B2 | 5/2022 | Jikomes et al. | |
| 11,367,519 B1 | 6/2022 | Heldman et al. | |
| 2002/0188527 A1 | 12/2002 | Dillard et al. | |
| 2007/0226120 A1 | 9/2007 | Nanjundamoorthy | |
| 2014/0189804 A1 | 7/2014 | Lehmann et al. | |
| 2014/0279221 A1 | 9/2014 | Woodward et al. | |
| 2015/0242420 A1 | 8/2015 | Glover et al. | |
| 2016/0207679 A1 | 7/2016 | Jackson | |
| 2016/0271252 A1 | 9/2016 | Vangara et al. | |
| 2016/0300289 A1 | 10/2016 | Rose | |
| 2017/0067748 A1 | 3/2017 | Glover et al. | |
| 2017/0199168 A1 | 7/2017 | Jackson et al. | |
| 2018/0144390 A1* | 5/2018 | Beckford | G06Q 30/0282 |
| 2018/0158125 A1* | 6/2018 | Perelman | G16H 70/40 |
| 2018/0284145 A1* | 10/2018 | Giese | G01N 33/948 |
| 2018/0357701 A1 | 12/2018 | Vu et al. | |
| 2020/0219167 A1 | 7/2020 | Jikomes et al. | |
| 2022/0148067 A1 | 5/2022 | Jikomes et al. | |
| 2022/0391962 A1 | 12/2022 | Jikomes et al. | |

OTHER PUBLICATIONS

Cannabinder: Trust Your Cannabis [Online], What do the colors on the Cannastamp mean? [retrieved on Jun. 24, 2019]. Retrieved from the Internet: <URL: https://www.cannabinder.com/>, 5 pages.
Hacienda, Terry. "This New App Will Change the Way you Buy Cannabis," May 9, 2018, The Fresh Toast, pp. 1-3. (Year: 2018).
International Searching Authority: United States of America, International Search Report and Written Opinion, PCT Application No. PCT/US2019/067683; Applicant: Leafly Holdings, Inc., dated Apr. 16, 2020, 21 pages.
Rahn, Indica vs. Sative: "What's the difference between cannabis types?" Leafly, Sep. 20, 2018 [retrieved on Feb. 5, 2020]. Retrieved from the internet: <https://www.leafly.com/news/cannabis-101/sativa-indica-and-hybrid-differences-between-cannabis-types> 17p.
Sexton M, Cuttler C, Finnell JS, Mischley LK, "A cross-sectional survey of medical cannabis users: patterns of use and perceived efficacy," 2016, Cannabis and Cannabinoid Research 1:1, DOI:10.1089/can.2016.0007, pp. 131-138. (Year: 2016).
Washington State Liquor and Cannabis Board, Approved Shapes for Marijuana Infused Edibles, Published: Apr. 23, 2019, 1 page.
European Patent Office, Extended European Search Report, EP Patent Application 19899380.0, dated Jul. 29, 2022, 8 pages.

* cited by examiner

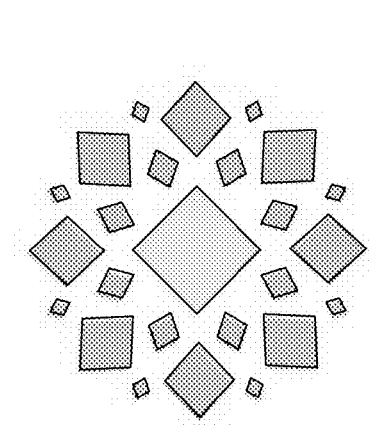
Low THC
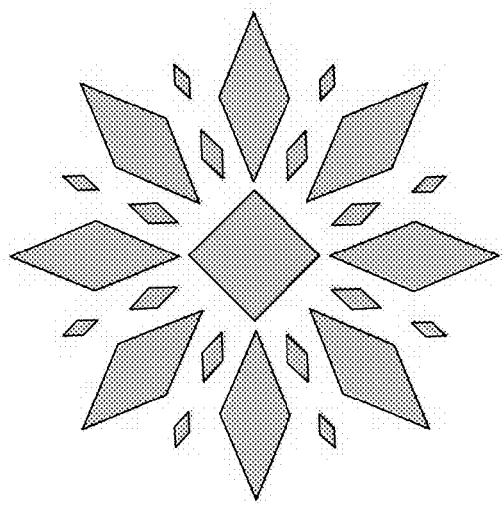
High THC
FIG. 9
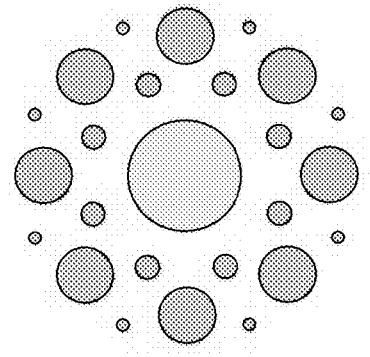
Low CBD
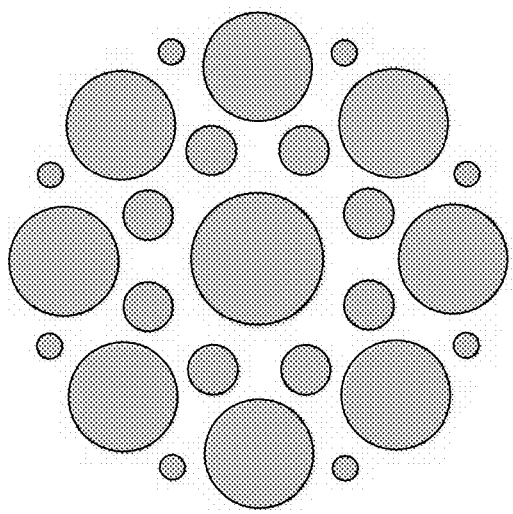
High CBD
FIG. 10

Tertiary

Secondary

Primary

*FIG. 25*

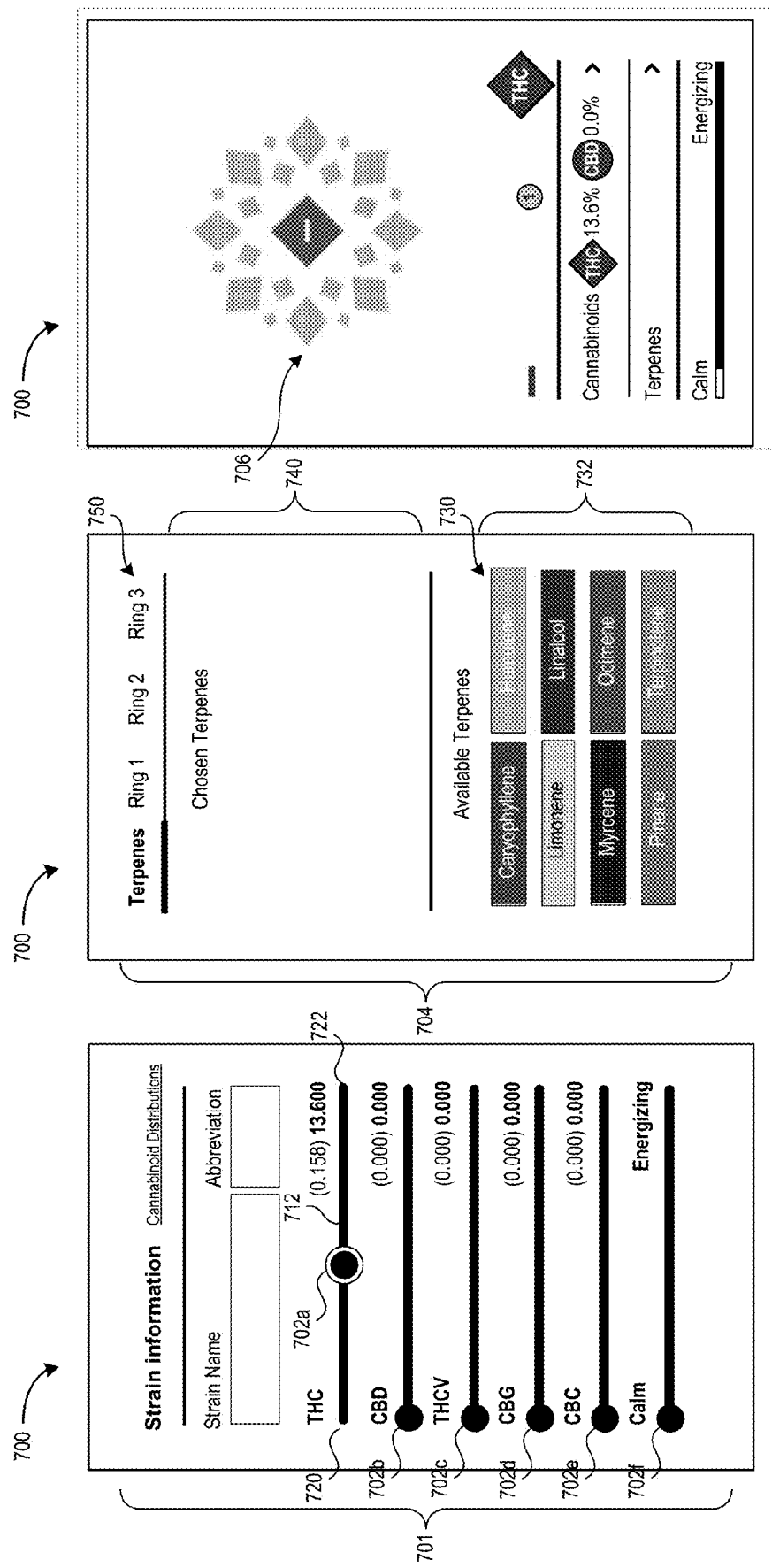

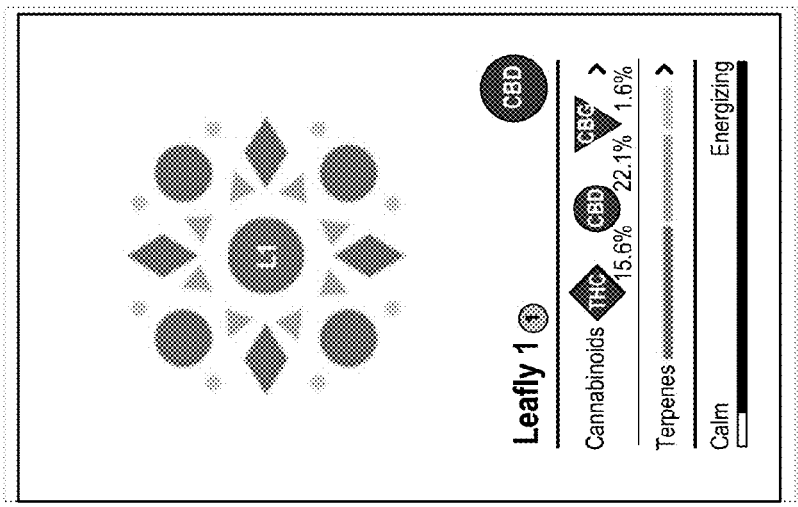
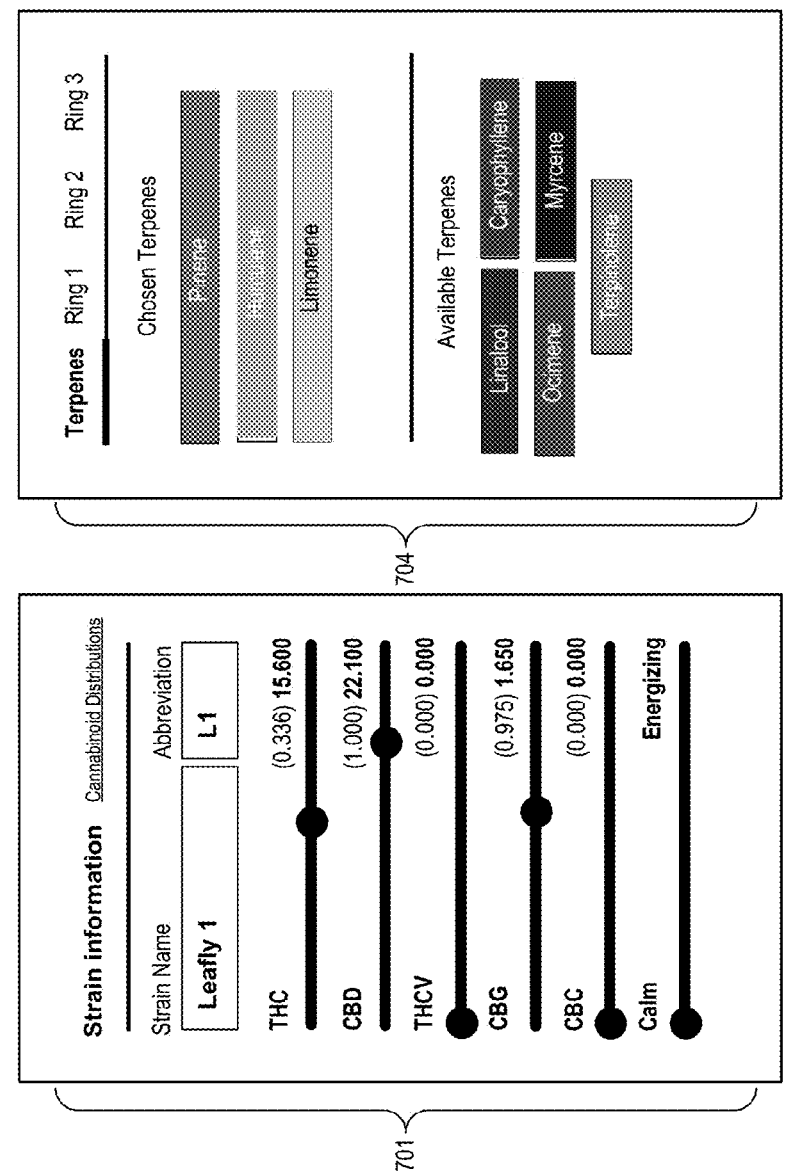
FIG. 37A
FIG. 37B
FIG. 37C

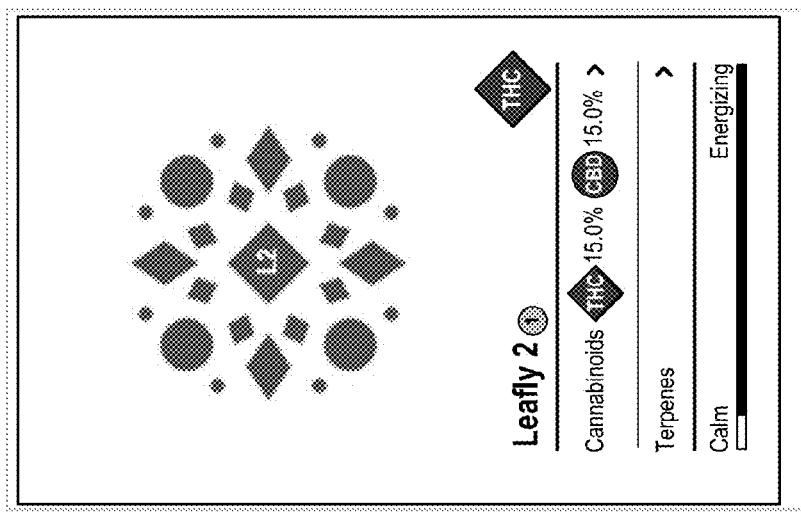
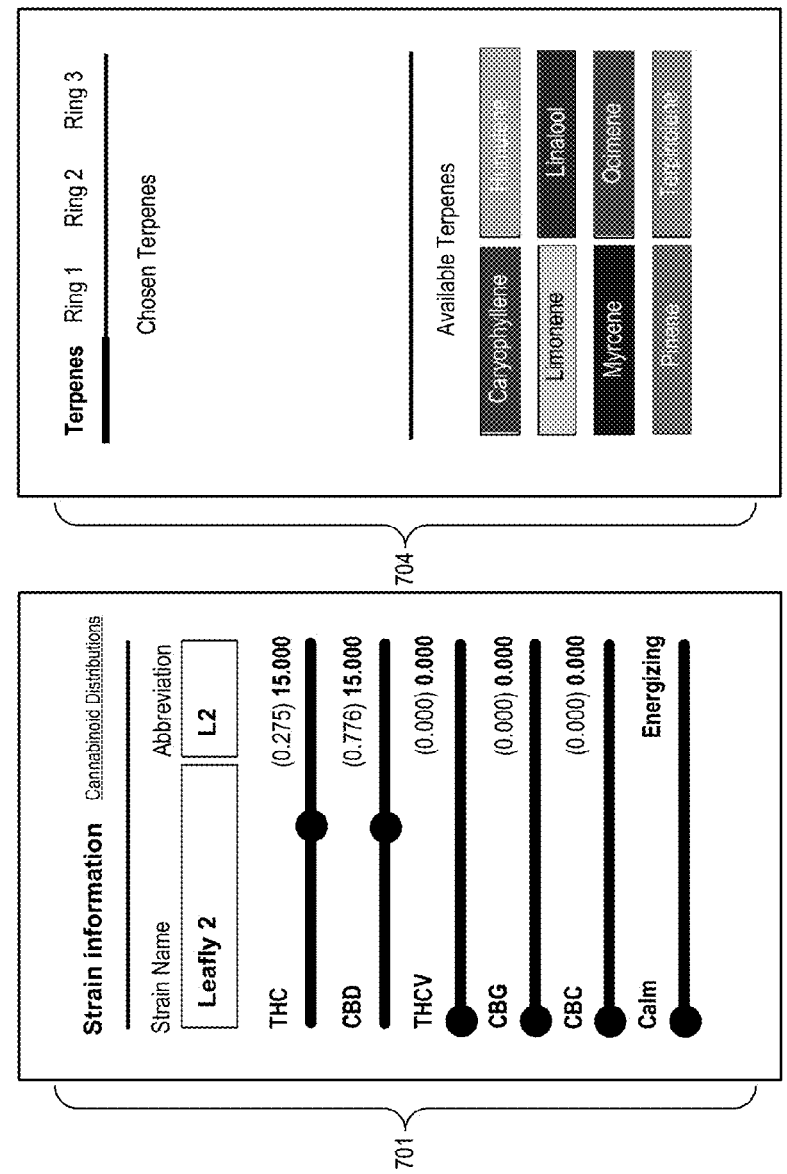
FIG. 38C
FIG. 38B
FIG. 38A

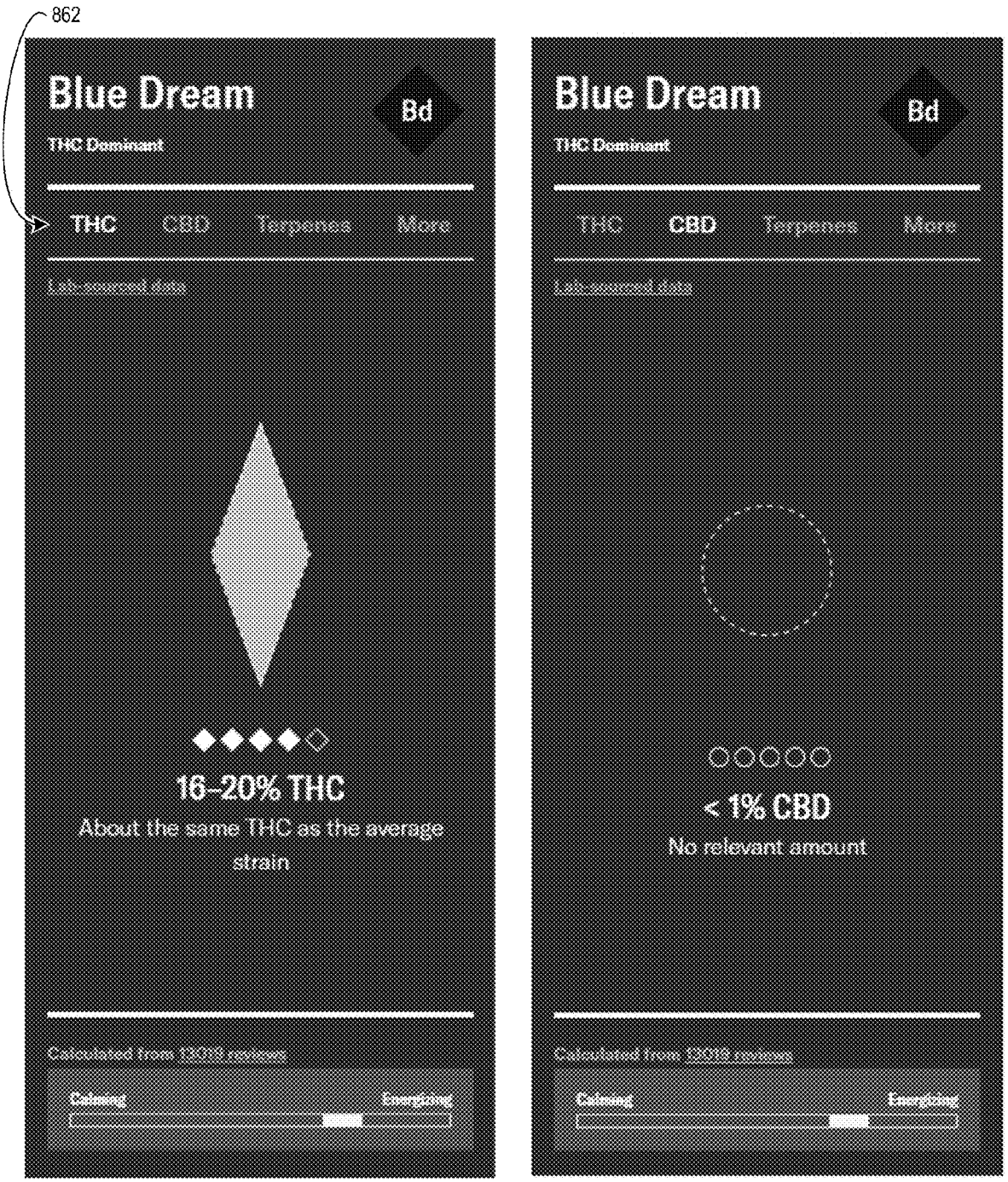
*FIG. 42A*          *FIG. 42B*

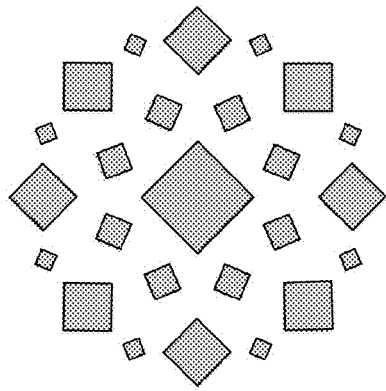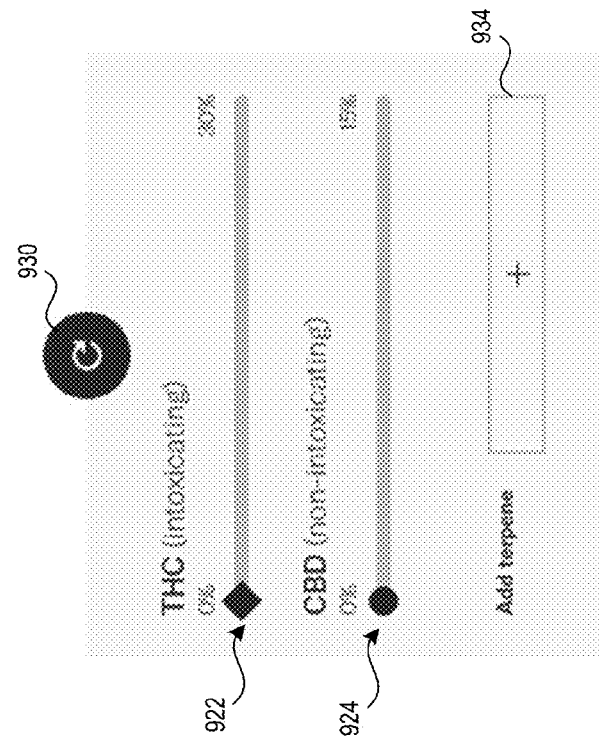
*FIG. 45B*
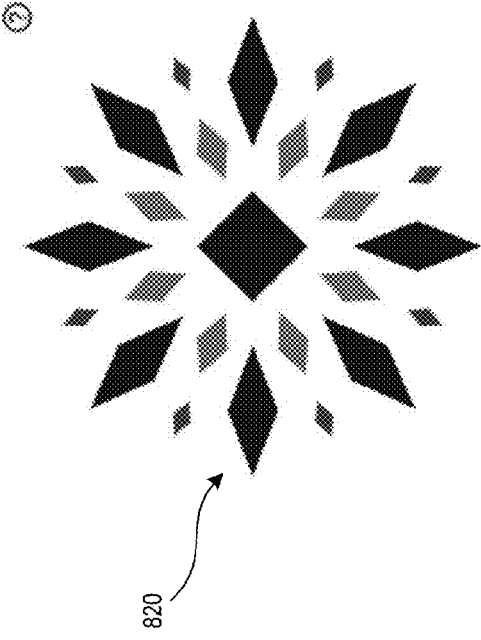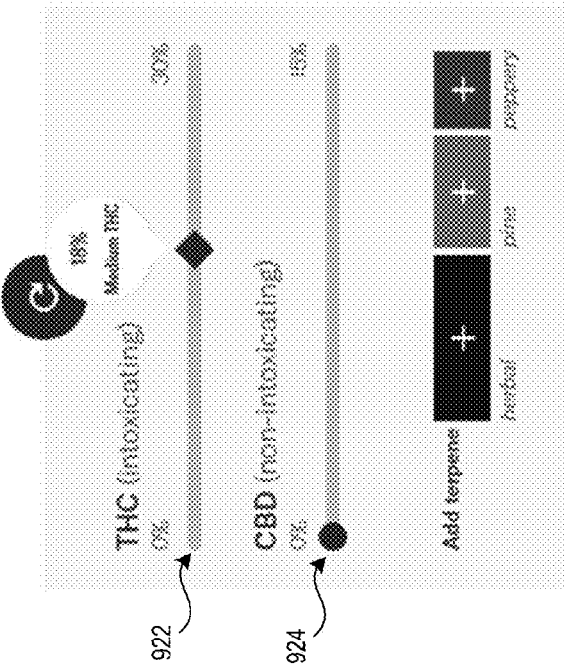
*FIG. 45A*

Choose a Terpene
In order of most common

Myrcene *Herbal*
Most common terpene.

Caryophyllene *Peppery*
May have anti-inflammatory effects.

Limonene *Citrus*
Believed to relieve anxiety and stress.

Terpinolene *Fruity*
Occurs in apples, lilacs, and nutmeg.

Pinene *Pine*
Found in rosemary and other herbs.

Humulene *Hoppy*
May provide anti-inflammatory benefits.

Ocimene *Minty*
Commonly used in perfumes.

Linalool *Floral*
Found in lavender and believed to promote relaxation.

*FIG. 45C*

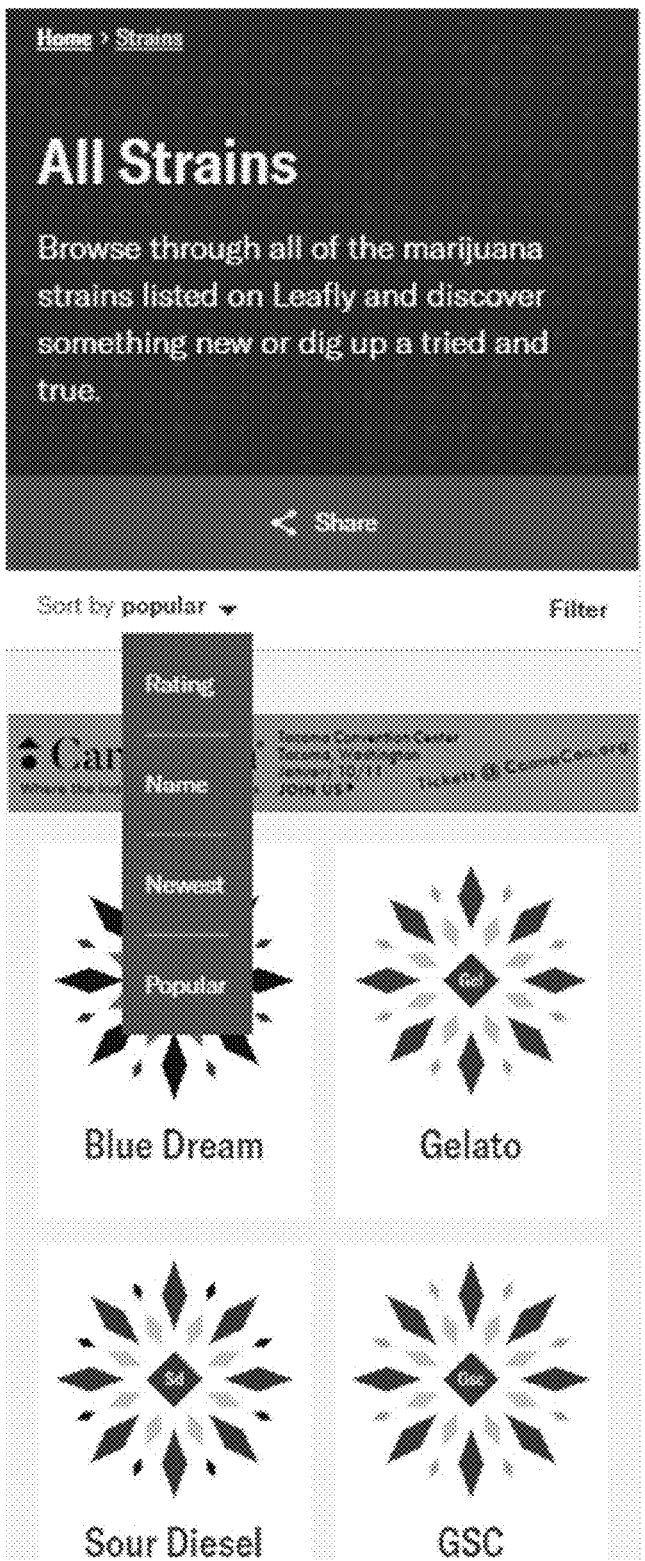
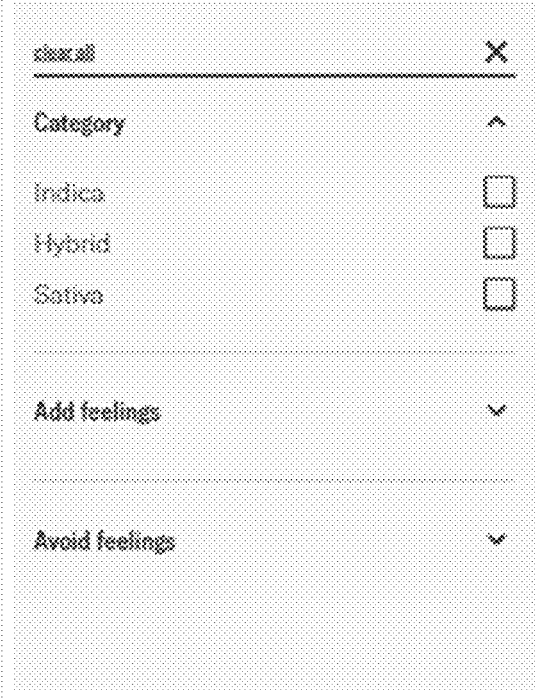
*FIG. 46A*  *FIG. 46B*

METHOD AND COMPUTER-READABLE MEDIUM FOR SELECTION OF CANNABIS-RELATED PRODUCTS AND VISUALIZATION OF CHEMICAL DATA

CROSS-REFERENCE TO RELATED APPLICATIONS

This application is a continuation of Ser. No. 17/749,104, filed May 19, 2022, which is a continuation of U.S. patent application Ser. No. 16/721,905, filed Dec. 19, 2019 (U.S. Pat. No. 11,341,559), which is a continuation-in-part of U.S. patent application Ser. No. 16/228,197 filed Dec. 20, 2018 (U.S. Pat. No. 11,205,210), and U.S. patent application Ser. No. 16/721,905 claims the benefit under 35 U.S.C. § 119(e) of U.S. Provisional Application No. 62/866,551 filed Jun. 25, 2019 and U.S. Provisional Application No. 62/898,499 filed Sep. 10, 2019. This application is also related to PCT Application No. PCT/US2019/067683 filed Dec. 19, 2019. All of these applications are incorporated herein by reference in their entireties.

TECHNICAL FIELD

The invention disclosed herein relates to systems for categorization and selection of a product, and in particular, to on-line systems for visualizing product information, recommending product exploration paths to users navigating through this product categorization schema, and identifying locations for acquisition of such products.

BACKGROUND

Retail purchasing by consumers has conventionally been done at a location, often referred to as a "brick and mortar" store. This has afforded access to salespeople that can share wisdom and provide advice about the various products and purchasing options. This is one of the added benefits of on-site shopping. Unfortunately, the advice is sometimes inaccurate, subjective, or a complete fabrication provided to drive sales. The consumer may, or may not, benefit from an on-site purchase that affords access to product expertise.

Increasingly, consumers are making purchases on-line. On-line shopping offers convenience, is expedient, and provides for discreet purchasing. Typically, on-line outlets (i.e., websites) offer consumer product reviews to compete with the on-site expertise of a brick-and-mortar outlet. Unfortunately, the reviews may be fake, subjective, or just inapplicable.

Consider, for example, the purchase of regulated products such as alcohol, tobacco, or cannabis products. When considering a potential purchase, the customer may wish to account for certain things such as taste, potency, potential biological effects, or other such aspects. Often, such aspects may be governed, at least in part, by the physiology of the customer (i.e., also referred to as the "user"). Unfortunately, present purchasing outlets, whether on-site or on-line, do little to accommodate these purchasing decisions and rely heavily on anecdotal opinion or subjective data. Purchasing outlets also do not provide information for assessing and comparing products, such as two different strains of cannabis.

SUMMARY

In one embodiment, a categorization system for objectively categorizing a regulated product for consumption is disclosed, as well as a recommended decision tree which users can utilize in order to navigate products and product categories. For ease of reference, "products" and "product categories" as referred to throughout often refer to cannabis products and groups of products, respectively, which are hierarchically grouped based on objective data, though the present disclosure is envisioned for use in connection with other products (e.g., alcohol, tobacco, etc.). Each cannabis product can be either a "strain" of cannabis, or else a product such as concentrated extract derived from one or more cannabis strains. The system includes a user interface for displaying individual products using a novel form of visualization generated based on, for example, lab data quantifying the chemical profile of each product, as well as for receiving and assessing user-specific data relating to such products.

This product classification schema based on objective data can also be used in combination with user feedback about the subjective effects of products within a category in order to power a recommendation system whereby users can be recommended products that will have similar or different effects based on whether they fall into the same or different product groupings, respectively. The users can be healthcare workers, physicians, pharmacists, end users, patients, or the like.

In some embodiments, methods and apparatuses provide a decision-making process for purchase of regulated products and can account for collection and/or use of objective data in the purchasing decision. Cannabis profiles can be identified, analyzed, grouped, and/or categorized to facilitate the decision-making process. A color-coded cannabis strain flower symbol can provide information about the profile, such as compounds in the product. A customer can determine general characteristics of products based on visual inspection of the cannabis strain flower symbols. For example, two products with similar cannabis strain flower symbols should provide similar experiences (or therapeutic effects), whereas two products with substantially dissimilar cannabis strain flower symbols should provide substantially different experiences (or therapeutic effects). The cannabis strain flower symbols can be applied to labels, packaging, signage, or at other suitable locations.

In another embodiment, a computer system comprising machine executable instructions stored on non-transitory machine-readable media is provided. The instructions provide for recommending a regulated product for consumption by implementing a method of obtaining user input including at least one of personal data (e.g., sex, age, heart rate, blood pressure), preference data (e.g., saved history of "liking" or "not liking" a given product), and experience data (e.g., saved history of how a product made them feel); obtaining merchant input including at least one of general data descriptive of the regulated product, batch data descriptive of the regulated product and user data descriptive of felt effects of the regulated product on the user; and making a recommendation of regulated product using a decision engine. The recommendation can be made according to correlation of the chemical data obtained from testing laboratories (which is used to categorize and visualize individual products) with the preference data obtained from user inputs.

In some embodiments, a system comprises packaging configured to hold cannabis and a two-dimensional color-coded identifier flower on the packaging. The color-coded identifier flower indicates a strain of the cannabis and is optically machine-readable. The color-coded identifier flower includes: 1) a nucleus with a shape indicating a primary cannabinoid of the cannabis, and 2) a plurality of rings indicating compounds. In some embodiments, the rings can be terpene rings with a color selected to indicate a terpene in the cannabis and a configuration selected to indicate an amount of that terpene. The packaging can be a box, bag, cartridge, vial, bottle, can, wrapper, jar, or another suitable container for holding cannabis. The identifier flower can provide information about strain without the use of alphanumeric symbols (e.g., numbers, letters, or both).

The terpene rings can include a first terpene ring with first symbols arranged in a first circular pattern and a second terpene ring with second symbols arranged in a second circular pattern different from the first circular pattern. The first symbols indicate first terpenes, for example, the most abundant terpene in the cannabis (e.g., cannabis strain, flower, etc.). The second symbols can indicate second terpenes, for example, the second most abundant terpene in the cannabis (e.g., cannabis strain, flower, etc.). The terpene information can be encoded by the color of the symbols. The shape of the symbols can encode other information, such as information about the amount (e.g., absolute or rank-order) of cannabinoids.

In some embodiments, the identifier flower is limited to three terpene rings. Primary, secondary, and tertiary terpene rings can indicate the three most abundant terpenes and, in some embodiments, the position of the rings can encode the rank-order of those terpenes. In other embodiments, the identifier flower has more terpene rings, such as four terpene rings, five terpene rings, six terpene rings, etc. The number of terpene rings can be selected based on the number of terpenes that affect the user experience. The dimensions of the symbols of the rings can indicate levels of cannabinoids. In other embodiments, the sizes of the first symbols and the second symbols indicate the amount (e.g., an absolute amount, a relative amount, etc.) of cannabinoids and/or first and second terpenes in the cannabis.

The color-coded identifier flower can indicate, for example, whether the cannabis is THC (tetrahydrocannabinol)-dominant, THCA (tetrahydrocannabinolic acid) dominant, CBD (cannabidiol)-dominant, CBDA (cannabidiol acid) dominant, or THC/THCA-CBD/CBDA Balanced. The term "THC" includes "THCA" which is a precursor of THC, unless indicated otherwise. The term "CBD" includes "CBDA" which is a precursor of CBD, unless indicated otherwise. For example, a "THC dominant" undried flower would have primarily THCA, and if the flower is dried, the dried flower may be THC dominant. The two-dimensional color-coded cannabis strain identifier flower can have radial symmetry.

In yet other embodiments, a computer-implemented method for labelling cannabis comprises receiving, via a network, composition data for cannabis. The received composition data is analyzed to determine at least a cannabinoid level in the cannabis and a plurality of terpenes in the cannabis. A machine-readable cannabis strain indicator can be generated based, at least in part, on the analysis of the composition data. The machine-readable cannabis strain indicator is configured to be applied to packaging, displayed via a screen, or the like. In some embodiments, the cannabis strain indicator includes a nucleus with a shape encoding information regarding the determined cannabinoid level and a plurality of terpene rings surrounding the nucleus. Each terpene ring has a color encoding information about a corresponding terpene in the cannabis and the amount of the corresponding terpene (e.g., the color of the primary terpene ring indicates the most abundant terpene whereas the color of the secondary terpene ring indicates the next most abundant terpene). The diameters of the terpene rings can indicate the rank-order of the terpenes. For example, the diameter of the primary terpene ring can be larger than the diameter of the secondary terpene ring. Other embodiments of cannabis strain indicators can also be used. The computer-implemented method can also be used to identify or label non-cannabis products.

In yet another embodiment, a computer-implemented method of generating a machine-readable color-coded cannabis strain indicator includes determining a cannabinoid symbol based on a primary cannabinoid of the cannabis. A set of first symbols for a first compound of the cannabis is assigned. A set of second symbols for a second compound of the cannabis is assigned. A color-coded cannabis strain indicator with the two sets of symbols is generated. In certain embodiments, a color of the first symbols corresponds to the first compound, and a color of the second symbols corresponds to the second compound. Other types of information can be encoded.

In further embodiments, a cannabis composition indicator comprises a nucleus with a shape that provides information about cannabinoids and terpene rings providing information about terpenes. The terpene rings can have color encoded information about selected terpenes. For example, each terpene ring can have terpene elements with color-encoding for terpene information, as well as cannabinoid level information encoded by the shape and/or size of the elements. Packaging, retail displays, websites, or marketing materials can include the cannabis composition indicator. Additionally, the cannabis composition indicator can be a machine-readable and/or human-readable flower-like symbol indicating a chemical profile of a plurality of significant constituents of the cannabis.

In some embodiments, a computing device comprises memory that stores computer-executable instructions and one or more processors configured to execute the instructions to present at least one user interface on the computing device. The user interface is usable to identify a color-coded cannabis strain indicator based, at least in part, on image data associated with cannabis. The shapes and colors of discrete features of the identified color-coded cannabis strain indicator are analyzed to determine composition data of the cannabis based, at least in part, on the color-coded cannabis strain indicator. The determined composition data is displayed.

The image data includes one or more images of the color-coded strain indicator. The image data can be provided by a camera (e.g., a camera of a smartphone or tablet) or another suitable device. The user interface is presented via a screen configured to allow a user to enter information and select actions. The screen can be a touch screen that displays the color-coded strain indicator and other additional information about the cannabis product.

The color-coded symbols and indicators provide information about different products, including non-cannabis products, regulated products, and unregulated products. For example, color-coded symbols and indicators can provide information about medication, foodstuff, or the like. The information provided by the color-coded symbols and indicators can be selected based on associated product.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 shows two tetrahydrocannabinol-based representations in accordance with some embodiments of the disclosed technology;

FIG. 10 shows two cannabidiol-based representations in accordance with some embodiments of the disclosed technology;

FIGS. 20-28 are representative user interface screens in accordance with embodiments of the disclosed technology;

FIGS. 31A-38C are screenshots of representative user interfaces for a user-defined strain generator in accordance with embodiments of the disclosed technology;

FIG. 42A-42D are screenshots of user interfaces showing composition information for the Blue Dream strain;

FIGS. 45A and 45B are screenshots of a representative user interface for a user-defined strain generator in accordance with another embodiment of the disclosed technology;

FIG. 45C shows characteristics of terpenes for user selection;

FIG. 46A is a screenshot of a user interface for searching and sorting strains in accordance with another embodiment of the disclosed technology;

FIG. 46B is a screenshot of a user interface for filtering search results in accordance with an embodiment of the disclosed technology;

DETAILED DESCRIPTION

Figure 1:
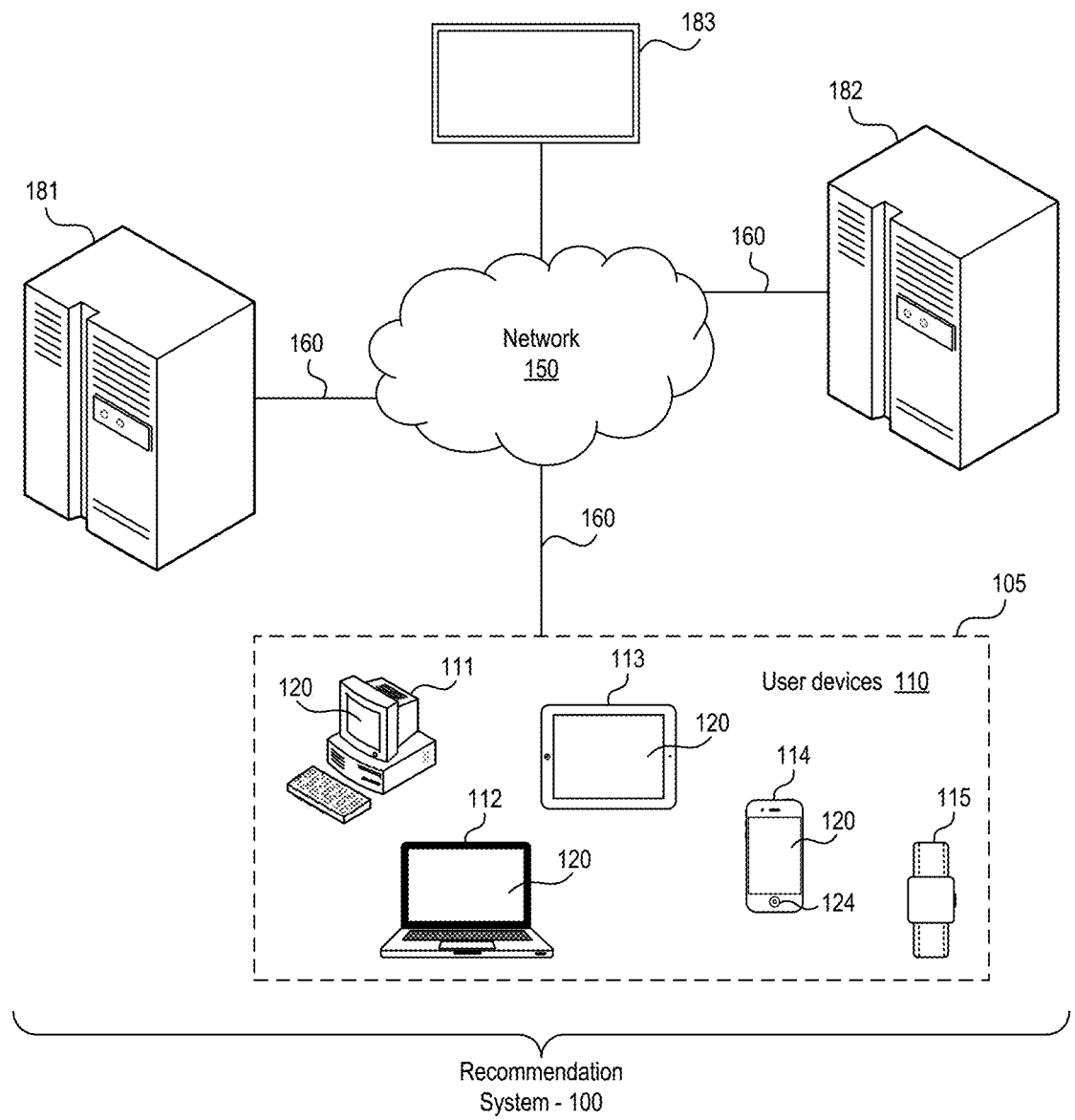
FIG. 1 is a schematic diagram depicting a recommendation system in accordance with some embodiments of the disclosed technology.

Disclosed herein are methods and apparatus for categorizing and recommending a product for purchase from a selection of products. Also disclosed are systems for providing information about the products. For purposes of simplicity, the disclosure sets forth numerous embodiments regarding cannabis, though the disclosure is in no way limiting and any other product—regulated or unregulated—could form the basis for the categorization and recommendation of the products using the methods disclosed herein. The products can be non-regulated products or regulated products (including products with or without cannabis-related compounds). There is no requirement that the regulated products be subject to any particular regulation, unless such requirement is expressly stated herein.

The product visualizations and hierarchy of product groups described herein are preferably determined by objective data comprised of measurements of at least two major classes of chemical constituents found in cannabis: cannabinoids and terpenes. The product visualizations can reflect the total cannabinoid levels, such as total THC level, total CBD level, etc. Products can be initially classified into one of three major groups defined by the ratio of the two principal cannabinoids found in cannabis products, tetrahydrocannabinol (THC) and cannabidiol (CBD). The ratio of Total THC to Total CBD allows each product to be discretely placed into one of three groups in the highest level of the classification hierarchy: "THC-dominant," "CBD-dominant," or "Balanced THC/CBD," as discussed in connection with FIG. 2. For example, the balanced THC/CBD ratio can be in a range of 5:1 to 1:5. In some embodiments, the ratio of balanced THC/CBD can be 5, 4, 3, 2, 1, 0.8, 0.6, 0.4, 0.2, or ranges encompassing such ratios. In some embodiments, THC-dominant products can have a THC:CBD ratio equal to 5:1 or higher; CBD-dominant products can have a THC:CBD ratio equal to 1:5 or lower; and the intermediate ratios can be balanced THC/CBD. In some embodiments, the balanced THC/CBD ratio can be equal to about 1. Products assigned to one of these three groups can be further grouped into separate groups nested within these primary groups if they have sufficiently high levels of another, less common cannabinoid. For example, a "THC-dominant" product may be further distinguished as "THC-dominant+THCV," indicating that it also contains relatively high levels of another cannabinoid. Products can also include other cannabinoids, such as cannabinol (CBN), cannabigerol (CBG), cannabichromene (CBC), etc. For new strains, product visualizations can be created by assigning a new shape to the nucleus, as well as other features, for most abundant ("dominant") cannabinoid. Other compounds can be indicated by the color, sizes, and/or positions of features of the product visualization. After this phase of classification based on one or more of the cannabinoids, products can be further grouped based on measurements of the second class of chemical compounds, such as terpenes.

The second phase of the classification hierarchy can assign a product to a further group nested within the larger group assignment defined above. For example, this group assignment can be determined by the "dominant" terpene found in the product, in other words, the terpene present at the highest concentration for that product type. Cannabis products within each of these dominant terpene subgroups can be grouped further, at the next level of the hierarchy, based on the number and rank-order of terpene compounds present in that product. For example, two cannabis product types nested within a single dominant terpene group, which is itself nested within a higher-level cannabinoid-based grouping, may be distinguished by having a different number or rank-order of secondary, tertiary, or quaternary terpenes. After this phase of classification based on measurements of the second class of chemical compounds, products can be further grouped based on measurements of a third class of chemical compounds, such as flavonoids or cannaflavins.

These hierarchically-defined cannabis product groupings may be determined at the highest level based on the major constituents commonly found in cannabis known to cause or modulate the psychoactive effects of these products (principal cannabinoids such as THC and CBD) and at the lower levels by compounds (e.g., terpenes) thought or known to directly impact the flavor and smell, as well as potentially modulate the psychoactive effects, of cannabis products. Thus, products found within the same sub-groups will tend to have similar aromas and likely similar effects to other products within the same group. Products with similar visual representations can be identified as belonging to the same group, whereas products with significantly different visual representations can be identified as belonging to different sub-groups. Products in different sub-groups will tend to have different flavor and aroma profiles and different subjective effects (all other things being equal), especially when products fall into different high-level groups.

Products can be visualized, categorized, and/or grouped based on mode of administration, dosage (including microdosing), dose duration, effect duration, absorption rate, therapeutic effect, side effects, pharmacokinetic properties, pharmacological properties, compound levels, concentrations, and/or compound ratios (e.g., cannabinoid ratios, cannabinoid to terpene ratios, etc.). Cannabinoid-terpene hierarchical categorizations can be applied to natural forms of cannabis (e.g., cannabis flowers), vaping oils, essential oils, cooking additives, or combinations thereof. In another example, THC-CBD hierarchical categorizations can be applied to edibles, beverages, or other orally consumed products. Example edibles include chips, cookies, brownies, candies, gummies, chocolates, ice cream, etc. Example beverages or other orally consumed products include bottled drinks, mixed powders, infused tea leaves, etc. Other hierarchical categorizations can also be employed. For example, THC-CBD hierarchical categorizations can be applied to topicals. For example, cannabis topicals can be categorized primarily based on cannabinoid concentrations and secondarily based on one or more specific additives, such as skin permeation enhancers, chemical excipients, solvents, surfactants, etc. Example topicals include CBD topical oils or lotions, THC topical oils or lotions, THC-A topical oils or lotions, blended cannabinoid topical oils or lotions, etc.

Visual design logic can be used to visualize individual products (e.g., individual cannabis strains). The visualization (e.g., strain flower-like symbols or identifier) for each strain can be based, at least in part, on objective lab data comprising or consisting of measurements of the cannabinoid and terpene profile of that strain or product. "Strains" here refers to common cannabis industry product labels (e.g., "Blue Dream") given to cannabis products. Multiple product lines made by distinct producer-processors can be given the same strain name label. Lab data comprised of chemical profiles is obtained across multiple product lines with the same strain name label, and data can be aggregated and cleaned, and a composite chemical profile is constructed for that strain. In addition, the same visualization can be applied to individual producer-processors' products, allowing similarities or differences in specific product lines to be visually discerned or compared to the composite visualization of all products with the same strain name. A consumer can quickly understand the expected effects of the strain without reading complicated lab reports or knowing all of the compounds in the strain. The visualization can be a non-alphanumeric visualization, such as an identifier flower, so a user can visualize the cannabis properties.

The visualizations can be symbols (e.g., two-dimensional or three-dimensional non-alphanumeric symbols) with visually discernable encoded elements arranged in predetermined patterns. Similarities and differences between the symbols can be visually discerned by the average observer. In some embodiments, visual encoding can indicate only the chemical composition of the product. In other embodiments, the encoding can indicate the chemical composition and other profile information, such as modes of administration, expected effects, dosages, combinations thereof, or the like. In some embodiments, the encoding may not indicate chemical composition. For example, a symbol for a particular edible cannabis-related product may indicate dosages, product form (e.g., candies, baked goods, gummies, food additives, beverage, etc.), purity levels, absorption rates, therapeutic effects, effect duration, etc. The configuration of the symbols can be selected based on the information to be provided. The symbols can have color encoding, shape encoding, pattern encoding, etc.

Generally, the methods and apparatus (also referred to as a "recommendation system") receive input from a potential purchaser (i.e., a "user"). The user input includes user data which includes, for example, user preferences such as taste, smell, chemical composition, level of psychoactive effects, desired therapeutic effects, preferred strains, preferred family of strains, potency, dosage, duration of effect, administration information (e.g., preferred modes of administration), medical information (e.g., medical history, current medication, etc.), or the like. Other user data may include demographic values, such as age, sex, or experience level consuming cannabis products. Other user data may include user preferences such as proximity to merchant, merchant store hours, merchant availability, merchant sales price, delivery options, or the like.

The recommendation system may be configured with a database or library that contains product information. The product information is descriptive of the regulated products in ways that will provide for correlation with the user data and improve fulfillment. Generally, the correlation of user data and product information is according to algorithms implemented by the recommendation system, thus enabling selection of products that closely correlate to customer requests.

Prior to discussing the technology disclosed herein in additional detail, aspects of some terms are now introduced.

As discussed herein, the term "user account" generally refers to an account maintained on behalf of a user to facilitate at least one of tracking of user data, selection and order of a regulated product. As discussed herein, the term "merchant account" generally refers to an account maintained on behalf of a merchant to facilitate evaluation of merchant operations, such as sales operations, orders placed with suppliers, inventory and other related information for user selection and acquisition of the selected regulated product.

As discussed herein, the term "merchant" as well as "on-line store" and "website" are related. These terms generally refer to offerings by another (the merchant) accessible through a network, such as through a browser over the Internet. As discussed herein, the merchant offers goods and/or services for sale to shoppers (which are also referred to herein as "users" of the user application).

Referring now to FIG. 1, an exemplary embodiment of a recommendation system 100 is shown. In this example, the recommendation system 100 permits a user making use of a user device 110 to securely, rapidly, and automatically complete a purchase transaction. In this example, each user device 110 shares a common user account 105. The user account 105 provides for convenient storing and sharing of information between user devices 110.

Exemplary user devices 110 as may be used in the recommendation system 100 include, without limitation, a personal computer (PC) 111, a laptop 112, a tablet computer 113, a smartphone 114, and a biometric monitor 115. Generally, each user device 110 includes a display 120 and/or one or more processors. Each of the display 120 offers the user a visual interface for interaction with the recommendation system 100. For example, the recommendation system 100 may be presented as a browser interface that makes use of known techniques for user interaction. In some embodiments, the recommendation system 100 provides strain generators, as discussed in connection with FIGS. 31A-38C.

Generally, each user device 110 is in communication with network 150 through communications channel 160. The network 150 is also in communication with merchant server 181 and may further communicate with a supplier server 182. In this example, merchant server 181 contains instruction sets governing merchant operations and serves a plurality of user accounts 105. Supplier server 182 may be an e-commerce system server generally configured for transactions between suppliers (wholesalers) and merchants (retailers) and further, the supplier server 182 may contain product information beyond that which is supplied to the merchant. The foregoing are merely illustrative of the architecture of the recommendation system 100 and is not meant to be limiting.

In this example, any user device 110 may include conventional software such as productivity tools (e.g., word processing, spreadsheets, etc.) and at least one browser. Tablet computer 113 or smartphone 114 may also include at least one "app" (defined generally as a purpose-oriented application that may include network communications as part of the functionality), as well as a biometric sensor 124 that can be a conventional optical scanner configured with an appropriate app for use as a fingerprint reader. The fingerprint reader may include software for receiving data from the scanner and interpreting the data within the context of a fingerprint. Other user devices 110 may include a biometric sensor 124 and/or other equipment useful for implementing authentication schemes. Thus, the recommendation system may further implement security measures for securing access to the user device 110.

The biometric device 115 may be a personal fitness device or another specialized device. Generally, the biometric device 115 collects and provides personal data. The personal data may be provided to another one of the user devices 110 or directly to the merchant system 181. Personal data that may be collected by the biometric device 115 includes, for example, heart rate, body temperature, blood pressure and other such parameters. The personal data may be communicated to other components of the recommendation system 100.

Once a user new to the recommendation system 100 has established the user account 105, the user may then enter the user data including at least one of user preferences, financial information and user physiology data for storage in the user account 105. Data entry into the user account 105 may be performed manually and/or electronically. Electronic data entry may include, for example, electronic entry of baseline personal data for use as a control or for comparison sake to collected user input data. The baseline personal data for the user may include physiological parameters collected in a normal, resting state for the user.

Once the user has established the user account 105, the user may log in to the product categorization and visualization system, which the recommendation system is built upon, and at any time search for offerings of a merchant for a specific regulated product, or may view offers of regulated products from respective merchants. The user may enter preference data, strain profile information, or experience data to select a specific product and determine a merchant offering the same. Alternatively, where the user is unfamiliar with the regulated products or may not have any preference data or experience data for input, the recommendation system may make recommendations based on the user data.

For example, in the case of cannabis, the user may be presented with a series of questions by the recommendation system that support a decision tree. Examples of questions for the user include:

| Question | Answer |
| --- | --- |
| Do you want to avoid getting high? | Y/N |
| Do you want to experience psychoactive effects but are nervous/sensitive/lightweight | Y/N |
| Do you definitely want to get high? | Y/N |
| Do you want psychoactive effects but are worried about certain side-effects, for example, anxiety or hunger. | Y/N |
| Have you tried a specific product before? | Y/N |

-continued

| Question | Answer |
| --- | --- |
| Are you interested in a product for pure recreational purposes or also for medicinal use? | Y/N |
| Do you have a preference for a particular form of product, such as natural form, cooking additive, oil, capsule/pill form, candy or beverage? If so, check any applicable form from those listed below. | Y/N |
| Natural form | € |
| Cooking additive | € |
| Capsule or pill | € |
| Candy | € |
| Beverage | € |
| Prepared foods | € |
| Other | € |

Figure 2:
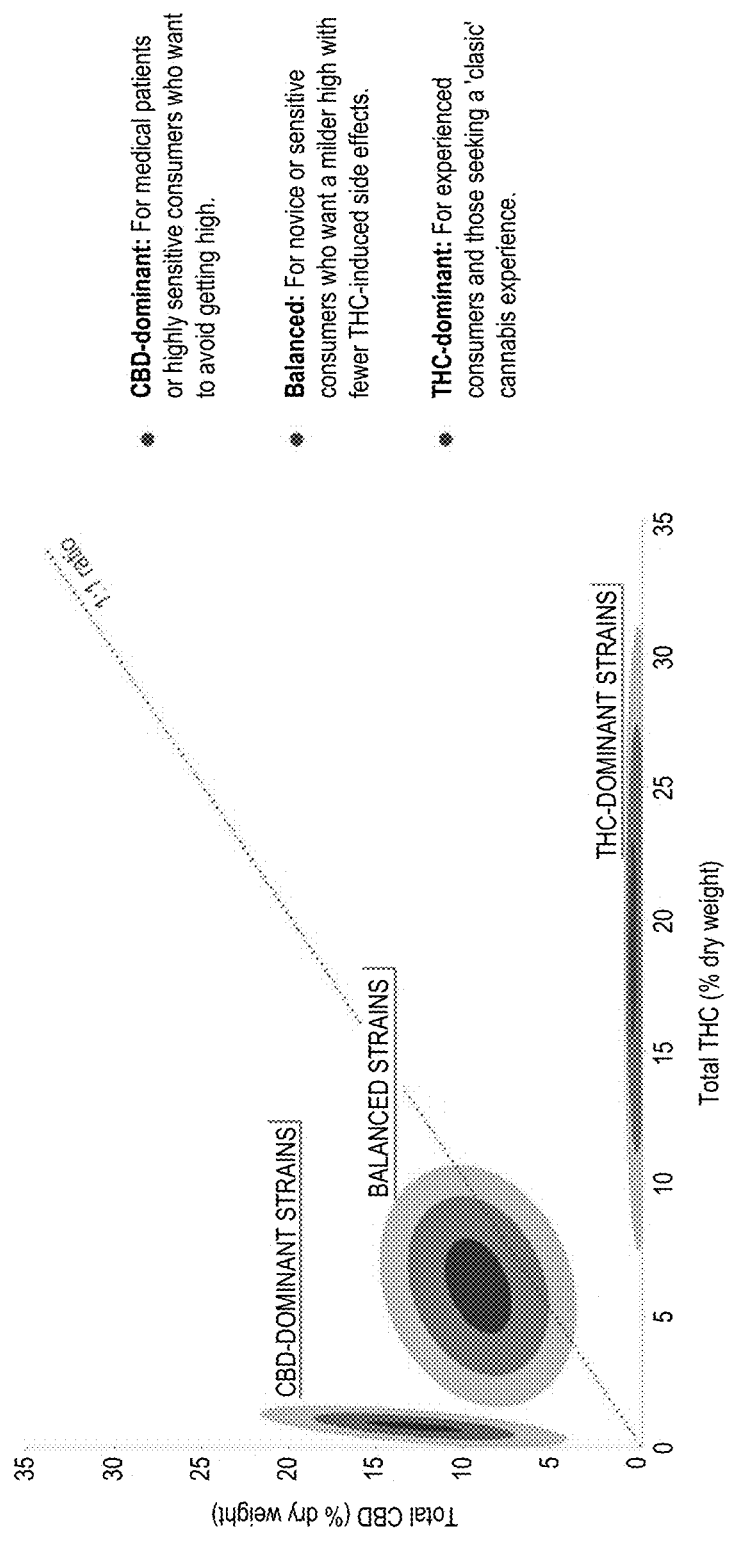
FIG. 2 is a graphic depicting distributions of products according to content.

At this level of the decision tree, the recommendation system begins to bias selection of cannabis products based on content of the various psychoactive substances either at relatively high levels of the organization hierarchy (e.g., strains that are THC-dominant, CBD-dominant, balanced THC/CBD, etc.) or at lower levels (i.e., terpene groupings) and the effects that they provide to users. Reference may be had to FIG. 2 which depicts distributions of cannabis products according to content.

At the next level down in the decision tree, the user may be asked additional questions that further sub-categorize products within a general product category, such as whether there are specific flavors they prefer, whether they want strains that are better for certain issues, and others. Both levels and the batch-specific level could be further personalized with more specific recommendations with relevant user feedback, either based on population-level data (if user is brand new) or at the individual level (if a user has provided us with enough feedback historically). In embodiments with strain generators, the user can modify input (e.g., user profiles, settings, strain profiles, etc.) to generate new recommendations.

In FIG. 2, the shaded areas depict a population of data points, with each data point representing total content of CBD and THC for a particular strain of cannabis. Darker areas indicate a greater prevalence of strains.

The CBD-dominant strains may be preferred by medical patients or highly sensitive consumers who want to avoid getting high. THC-dominant strains may be preferred by medical patients, experienced consumers, or those seeking a "classic" cannabis experience. Balanced strains may be preferred by novice or sensitive consumers who want a milder high with fewer THC-induced side effects.

The selection process may continue with questions such as: are there specific flavors you prefer? Do you want strains that may be better or worse for certain things, which could include anxiety, inflammation or pain, relaxation, sleepiness, or if the user has a cost limit?

The recommendation system 100 of FIG. 1 may be further personalized with more specific recommendations with relevant user feedback, based on population-level data (if user is brand new) and/or at the individual level (if a user has provided prior historical feedback).

Once the selection process has received the requested preference information, the recommendation system 100 will make recommendations to the user. The recommendations may include identity of a particular strain of cannabis, a recommended quantity for ingestion, recommended techniques for ingestion, and other such aspects.

The recommendations may be based upon a variety of factors. For example, the recommendation system 100 may provide each user with a specific user experience feedback facility. The user experience feedback facility may query the user for a variety of parameters. Questions may solicit information regarding, for example, a degree of euphoria, hunger, queasiness, relaxation, and other such subjective aspects. Other input to the user experience feedback facility may include objective data such as personal data collected by the biometric device 115.

The user experience feedback may result in refined personal recommendations for future purchasing. In some embodiments, user experience feedback is aggregated. Aggregated user experience feedback may be used to develop and refine a heuristic algorithm for making recommendations to new users or users with changed input data.

Figure 3:
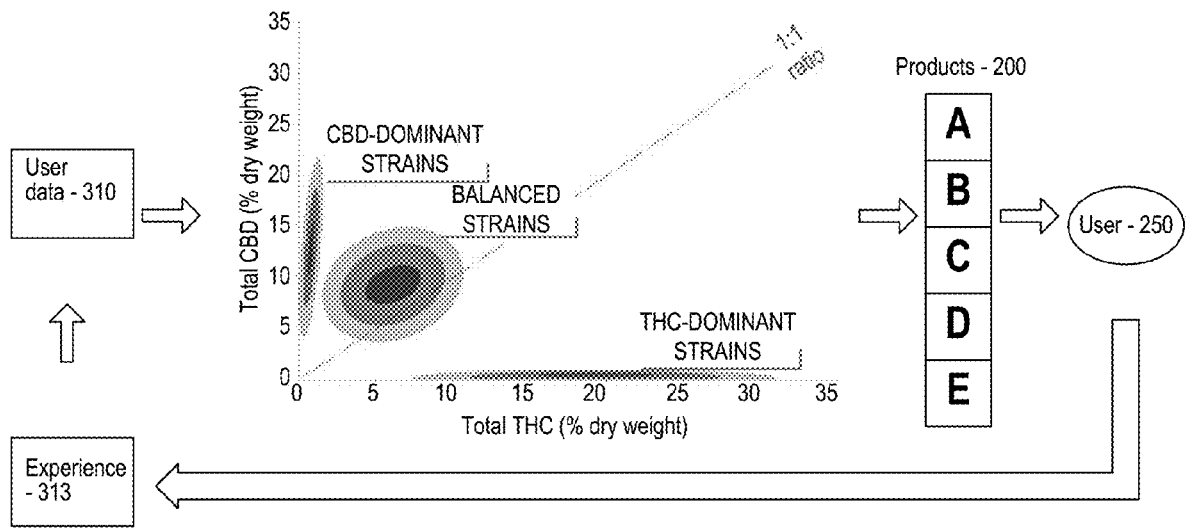
FIG. 3 is a flow chart providing an exemplary process for generating recommendations using the recommendation system disclosed herein.

FIG. 3 is a process diagram depicting one aspect of user input and ongoing updating of the recommendation system. In FIG. 3, the user initiates a request for a recommendation. User data 310, such as preference data 312 and/or personal data 311, are input into the recommendation system 100. When considering the inputted user data and aspect of CBD and THC content related to the products which fall within the classification of the user's preference data 312, the recommendation system 100 makes reference to the appropriate data set, such as that set forth in FIG. 2, to identify the target on the grid as to a product or products falling within recommended THC-CBD content percentages. From the user data 310 and the content information (FIG. 2), the recommendation system 100 narrows the pool of products 200 for recommendation to a limited set. In this illustration, the candidate products 200 for recommendation are denoted as A, B, C, D, and E. Of course, the CBD and THC content are merely one aspect or parameter considered by the recommendation system 100. Consideration of the various other salient parameters may result in recommendation of fewer candidate products 200. Once selected, the user 250 will indulge and have an experience 313. The experience data is tracked and used to assist with future recommendations.

If, however, a user does not agree with the recommendations of products 200 provided by the recommendation system 100, the user can provide feedback of experience data 313 or additional preference data 312 to alter and update the recommendation. For example, the user may indicate that the recommended products 200 contain either too much or too little THC, too much or too little CBD, will cause an effect that differs from the user's preference, etc. Based on this feedback, the recommendation system 100 can update the user data 310 and re-assess the totality of the inputted information to update, in real time, a revised set of recommended products 200. This process is set forth with further detail in FIG. 4.

Figure 4:
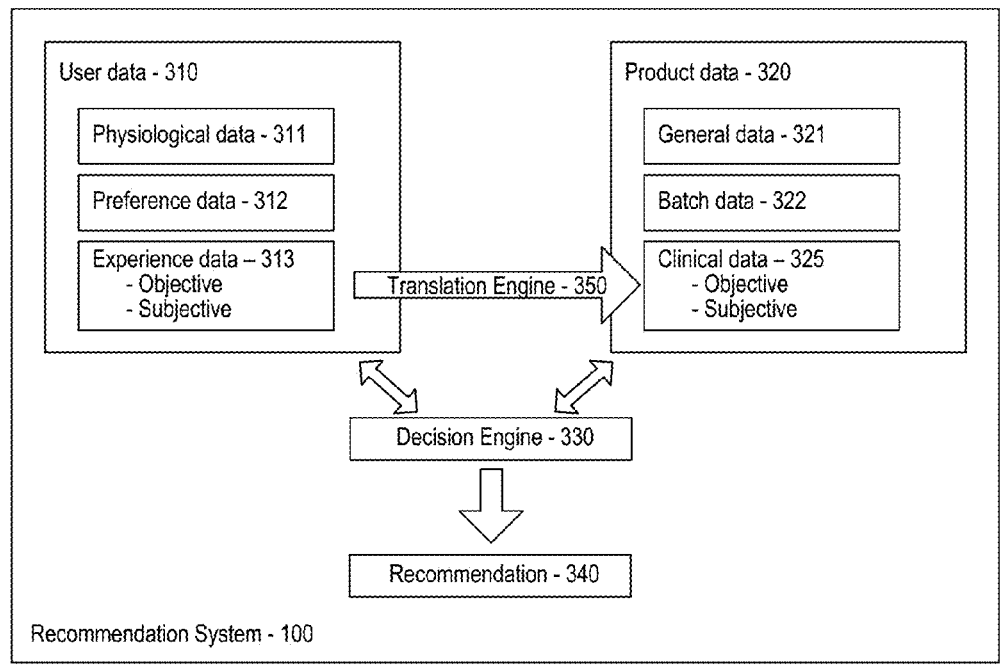
FIG. 4 is a schematic diagram providing an overview of a system for recommending products in accordance with some embodiments of the disclosed technology.

FIG. 4 is a block diagram depicting aspects of the recommendation system and is useful for describing an exemplary embodiment of a process for making a recommendation of regulated product.

As shown in FIG. 4, user data 310 and product data 320 are provided as inputs to a decision engine 330. In this example, the user data 310 includes baseline personal data 311, preference data 312, and experience data 313. Generally, the baseline personal data 311 includes objective aspects such as, without limitation, age, sex, race, weight, heart rate, blood pressure, and the like. The user preference data 312 may include information related to the type of experience sought and the subjective view of the user as it relates to specific products or product effects. The preference data 312 may be entered contemporaneously, and may be stored with default values suited for the particular user. Generally, the experience data 313, which may be collected during the user experience, is descriptive of the user experience and therefore may be used to develop a degree of conformity to the product description. The experience data 313 may include a subjective component collected from user assessments and reviews, and may also include an objective component, such as updated personal data 311 of the user when under the influence. Examples of personal data that may be monitored while under the influence include aspects such as heart rate, blood pressure, thirst, food intake, and the like.

Generally, the product data 320 includes general data 321, batch data 322, and clinical data 325. The general data 321 generally includes aspects such as name, supplier identity, and fundamental aspects such as average content, density, storage recommendations, manner of consumption, and the like. The batch data 322 may include more specifics, including actual test results from a laboratory or scientific research on a given product. The clinical data 325 may include objective data, such as that derived from administration in a controlled setting where physiological parameters are monitored, and may include subjective data, such as user feedback. The clinical data 325 may be derived from the experience data 313 of multiple users, taking into account variations between batches, user physiology, and the like. Stated another way, the clinical data 325 may be experience data 313 that is normalized over a statistically significant population using aspects such as the baseline personal data 311, and therefore predictive of a user experience for a new user.

Generally, the recommendation system 100 will task the decision engine 330 with the task of making a recommendation 340 for a particular user. That is, for each user, given a set of respective baseline personal data 311, preference data 312, and experience data 313, the decision engine 330 may apply a heuristic algorithm that derives recommendations 340 from other sets of baseline personal data 311 maintained in the recommendation system 100. Generally, the recommendations 340 are arrived at by using large data sets to improve correlation between the expressed preferences 312 and the experience 313, combined and compared with general data 321, batch data 322, and clinical data 325 regarding each potential product for recommendation.

The recommendation system 100 may also include a translation engine 350. Generally, the translation engine 350 weighs user experience data 313 according to the personal data 311 to provide for additions to the clinical data 325. In some embodiments, translation (or correlation) is performed by the decision engine 330 during processing.

As one may surmise, the iterative processing of large data sets with diverse data lends itself well to use of artificial intelligence. Accordingly, the decision engine 330 may implement artificial intelligence. The artificial intelligence may be provided as a neural network, for example. In one embodiment, the neural network makes use of the user preferences 312 as the input layer, and applies aspects such as the baseline personal data 311 and batch data 322 in the hidden layers, and then may continuously update the information stored and reviewed for possible recommendation 340 based on changes to the user preference data 312 or user experience data 313, or updated information to product clinical data 325. The artificial intelligence may also continue to understand the baseline personal data 311 for desired effect of the regulated product, and understand how it compares to the objective clinical data 325 of numerous users, with both the user data 310 and the product data 320 able to update in real time.

The recommendation system 100 may also aid in the procurement process. That is, for at least one product recommendation, the recommendation system 100 may then query the respective merchant servers 181 (and/or supplier servers 182) to identify availability of the recommended product and location for pick-up of the same, which recommendation may be made by assessing a geolocation of a user. Once sources (i.e., merchants) for the recommended product have been identified, any regulatory constraints on a transaction can be identified and may be used to qualify availability and recommendations. For example, if a prescription or medical use license is required by a state where pick-up of inventory for the recommended product may be available, then the user may be alerted to the requirement. Alternatively, the recommendation system 100 may qualify users and conceal the availability of the recommended product or particular locations for pick-up from users that are disqualified from purchase on the basis of a respective user profile, as discussed below.

Limitations on procurement may be specific to each of the products, and therefore may be tracked in the recommendation system 100 as a part of the product data 320. Some limitations on procurement may be specific to external factors, such as a jurisdiction's laws or regulations. For example, one jurisdiction may require early closing of dispensaries while a neighboring jurisdiction permits extended hours of operation. A variety of potentially regulated parameters may be tracked by the recommendation system 100, all of which may factor into the recommended products 200. Examples of external factors that may govern transactions under applicable laws or regulations include, without limitation: state laws, hours of operation, merchant licensing, sales limitations, user age, prescription requirements, use licensing, residential information, user restrictions, user prohibitions, criminal records, credit, and other such factors. In some embodiments, the external factors can include ecommerce information, product pick-up information, delivery information, payment information, or the like. For example, the recommendation system 100 can provide recommendations based, at least in part, on available pick-up times offered by a merchant. In another example, the recommendation system 100 can provide recommendations based on delivery services, whether by the merchant or by a third-party delivery service. In some further examples, the recommendation system 100 can provide recommendations based on payment options, such as whether a merchant accepts digital currency (e.g., cryptocurrency), cash, or other forms of payment.

Accordingly, the recommendation system 100 may include a regulatory database. The regulatory database may be in communication with other regulatory tracking services, such as LEXIS or WESTLAW. As the regulatory database may be accessed during the process of recommendation generation and maintained up-to-date, the recommendation system 100 may aid merchants and users with regulatory compliance, which may also affect the recommendations made by recommendation system 100 to fulfill or comply with applicable laws or regulations in the regulatory database. This will ensure that any recommendation for a regulated product made by the recommendation system 100 is ideally in accordance with applicable laws, such as the Hemp Farming Act of 2018.

Taken together, the recommendation system 100 can identify one or more recommended products 200 based on input of any one or more of objective lab testing data, subjective user preference data, product data 320, geolocation of a user, and regulatory, legal, or other limitations regarding locations at which recommended products 200 may be provided. Therefore, the recommended products 200 will be ones which (1) the user can conveniently and legally pick up, (2) are available for purchase with sufficient inventory at identified merchants 181, (3) match the user's preferences for manner of consumption, graphical indication of THC-CBD content (as seen in FIG. 2), (4) match the user's subjective preferred experience, and (5) fit the user's objective personal data to confirm appropriate and advisable levels of recommended consumption.

Figure 5:
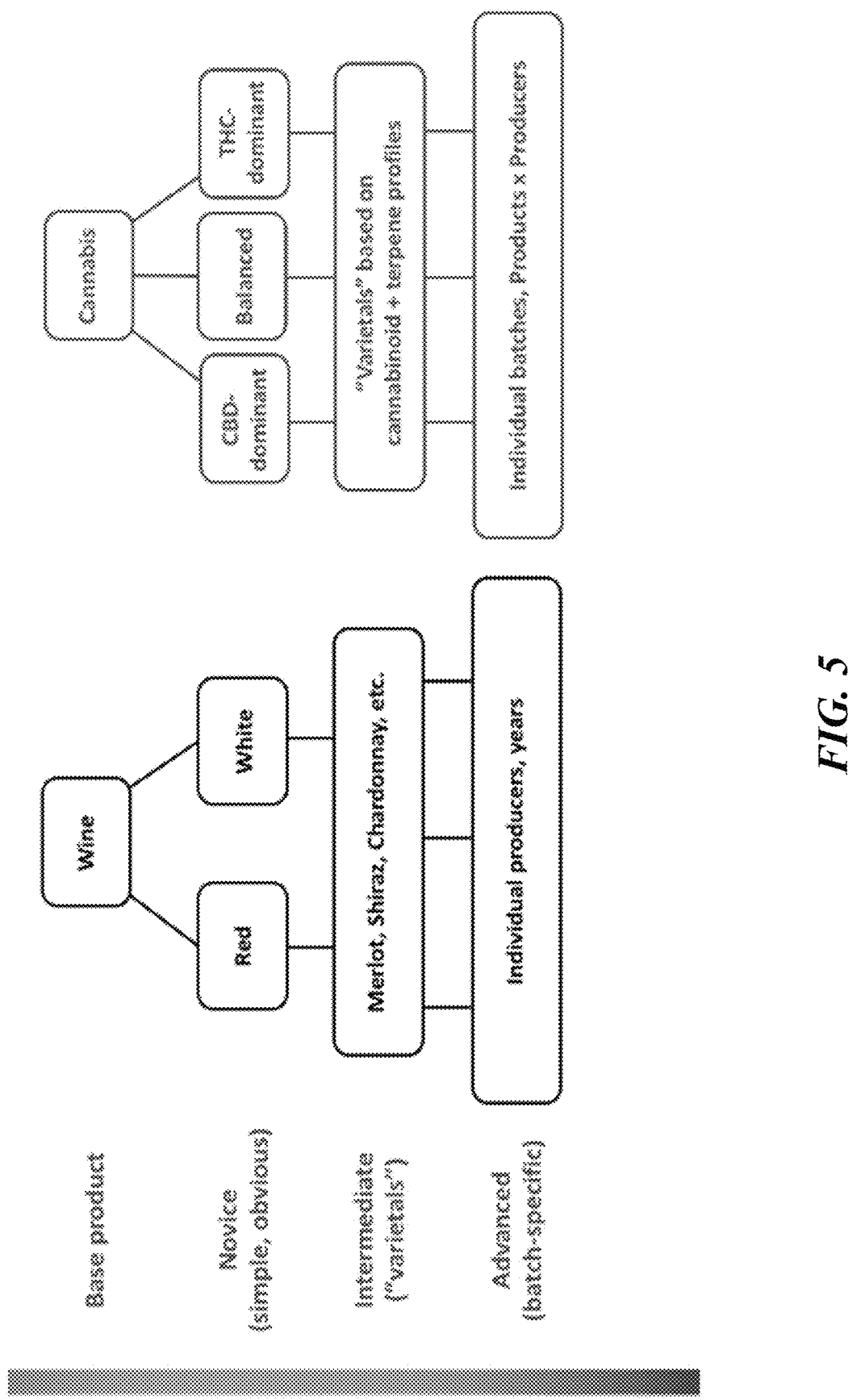
FIG. 5 is a sample decision tree represented by an embodiment of the present technology.

As seen in FIG. 5, the recommendation system 100 can classify and sub-classify strains of cannabis product in the same manner as wine, for example. Just as a wine can be categorized into white wine or red wine, and then further into the type of wine and the vintage, cannabis product can be categorized at many levels by its components, its effects, and its "vintage". The recommendation system 100 can be configured to classify cannabis products based on, for example, one or more of cannabis compound levels (e.g., CBD levels, THC levels, etc.), objective effects, subjective effects, therapeutic effects, non-therapeutic effects, or the like.

Figure 6:
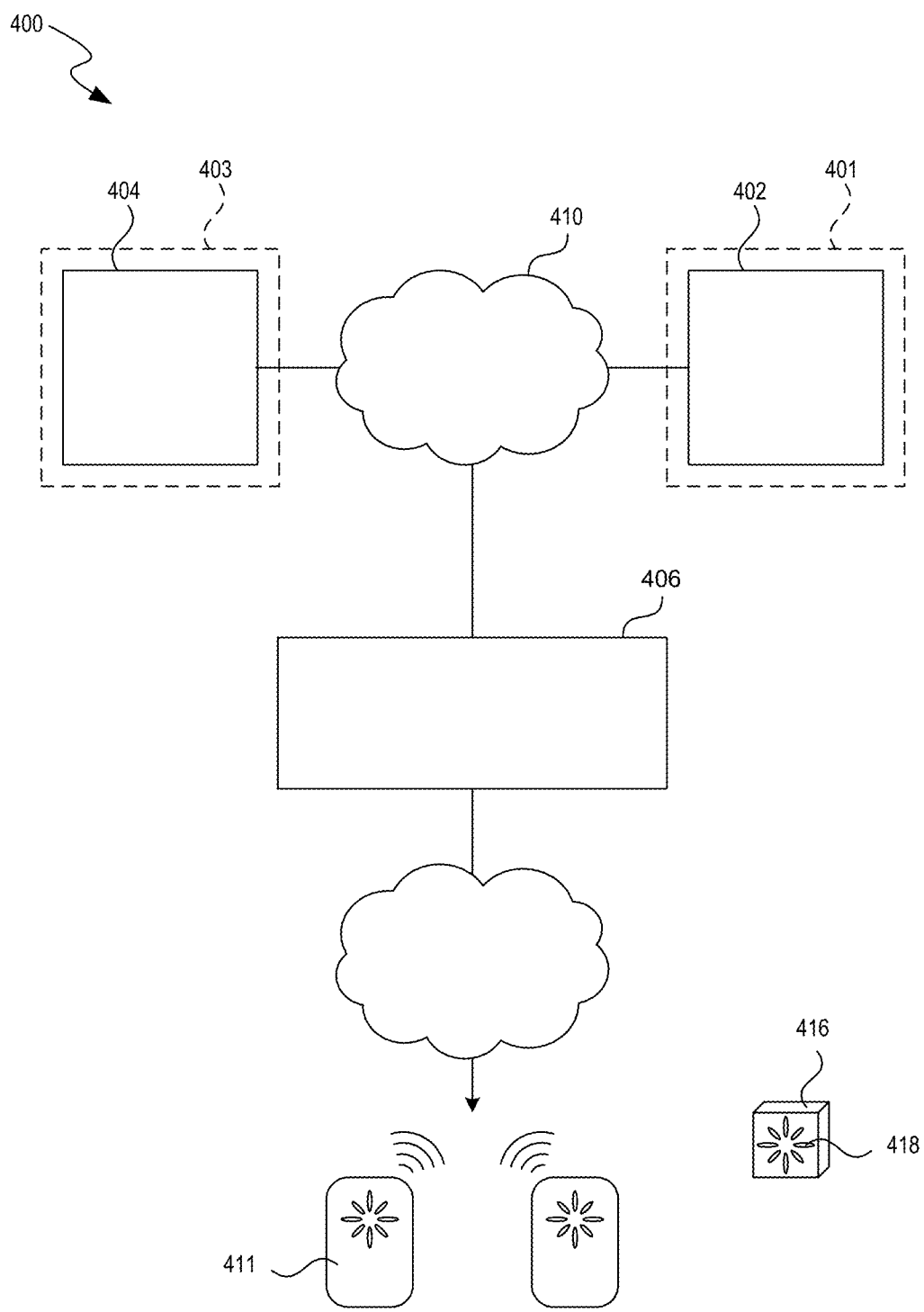
FIG. 6 is a block diagram of an example system for processing data in accordance with some embodiments of the disclosed technology.

FIG. 6 is a block diagram of an example system 400 for processing data in accordance with at least some embodiments of the disclosed technology. The system 400 can include a producer server computer 402, a lab server computer 404, and a data processing computer 406. The producer server 402 can communicate, via a network 410, with the lab server computer 404. The lab server computer 404 can communicate, via the network 410, with the data processing computer 406. The data processing computer 406 can receive, collect, generate, and/or store product data. The data can include, without limitation, recommendation, objective data, subjective data, chemical data, ingredient lists, administration mode data, or other data. The processing computer 406 can generate a visual representation 418 of a chemical profile for cannabis. The illustrated visual representation 418, illustrated as a flower-like color-coded symbols, is on a product 416. User devices 411 can receive and display the visual representation for viewing by a user. The user can assess the products based on the information provided by the visual representations. In some embodiments, the visualization can include both alphanumeric symbols and non-alphanumeric color/geometric encoded symbols. Example visual representations are discussed in connection with FIGS. 8-17B.

Each user device 411 can be a computer, a smart phone, a tablet, or other computing device capable of running one or more applications (e.g., an "app"). The user devices 411 can include a scanner, a camera, or other optical device identifying the visual representation 418. The visual representation 418 can be a two-dimensional color-coded identifier indicating information about the cannabis and can be applied to packaging. In some embodiments, the user devices 411 identify the visual representation 418 based, at least in part, on captured image data and then identify labels (e.g., labels on nuclei), analyze shapes and/or colors of discrete features of the visual representation 418 to determine composition data of the cannabis based, at least in part, on the color-coded cannabis strain indicator. The user devices 411 can store algorithms (e.g., segmentation algorithms, color-detection algorithms, edge detection algorithms, classifiers, etc.) for analyzing image data, databases (e.g., databases with chemical profiles, lab data, data conversion information, chemical information, etc.), lookup tables (e.g., label/strain tables, color tables, etc.), or the like. In some embodiments, the user device 411 identifies the label in the nucleus and then retrieves, via a local database or cloud database, stored chemical information associated with that label. For example, if user device 411 identifies the label "Bd," the user device 411 can retrieve corresponding chemical information for Blue Dream. In this manner, the user device 411 can determine chemical information based, at least in part, on stored data.

After identifying the visual representation 418, the user devices 411 can display (e.g., via a display screen) associated composition data, cannabis strain name, recommendations, etc. The user devices 411 can also display user interfaces configured to allow the user to enter information. The description of the user devices 110 of FIG. 1 applies to the user devices 411 of FIG. 6.

The user devices 411 can include memory that stores computer-executable instructions and one or more processors configured to execute the instructions to present at least one user interface. The user interface includes controls (e.g., selectable icons, fillable fields, etc.) usable to identify a color-coded cannabis strain indicator based, at least in part, on image data associated with cannabis. The user devices 411 can analyze shapes and colors of discrete features of the identified color-coded cannabis strain indicator to determine composition data of the cannabis. In other embodiments, the shapes and colors are analyzed via cloud-based applications.

The user devices 411 can display the determined composition data, cannabis names, recommendations, or the like. A user can download the app from an app store, for example, Apple iTunes (not shown). The app store can load a sequence of program instructions and other files onto the user device 411 directly or onto another computer that in turn loads the app onto the mobile devices. When the app is run, a programmed processor within the user device 411 executes the instructions to present a number of user interface (UI) screens to the user in which the user can operate the user device 411 and information can be entered, displayed, and passed back and forth between the user device 411 and the data processing computer 406.

With continued reference to FIG. 6, a producer 401 can be a grower, a refinery, an extraction company, a manufacturer, a packager, a distributor, or other supplier of product. The producer 401 can provide samples of cannabis to a lab 403. Information about the samples can also be communicated via the network 410. The lab 403 can analyze samples to generate sample data. The lab 403 can generate data using different techniques, including high-performance liquid chromatography, gas chromatography, mass spectrometry, or other types of chromatography or mass spectrometry techniques. The data can include chemical profiles, composition information, cannabinoid potency, terpenes levels, contaminates, residual solvent levels, or the like. For example, the lab 403 can also detect and generate data about pesticides, herbicides, fertilizers, heavy metals, or growth hormones in the sample.

Figure 7:
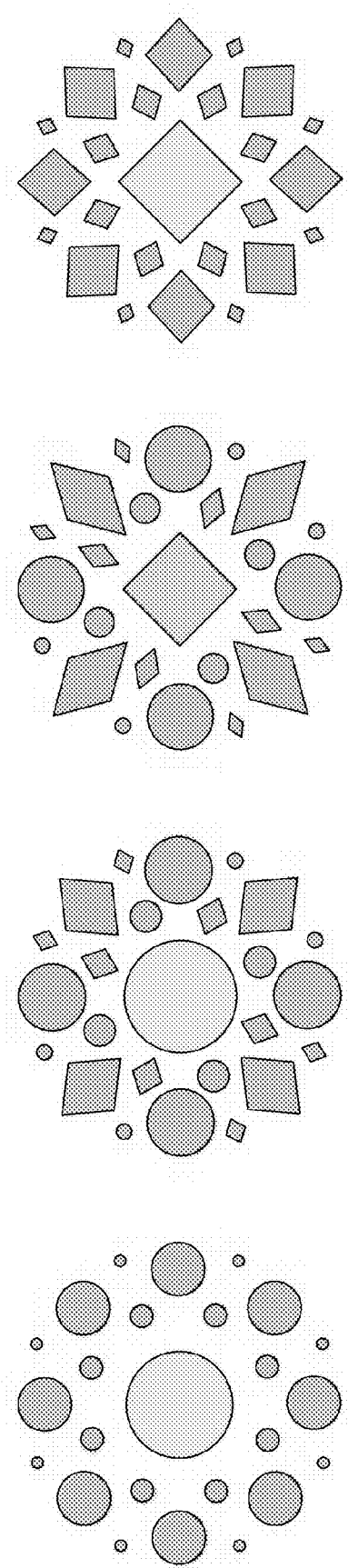
FIG. 7 shows a table with lab data in accordance with some embodiments of the disclosed technology.

FIG. 7 is an example table of lab data for cannabis in accordance with some embodiments of the disclosed technology. The table includes anonymized producer IDs. Producers can have the option of de-anonymizing data to the provider 406. The table includes a product category listing the type of sample to be analyzed. For example, illustrated table list data for flowers. A producer given strain name can be applied or assigned as an "original name." A distributor or dispensary can provide a matched strain name, such as Blue Dream. The table also includes a subset of raw lab measurements for THC, CBD, and terpenes. In the illustrated table, the producer 117 provided a flower sample that contained 17.8% THC (w/w), 0.14% CBD (w/w), 0.23% caryophyllene (w/w), 0.13% limonene (w/w), and 1.7% myrcene (w/w). If the flower sample is fresh (i.e., undried), the raw lab measurements could list THCA and CBDA rather than THC and CBD. For some cannabis products, the raw lab measurements could list THCA, THC, CBDA, CBD, and other terpenes not limited to ones listed in the table.

With reference again to FIG. 6, the cannabis data can be sent from the lab 403 to the data processing computer 406 via the network 410. The data can be anonymized, de-anonymized, encrypted, or non-encrypted. If the data is encrypted, the data can be decrypted and analyzed to generate visual representations for cannabis products. The data can also be used to generate educational materials, verify product quality, generate recommendations, and other information for users. In some embodiments, the data can be pre-processed by normalizing values, aggregating values, or the like. Strain names can be assigned to appropriate groups of cannabis. Clustering algorithms can be used to identify and remove outlier samples data. For each strain, data can be averaged for each producer/processor, aggregated and averaged across producers, or the like. Different techniques can be used to average sample data.

Figure 8:
FIG. 8 shows four visual representations in accordance with some embodiments of the disclosed technology.

FIG. 8 shows four visual representations in the form of color-coded identifier flowers in accordance with some embodiments of the disclosed technology. The shapes of elements forming the flower indicate cannabinoid characteristics for a particular strain of cannabis. The CBD-dominant visual representation has round elements only. FIG. 8 shows two THC-CBD-balanced visual representations, including a CBD-dominant Balanced and THC-dominant balanced. The CBD-dominant balanced visual representation has a round nucleus indicating CBD dominance and rings with both round and diamond elements indicating CBD/THC balance. The THC-dominant Balanced visual representation has a diamond-shaped central nucleus indicating THC dominance and rings with both round and diamond-shaped elements indicating CBD/THC balance. The THC dominant visual representation has diamond-shaped elements only.

The shapes and/or sizes of individual elements forming the visualization can indicate the levels of cannabinoids. For example, FIG. 9 shows a low THC visual representation with generally square-shaped elements. A high THC visual representation has slender diamond-shaped elements. FIG. 10 shows two visuals representations in accordance with some embodiments of the technology. A low CBD visual representation has small circular elements. A high CBD visual representation has relatively large circular elements. As such, the sizes of elements can encode information about cannabinoid levels.

Figure 11C:
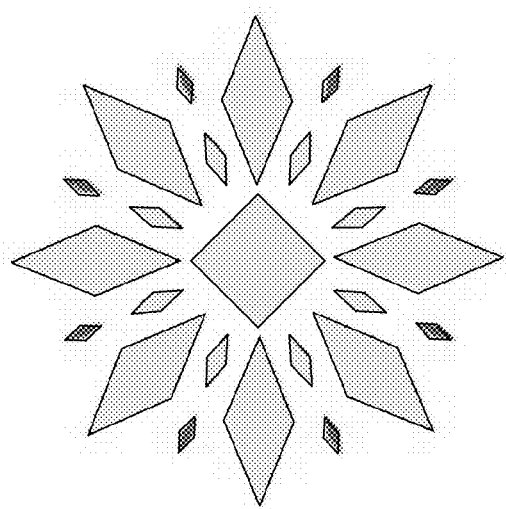
FIGS. 11A-11C show primary, secondary, and tertiary rings of a visual representations in accordance with some embodiments of the disclosed technology.
Figure 11B:
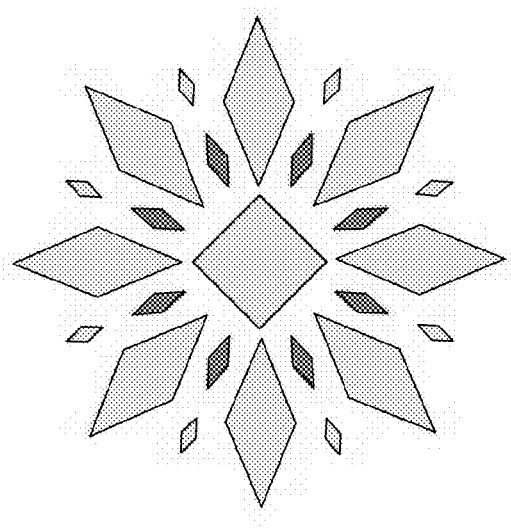
Figure 11A:
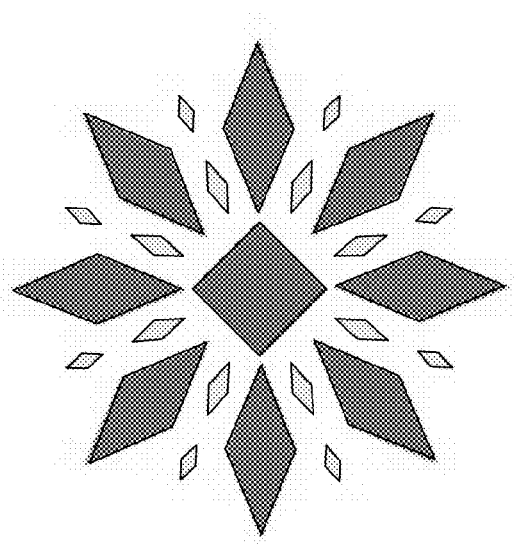

FIGS. 11A-11C show colored rings of a visual representation in accordance with some embodiments of the disclosed technology. FIG. 11A shows the color of the primary ring can match the color of the nucleus. The color of the primary ring corresponds to the most abundant terpene with diamond-shaped elements in a circular pattern. FIG. 11B shows the color of the second ring corresponding to the second most abundant terpene. The elements in the second terpene ring are arranged in a second circular pattern that is different from the first circular pattern. In the illustrated embodiment, the second terpene ring has a smaller diameter than the primary ring. FIG. 11C shows the color of the tertiary ring corresponding to the third most abundant terpene.

Figure 12:
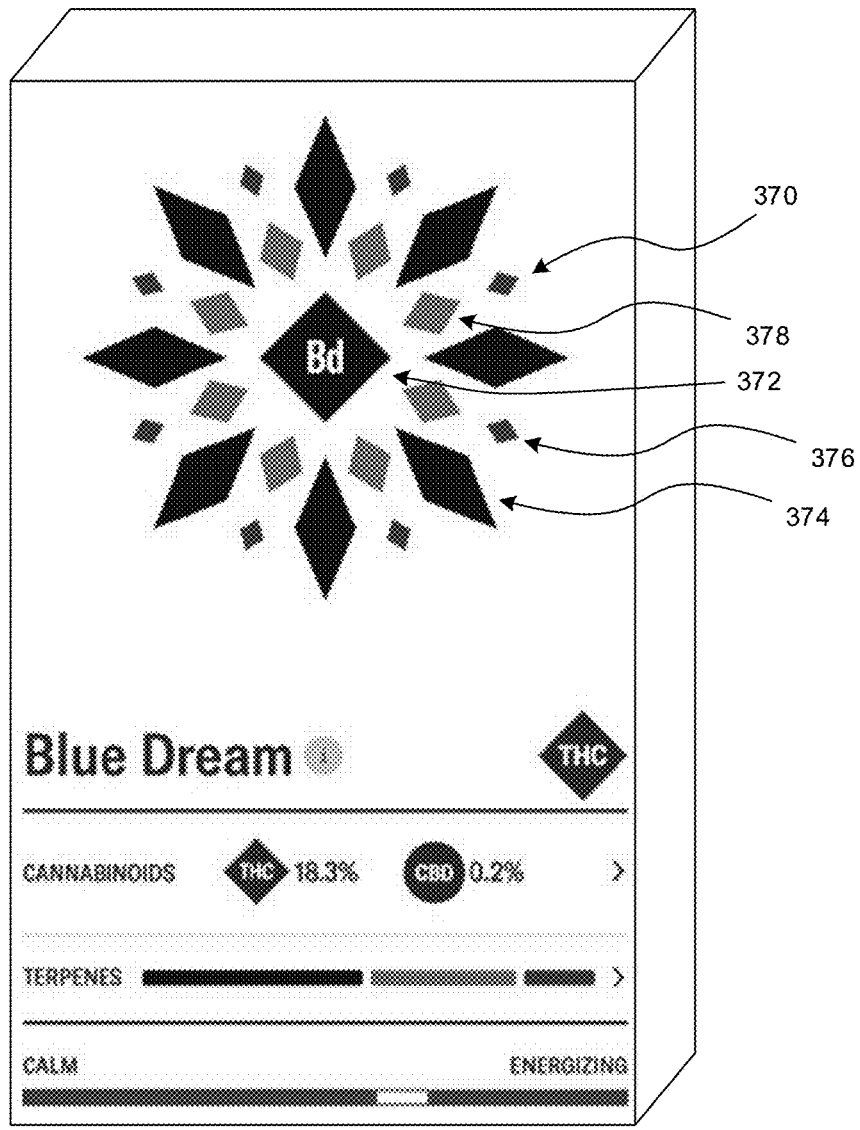
FIG. 12 shows a labelled product with a visual representation of a strain of cannabis in accordance with some embodiments of the disclosed technology.

FIG. 12 shows a labelled product with packaging and a visual representation 370 in accordance with some embodiments of the disclosed technology. The visual representation can be a flower-shaped symbol that is color-coded to provide information about the product. Product information can be determined based on visual inspection of the flower-shaped symbol. The flower-shaped symbol can be optically machine-readable by, for example, a smartphone, a camera, or the like, as discussed in connection with the user devices of FIG. 6. A printer can print machine-readable flower-like symbols on labels, stickers, or directly onto packaging.

The product information on the product can include chemical data (e.g., chemical profiles of significant or selected compounds), dominant cannabinoid, subjective data, objective data, or combinations thereof. For example, if a customer wants to purchase a new product similar to a preferred product, the customer can compare the flower-shaped symbols to determine which new product has a similar flower-shaped symbol.

The illustrated color-coded identifier flower 370 includes a nucleus 372 with a shape indicating a primary cannabinoid of the cannabis of the "Blue Dream" strain. The dominant cannabinoid is THC, so the nucleus has a polygonal shape, illustrated as a diamond shape. Each terpene ring 374, 376, 378 has a color selected to indicate a distinct terpene in the cannabis and a configuration selected to indicate an amount of the distinct terpene in the cannabis. The shape of the primary ring 374 corresponds to the dominant cannabinoid. In some embodiments, the shape of the elements in the primary ring can reflect a secondary cannabinoid if the cannabinoid is present at a threshold level. The threshold level can be selected based on criteria for identifying balanced cannabis. The Blue Dream strain has three significant terpenes, so it is represented by a multi-color flower. The primary ring color reflects the highest content terpene by weight and has the largest diamond elements. In the illustrated embodiment, the primary terpene is blue indicating myrcene. The secondary ring color of green reflects a secondary terpene, illustrated as pinene. The tertiary ring color of purple reflects a tertiary terpene, illustrated as caryophyllene. Example colors assigned to terpenes are discussed in connection with FIG. 30.

Figure 13:
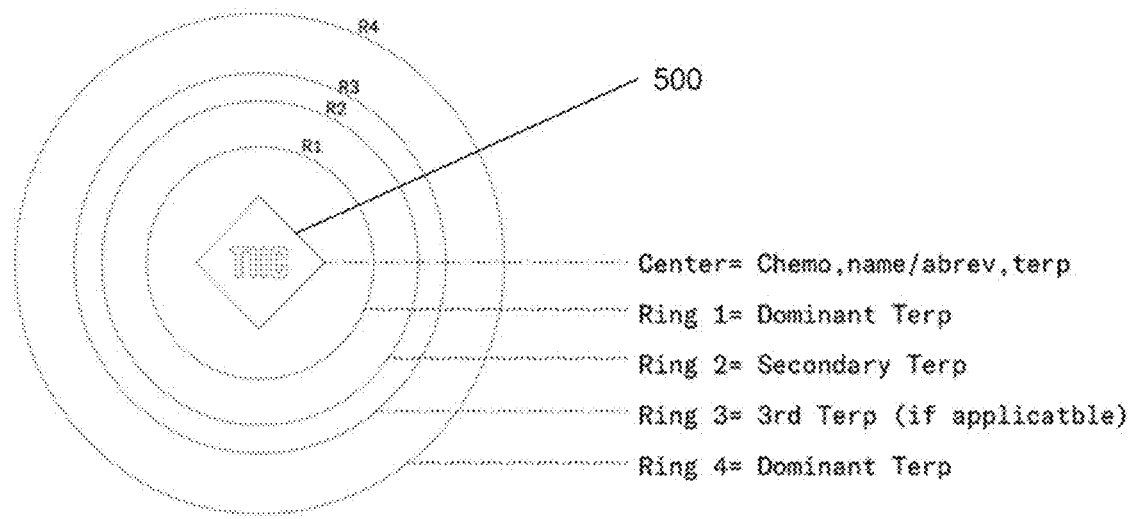
FIG. 13 shows visualization logic utilized by an embodiment of the disclosed technology.

As seen in FIG. 13, a visualization logic used to create visual representations for individual products (a specific producer-processors product), groups of products (e.g., products with similar or identical characteristics), and/or "strains" (composed of data aggregated across product lines sharing the same lab). Strain data can be analyzed to determine whether the cannabis is, for example, THC dominant, CBD dominant, or THC-CBD balanced based on a predetermined ratio range. If the cannabis is determined to be THC-dominant, the systems can assign a shape representing THC to the cannabinoid symbol and both the first symbols and the second symbols. If the cannabis is determined to be CBD-dominant, the systems can assign a shape representing CBD to the cannabinoid symbol and both the first symbols and the second symbols. If the cannabis is determined to be THC-CBD balanced, the systems can assign a shape representing THC to least some of the first symbols and a shape representing CBD to at least some of the second symbols.

Figure 14:
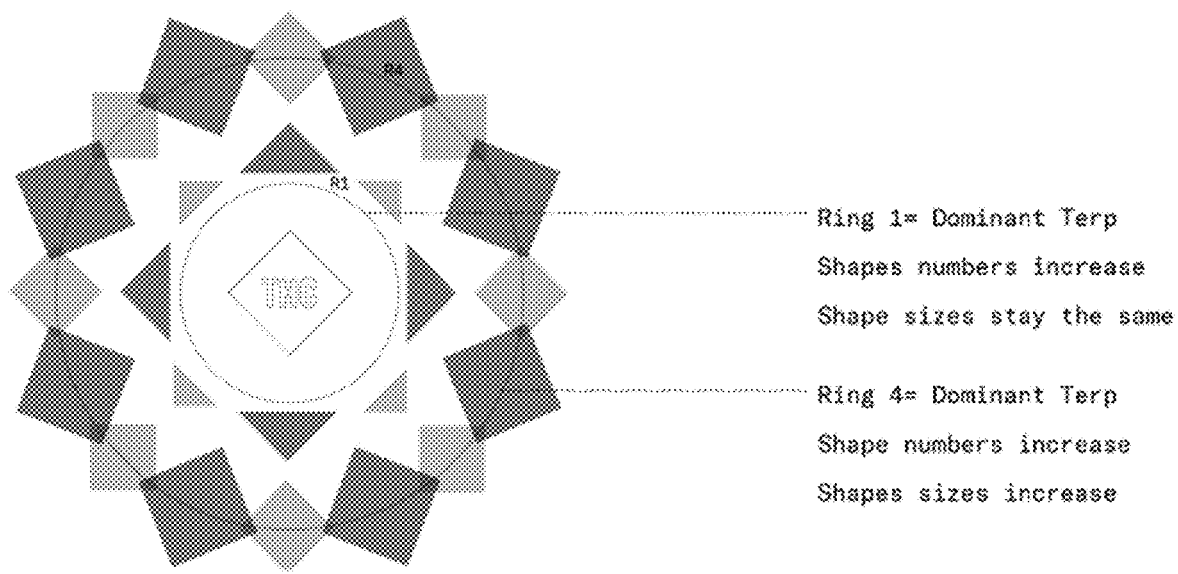
FIG. 14 is a further detailed visualization logic as seen in FIG. 13.
Figure 15:
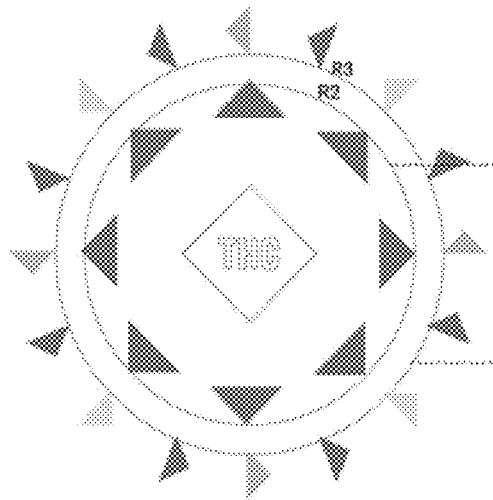
FIG. 15 is an alternate further detailed visualization logic in accordance with some embodiments of the disclosed technology.
Figure 16:
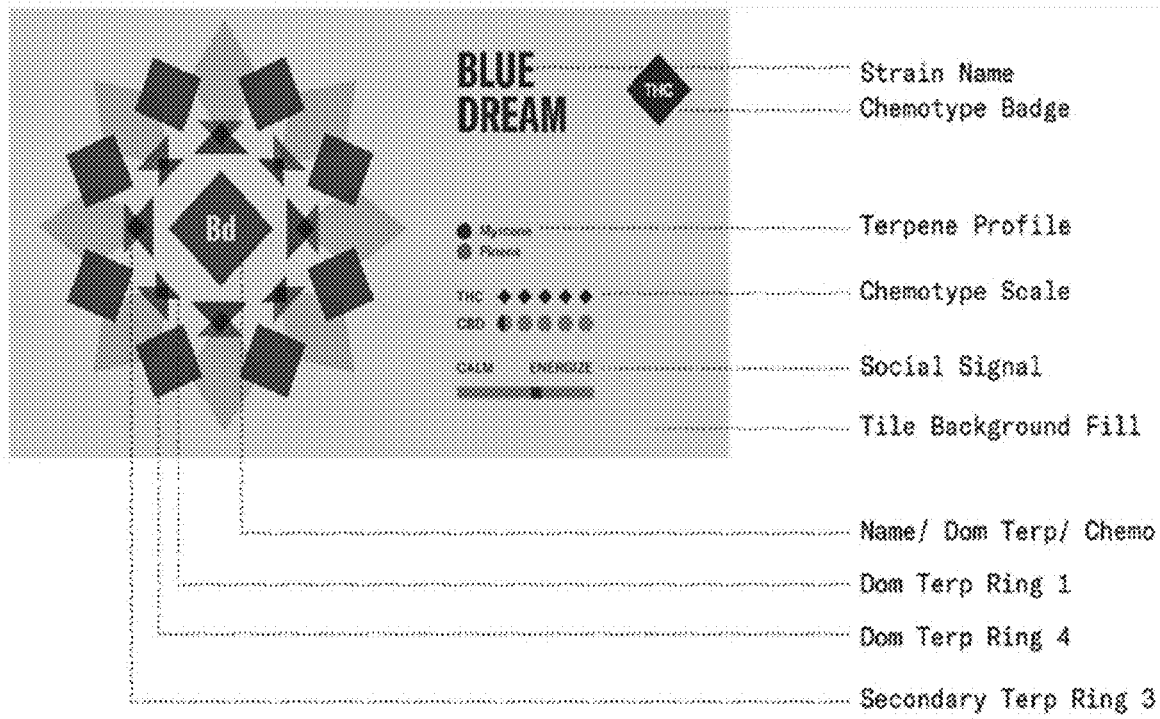
FIG. 16 is a further detailed visualization logic as seen in FIG. 14.

In some embodiments, the visual representations can have a highest-level grouping for a cannabis product that can be based on the cannabinoid profile (e.g., THC-dominant, CBD-dominant, or Balanced), and can be represented by central shape or symbol 500. As seen in FIG. 13, this shape 500 is located at the center of the visualization, and in the example provided, the highest-level grouping of the cannabis product is identified as THC-dominant. Next, additional rings (e.g., R1, R2, R3, R4, etc.) can be added to the central shape 500, with the number of additional rings preferably determined by the total number of "significant" secondary compounds for that product. For example, the secondary compounds can be terpenes, and once the number of significant terpenes is identified and additional rings are added to the visualization logic, additional shapes (e.g., S1, T1, etc.) can be populated along these rings, as shown in FIGS. 14-16. The shapes S1, T1 themselves can represent different types of features of the highest-level grouping of the product seen in the central shape 500. For example, rectangular shapes with sharp edges and rounded shapes can represent THC and CBD content of the product, respectively. The colors of the shapes can be dictated by major terpenes present in the product.

The example visualization logic seen in FIGS. 14 and 15 are complementary, with FIG. 14 highlighting rings R1 and R4, while FIG. 15 highlights rings R2 and R3 of the same visualization logic. In the visualization logic, rings R1 and R4 can both encode information about the dominant terpene, which also dictates the dominant+background color of each visual. The discrete symbols can be congruent to one another and the rings can have radial symmetry. Rings R2 and R3 preferably encode information about secondary and tertiary terpenes, where applicable. Therefore, like the example visualization logic set forth in FIGS. 14 and 15, all or most of the visualization logics for product characterizations and recommendations can comprise rings designating dominant terpenes, with optional additional rings representing additional secondary and/or tertiary (etc.) terpenes.

Further, in the visualization logic seen in the Figures, shape, size, and color are related to the levels of a given terpene. More specifically, the length and width of the shapes surrounding the central shape can be determined by THC and CBD levels. In the example visualization logic set forth in FIGS. 12-16, higher THC or CBD levels result is more elongated rectangular or oval shapes, respectively. For example, a product with very high THC levels will have long, thin rectangular shapes that appear "pointy," whereas a product with low THC levels will contain rectangular shapes that appear less elongated and more square. Products containing THC and little or no CBD contain only rectangular shapes, products with CBD and little or no THC contain only rounded shapes, and products with a mixture of THC and CBD contain both kinds of shapes. Each shape can be either a full or half shape (e.g., full square vs. a half square). The fullness and total number of shapes is determined based on the levels of that product's major terpenes. Of course, alternative visualization logic sets can be used in accordance with a system or user preference. Different techniques can be used to determine shapes of spaced apart elements of the terpene rings based on the number of cannabinoids and cannabinoid levels in the cannabis.

As seen in the example of FIG. 15, the color-coding of each visualization is based on that products terpene profile, with the primary color determined by the "dominant" terpene, e.g., the terpene present and the highest levels. In this example visualization logic, each of the major terpenes is represented by a unique color, and each product represented by a visualization logic contains a subset of these colors based on its particular composition.

Figure 17A:
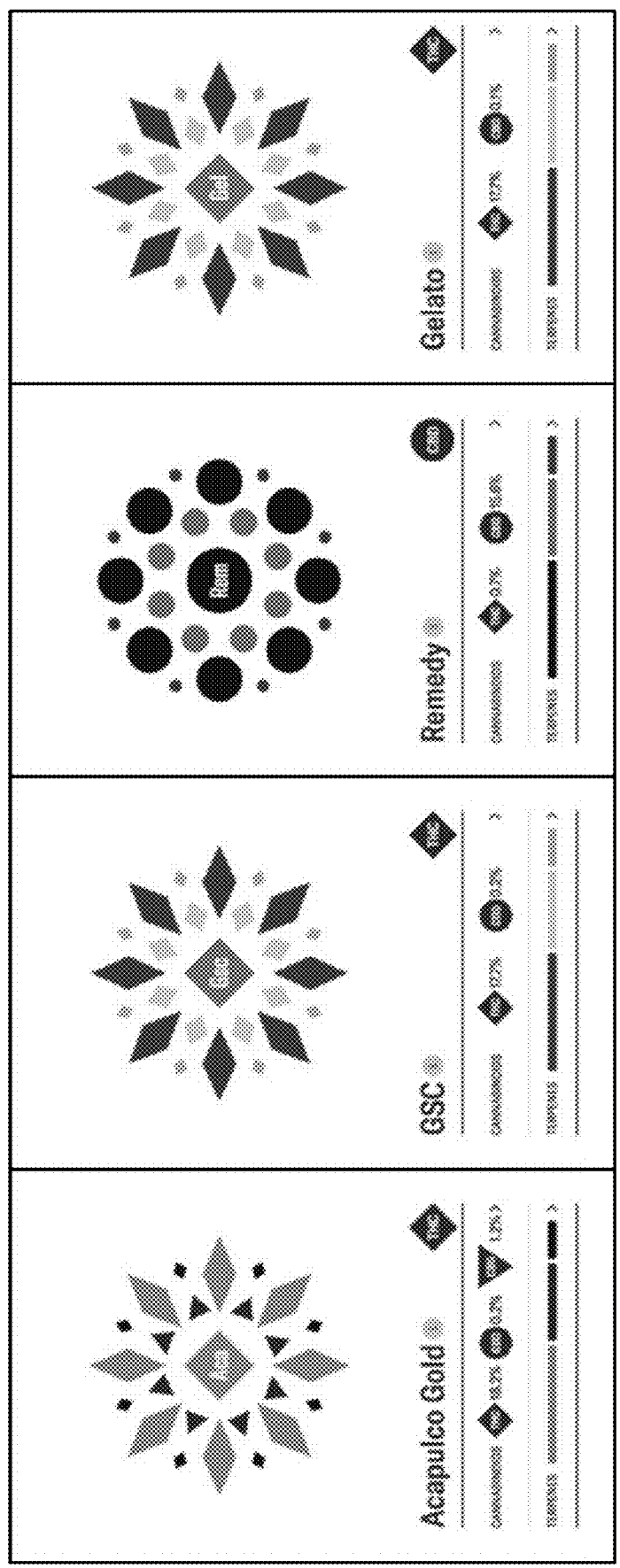
FIG. 17A shows information for four strains of cannabis in accordance with an embodiment of the disclosed technology.

A user can quickly compare strains at a glance. For example, FIG. 17A shows four different strains. The relatively low THC level in the Remedy strain can be determined based on the circular nucleus and circular ring elements in contrast to high THC levels in the other three strains. The identifier flower can be generated based on raw lab data, processed lab data, or combinations of both. If the raw lab data is for fresh cannabis, the data can indicate THC-A and CBD-A levels. The raw data can be converted (e.g., by the merchant, lab, or recommendation system) to THC and CBD levels relevant to usage. The conversion can be performed assuming full decarboxylation (i.e., full decarboxylation upon heating or drying of the cannabis flower) of THC-A to THC and CBD-A to CBD by applying a standard calculation accounting for the difference in molecular weight of these compounds. In some embodiments, the lab can convert fresh flower data (e.g., THC-A levels, CBD-A levels, etc.) to processed data (e.g., THC levels, CBD levels, etc.), which is provided to merchants, by applying the standard calculation. In some embodiments, the lab can provide raw data to the merchant or another entity, and the merchant or another entity can convert fresh flower data to processed data by applying the standard calculation. The processed data can be, for example, estimations of chemical profiles (e.g., THC levels, CBD levels, etc.) based on raw chemical profiles (e.g., THC-A levels, CBD-A levels, etc.). The identifier flower can reflect the total cannabinoids. For example, data for raw flower products can show mostly THC-A, CBD-A, etc. The raw data can be converted based on decarboxylation ("activation") to determine a total Cannabinoid levels. A total THC amount can be equal to a THC-A amount multiplied by 0.877 added to a THC amount (i.e., Total THC=THC+0.877*THC-A). Other conversion calculations can be used.

Figure 17B:
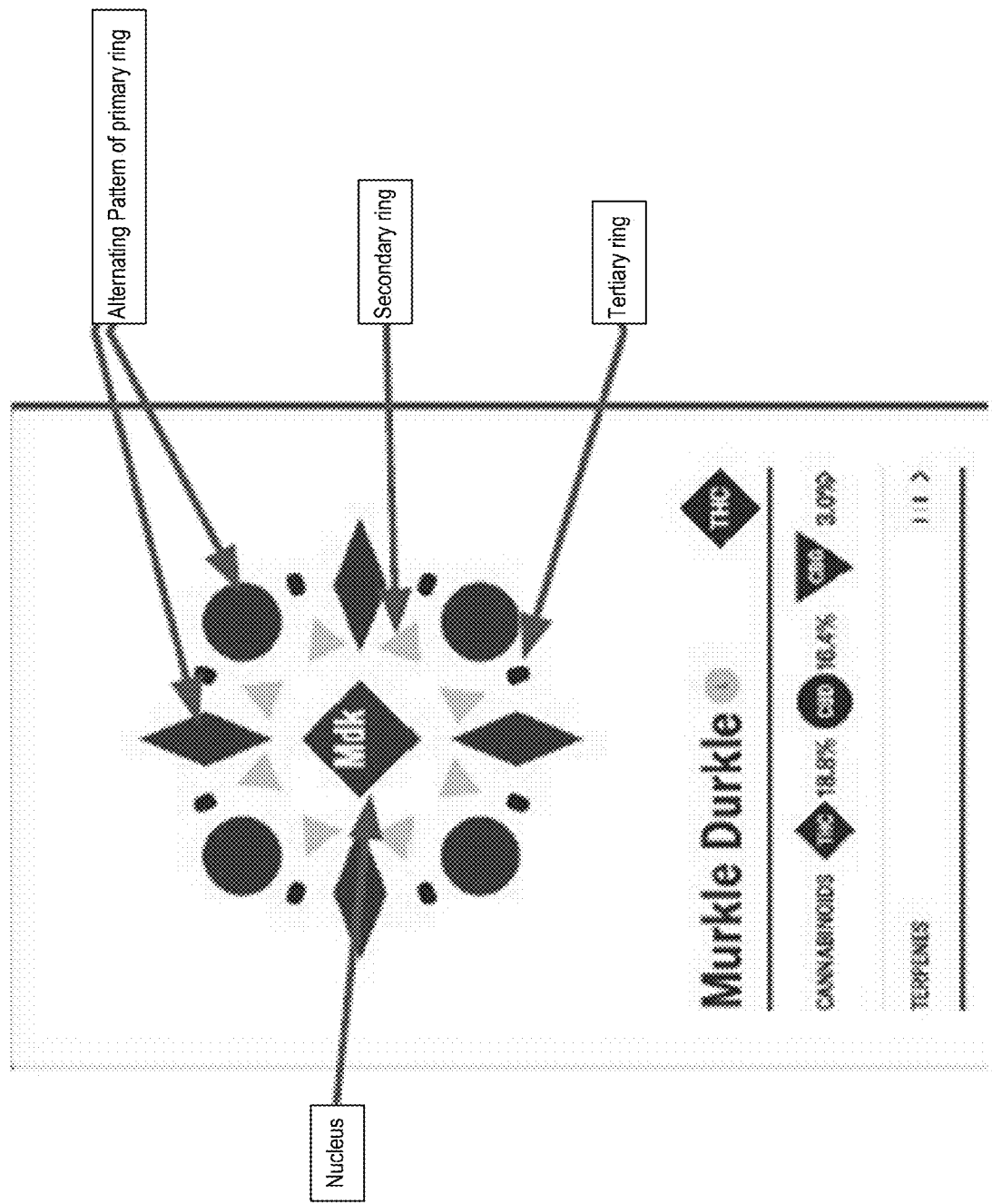
FIG. 17B shows information for a complex strain of cannabis in accordance with an embodiment of the disclosed technology.

FIG. 17B shows the primary terpene ring with an alternating pattern of diamond elements (indicating THC) and circular elements (indicating CBD). The secondary ring includes elements with triangular-shaped elements indicating CBG. The elements in a ring can be geometrically congruent and equally sized, and their shapes, patterns, and spacing (e.g., evenly or unevenly spaced arrangement) can be used. The identifier flowers can also provide other information. For example, the identifier flower can have rings indicating non-terpene compounds. In some embodiments, the color-coded identifier flowers have one or more terpene rings and one or more non-terpene rings (e.g., non-cannabinoid phenol rings, flavonoid rings, flavor enhancer rings, etc.). An identifier flower for an edible product may have no terpene rings and may or may not have other rings (e.g., flavonoid rings). In other embodiments for edibles, the identifier flower can have terpene rings, as well as other rings (e.g., flavonoid rings). In some embodiments, the rings may indicate other elements, such as method of delivery (e.g., edible, topical, nasal spray, beverage, etc.), therapeutic effects (e.g., migraine relief, muscle pain relief, etc.), or non-therapeutic effects (e.g., psychoactive and non-psychoactive properties).

Figure 17C:
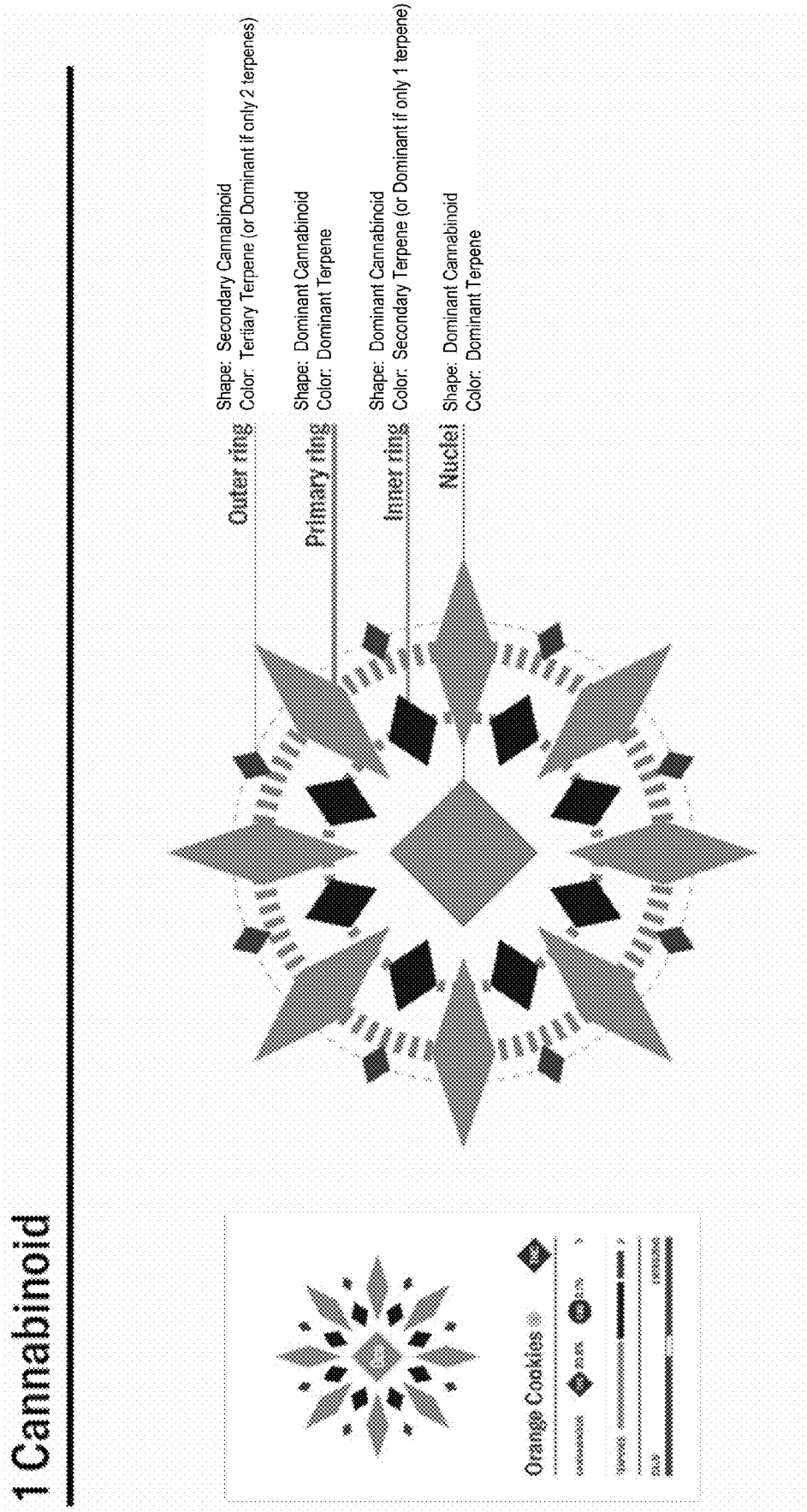
FIGS. 17C-17F show visualization logic information for cannabis in accordance with embodiments of the disclosed technology.
Figure 17D:
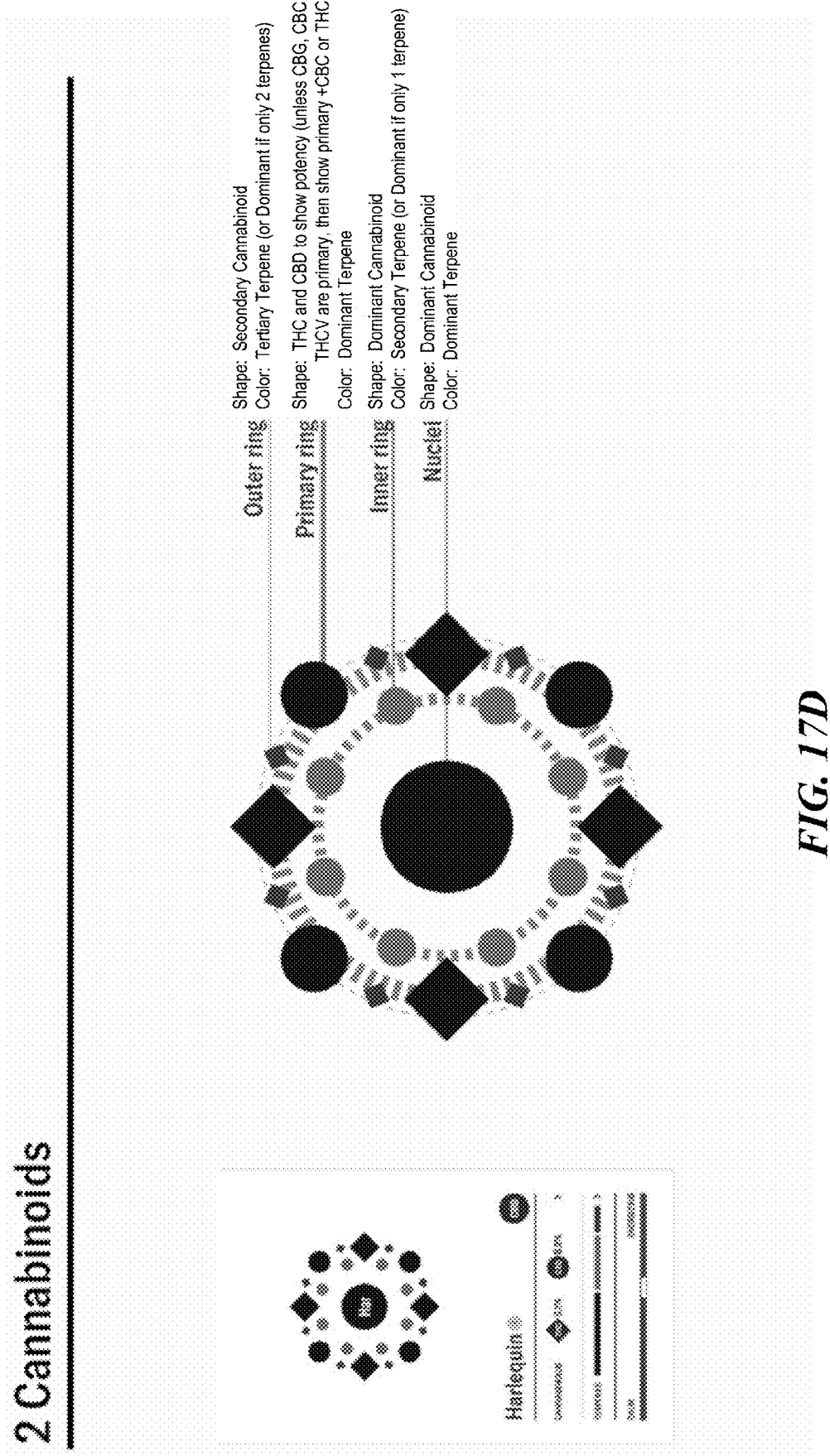
Figure 17E:
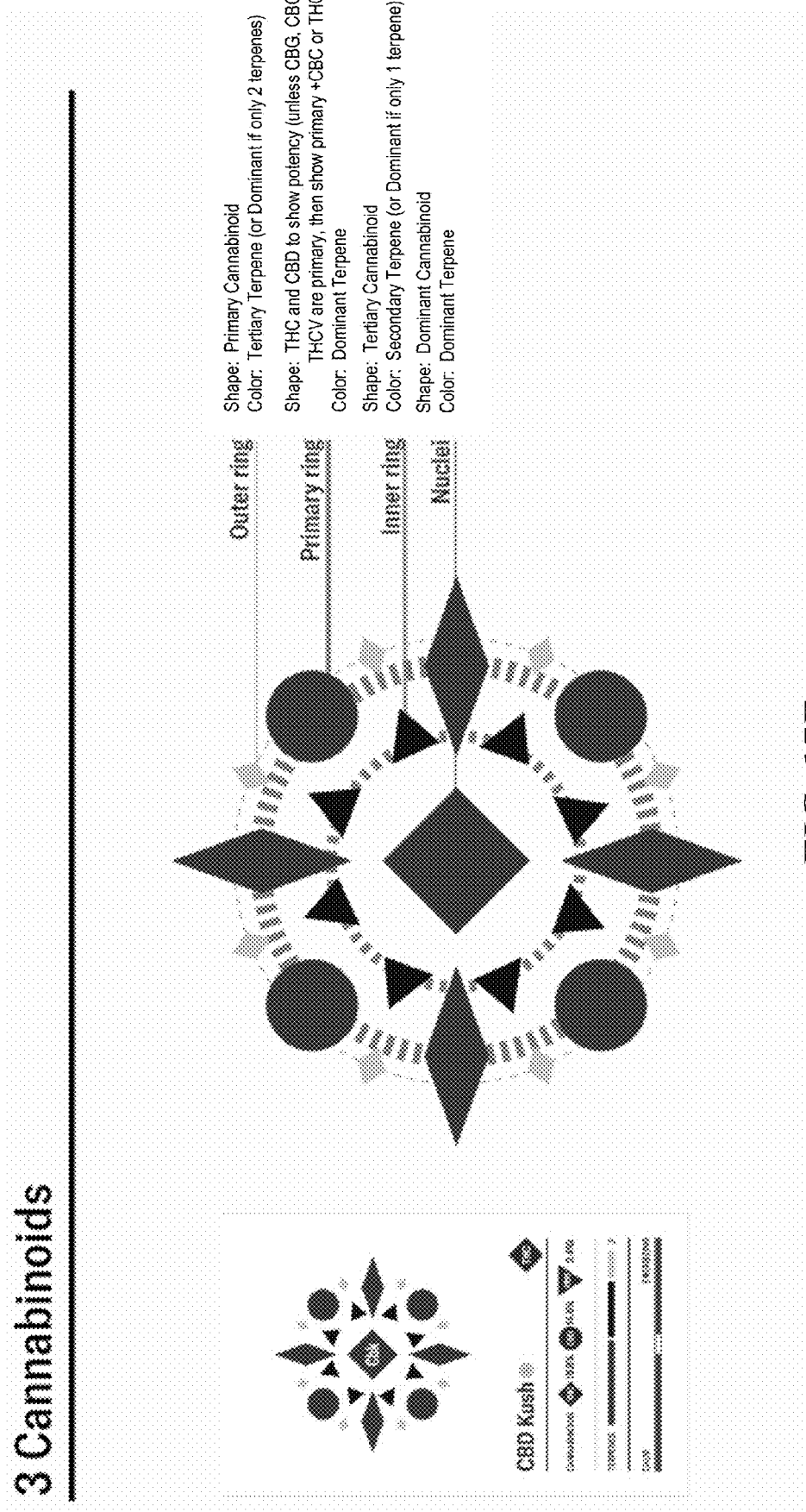

FIGS. 17C-17E shows logic information for strains of cannabis in accordance with an embodiment of the disclosed technology. (The gray elements indicate spacing.) FIG. 17C shows a strain of cannabis (Orange Cookies) with one primary cannabinoid, illustrated as THC. The nuclei, primary ring, inner ring, and outer ring each include a shape corresponding to the most abundant cannabinoid (THC). The nucleus includes a color corresponding to the most abundant terpene. The primary ring is a color corresponding to the most abundant terpene and is represented by the largest diamond shape out of the three diamond shapes. The inner ring is a color corresponding to the second most abundant or dominant terpene and is represented by the second largest diamond shape. The outer ring is a color corresponding to the third most abundant or dominant terpene and is represented by the smallest diamond shape.

FIG. 17D shows a strain of cannabis (Harlequin) with two primary cannabinoids, illustrated as balanced THC and CBD. The nucleus includes a shape corresponding to the most abundant cannabinoid (CBD) and a color corresponding to the most abundant terpene. The primary ring includes one color representing the most abundant terpene and two shapes indicating both THC and CBD for balanced THC and CBD. The inner ring includes the shape of the most abundant cannabinoid along with the color of the second most abundant or dominant terpene. The outer ring includes the shape of the secondary cannabinoid along with the color of the third most abundant or dominant terpene.

FIG. 17E shows a strain of cannabis (CBD Kush) with three primary cannabinoids. The nucleus includes a shape corresponding to the most abundant cannabinoid and a color corresponding to the most abundant terpene, and follow the similar method for generating flower representations, such as in FIG. 17D. However, only two shapes indicating the top two most abundant cannabinoids are shown in the primary ring. The inner ring includes the shape of the third most abundant cannabinoid and the color of the secondary or dominant terpene. The outer ring includes the shape of the most abundant cannabinoid (CBD) and a color corresponding to the tertiary or dominant terpene.

Figure 17F:
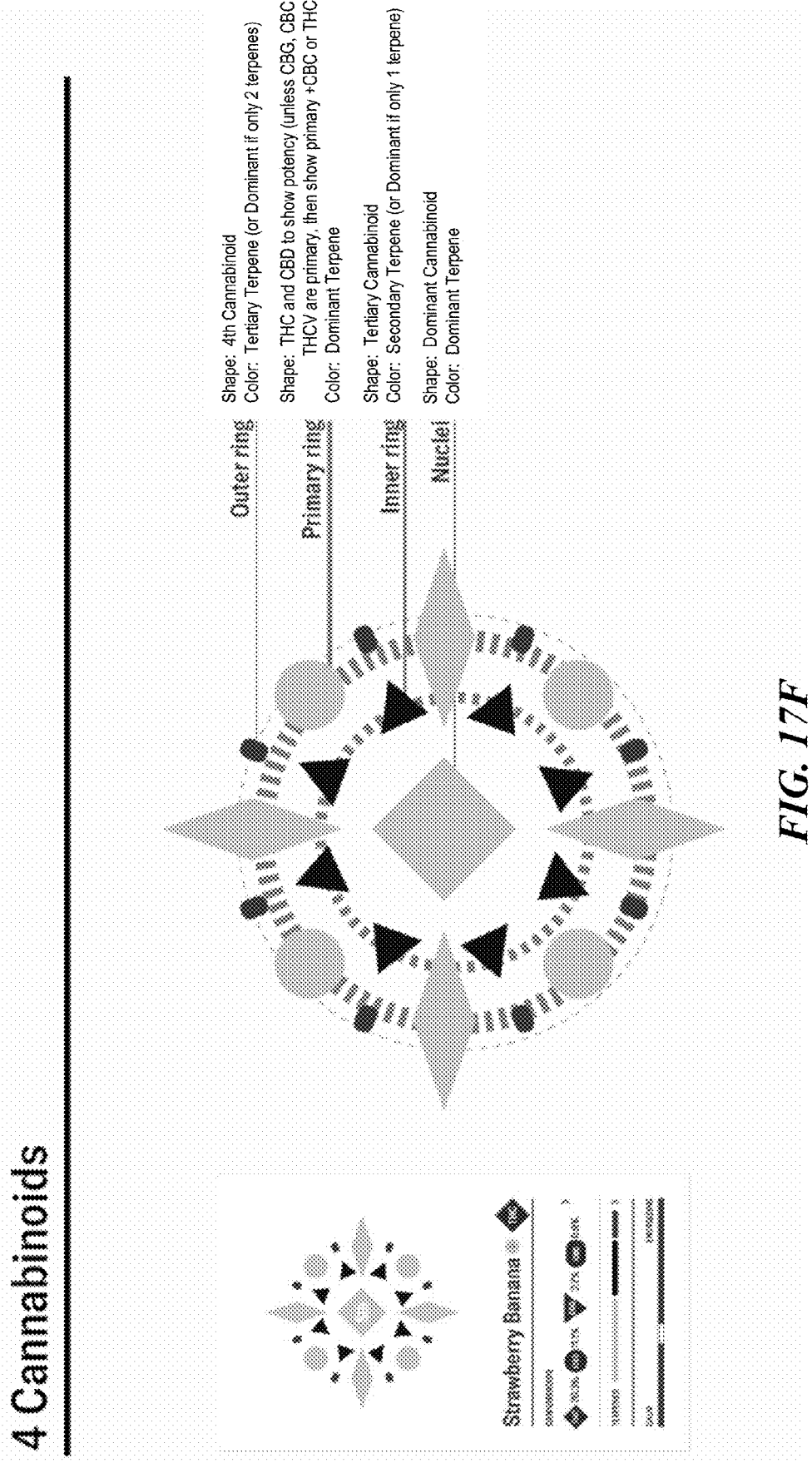

FIG. 17F shows a strain of cannabis (Strawberry Banana) with four primary cannabinoids. In this figure, the nuclei, similar to the embodiments disclosed herein, includes a shape corresponding to the most abundant cannabinoid and a color corresponding to the most abundant terpene. The nucleus, primary ring, and inner ring follow a similar method for generating flower representations as in FIG. 17E. However, the outer ring includes the shape of the fourth abundant cannabinoid and a color corresponding to the tertiary or dominant terpene. The logic disclosed herein can be used to generate flowers for any number of cannabinoids.

Figure 18:
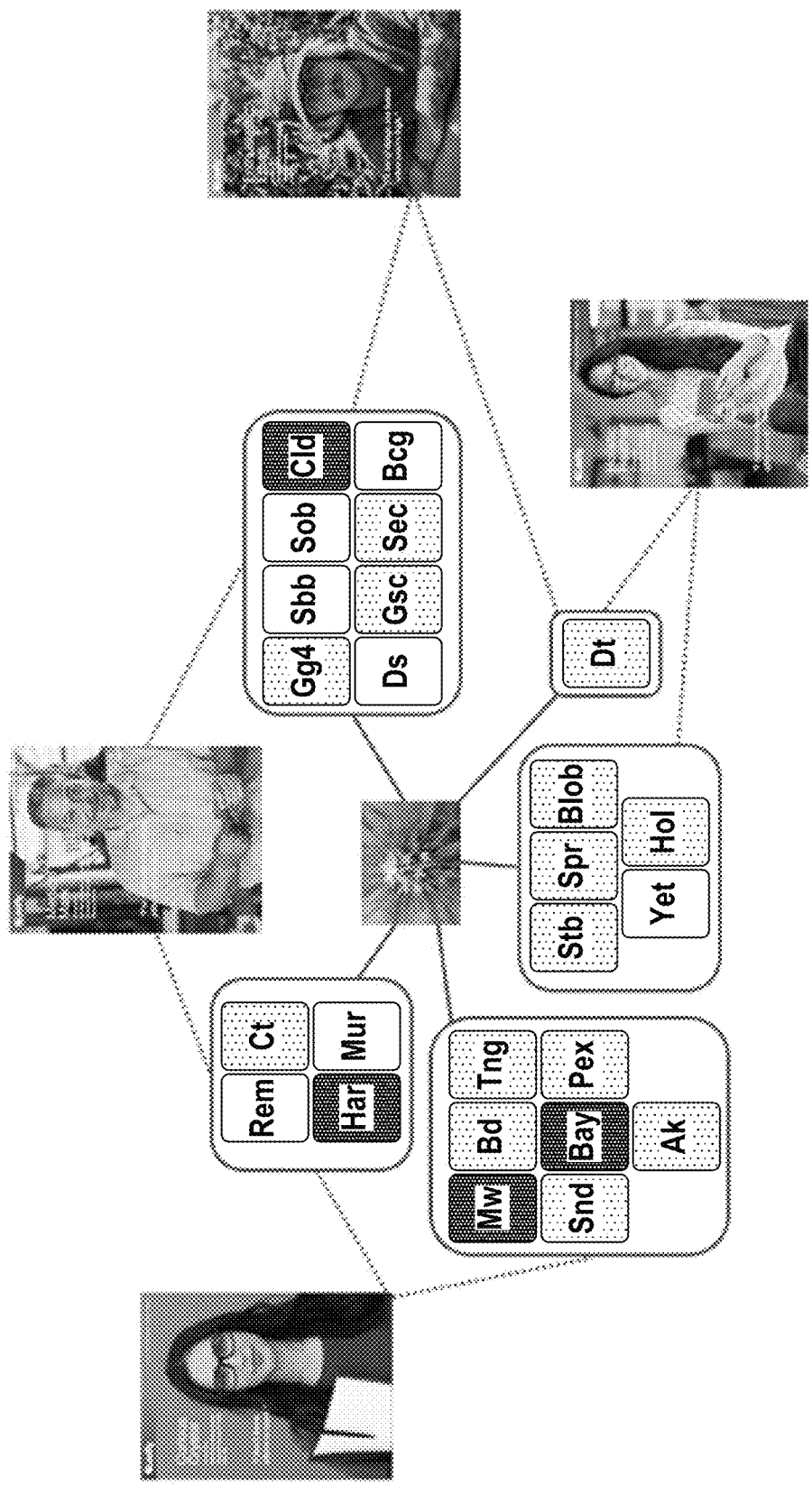
FIG. 18 is sample user-specific output of the recommendation system in accordance with an embodiment of the disclosed technology.

This hierarchical system of organization and visualization, based on objective lab data measurements of the composition of cannabis products (e.g., data from the lab 403 of FIG. 6), also serves as the basis of the recommendation system. In response to simple user inputs (e.g., questions about their desired psychoactive effects), users can be recommended to try products within distinct groupings in the hierarchy. An example of the manner in which products are recommended to users based the classification model can be seen in FIG. 18.

Figure 19:
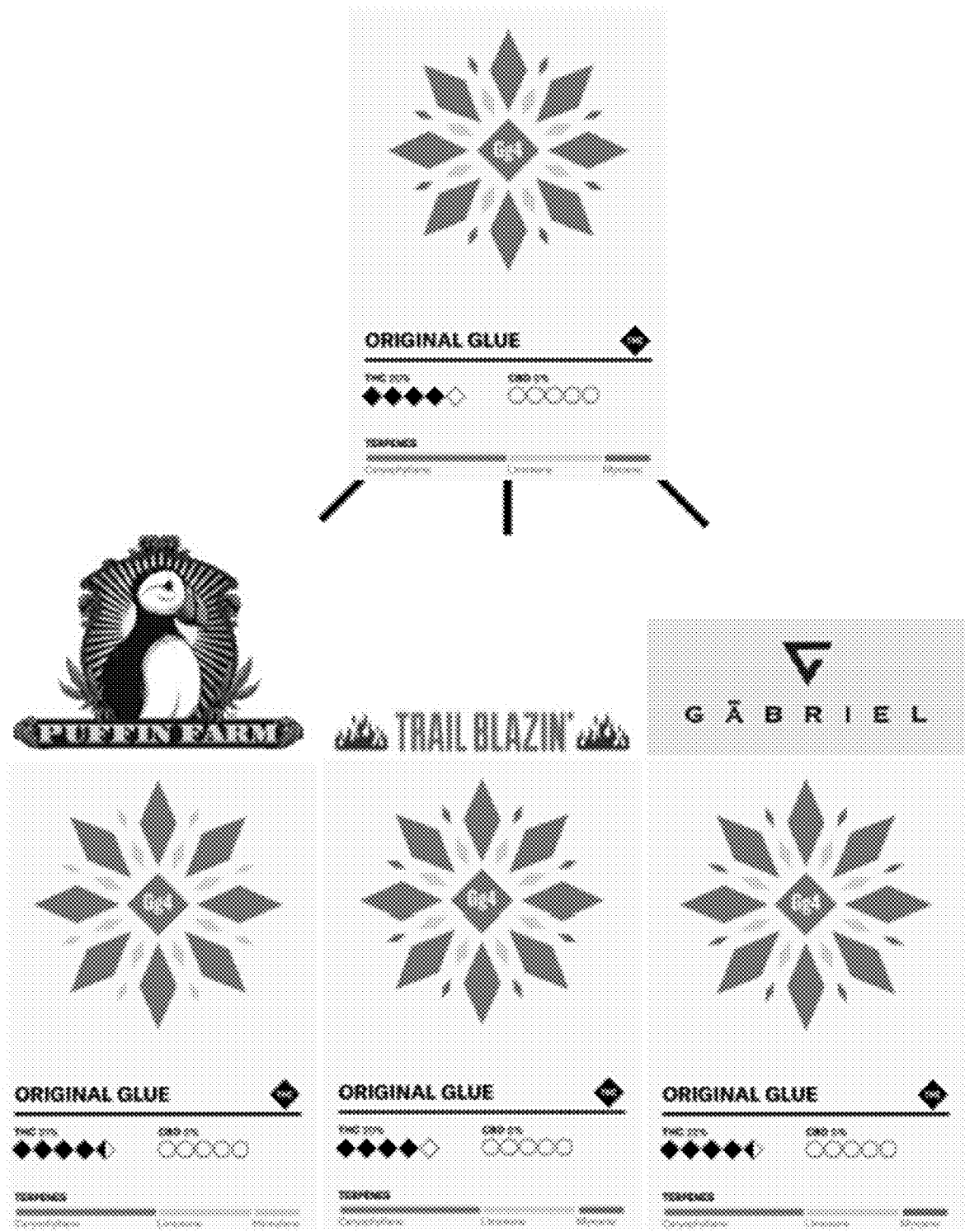
FIG. 19 shows how products from different suppliers can be grouped in accordance with an embodiment of the disclosed technology.

FIG. 19 shows products from different suppliers (e.g., Puffin Farm, Trail Blazin', and Gabriel) grouped together. In the illustrated embodiment, the "Original Glue" strains have generally the same level of THC. For example, the THC percentage can be within a predetermined range (e.g., 18-25%). The CBD level can be below a threshold level, such as 1%. The data of the three cannabis samples can be averaged to generate the Original Glue data, visualizations, etc. The criteria for a particular branded strain can be selected based on how similar the strains should be to one another.

Figure 20:
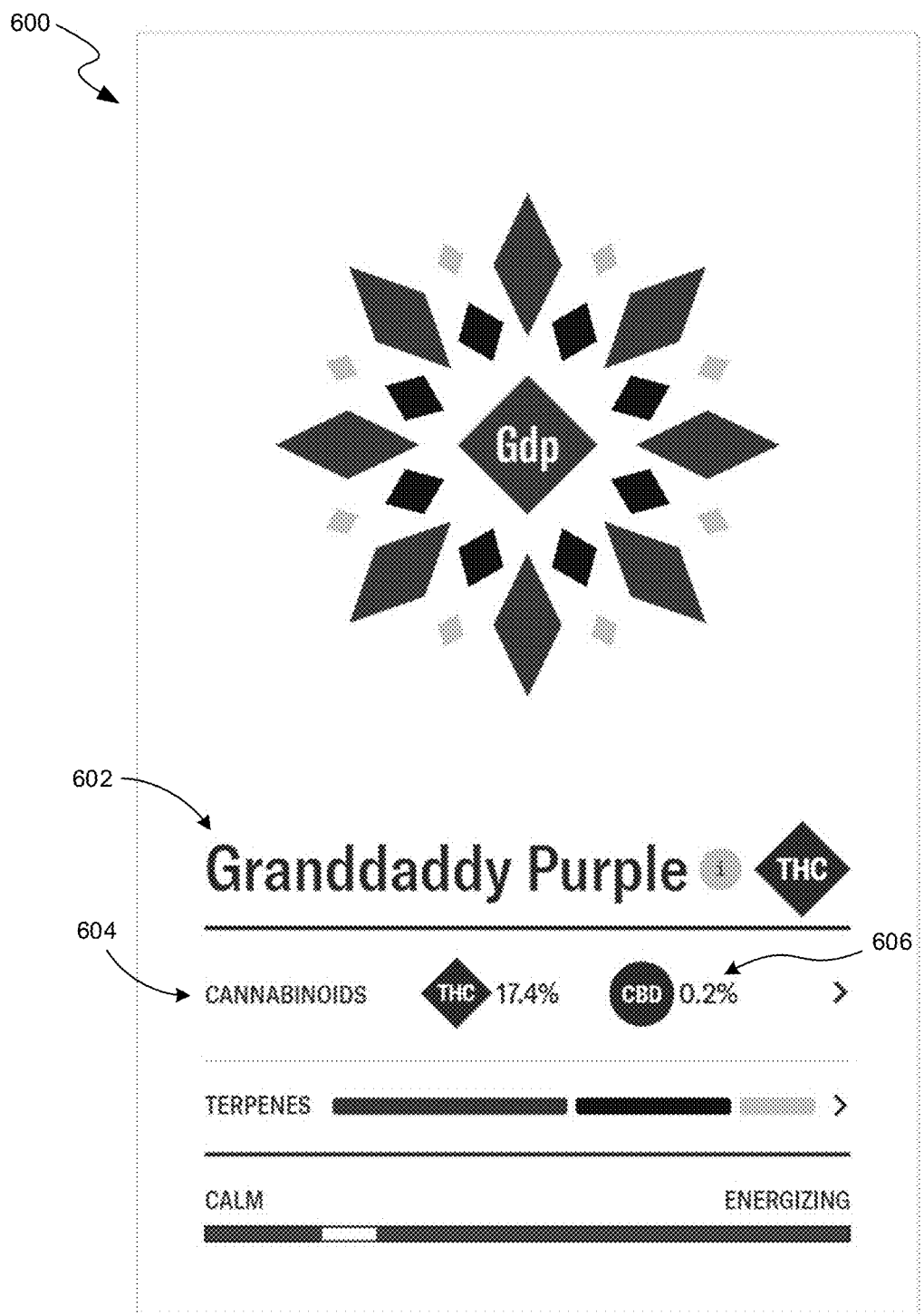

FIGS. 20-28 are representative user interface screens in accordance with embodiments of the disclosed technology. FIG. 20 illustrates a representative UI screen 600. The UI screen includes information about cannabis or cannabis strains. The displayed information can include the strain name 602 (e.g., "Granddaddy Purple"), significant compounds 604, percentage of the compounds 606, grower information, buy button for obtaining directions to a dispensary, a map showing sellers, contact information for sellers, etc.

Figures 21, 22:
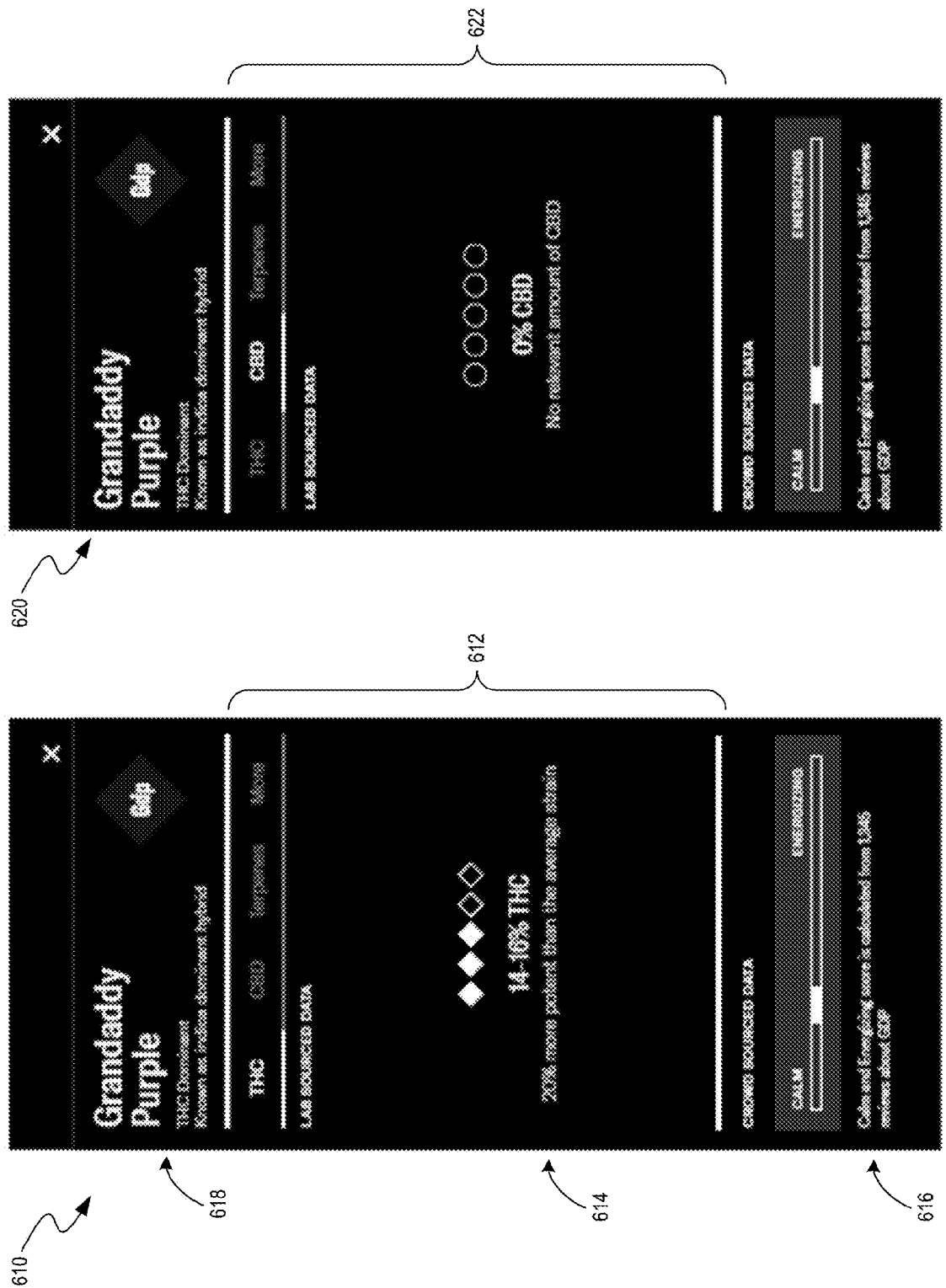

FIG. 21 shows a THC user interface screen 610 with THC information 612 for the cannabis strain of FIG. 20. The displayed information can include an amount of THC in the cannabis strain from lab sourced data, indicated by a percentage (e.g., w/w or v/v) of THC in the cannabis strain and displayed with a visual representation of the level of THC in the cannabis strain. The displayed information can also include reference information 614, such as a comparison to the THC level in other strains or an average strain. The displayed information can also include a psychoactive score 616 from crowd sourced data. The displayed information can also include the strain name 618, other strain information, etc.

FIG. 22 shows a CBD user interface screen 620 with CBD information 622 for the cannabis strain of FIG. 20. The displayed information can include an amount of CBD in the cannabis strain based on lab sourced data, indicated by a percentage of CBD in the cannabis strain, and displayed with a visual representation of the level of CBD in the cannabis strain. The displayed information can also include a comparison to the CBD level in other strains or an average strain. The displayed information can also include, without limitation, a psychoactive score from crowd sourced data, the strain name, other strain information, etc., as shown in a UI screen discussed in connection with FIG. 21.

Figures 23, 24:
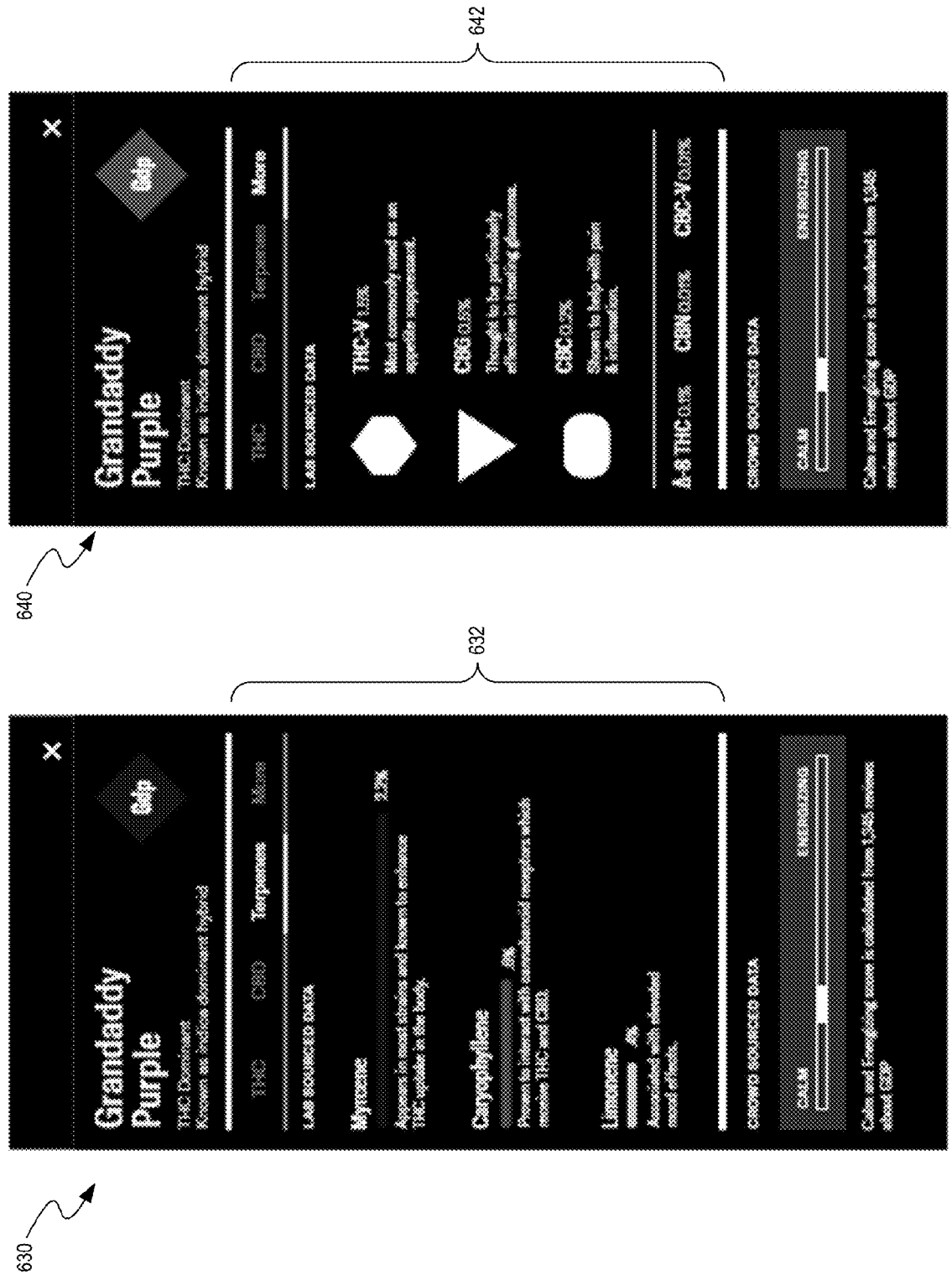

FIG. 23 shows a user interface screen 630 with terpene information 632 for the cannabis strain of FIG. 20. The displayed information can include names of terpenes, amount of each terpene based on lab sourced data, indicated by a percentage of each terpene in the strain and displayed with a visual representation of the level of each terpene in the strain. The displayed information can also include additional information about the terpenes, including, but not limited to, therapeutic effects, non-therapeutic effects, biochemical mechanism of action, and other known information about the terpene. The displayed information can also include, without limitation, a psychoactive score (e.g., a score based on crowd sourced data), the strain name, other strain information, etc., as shown in the UI screen in FIG. 21.

FIG. 24 shows a user interface screen 640 with lab data information 642 for the cannabis strain of FIG. 20. The displayed information can include names of additional cannabinoids identified based on lab sourced data and amounts of each cannabinoid from lab sourced data, indicated by a percentage of each cannabinoid in the strain. The displayed information can also include a shape corresponding to each cannabinoid. For some cannabinoids, a shape may not be used. The displayed information can also include a psychoactive score from crowd sourced data, the strain name, other strain information, etc., as shown in the UI screen in FIG. 21.

Figure 25:
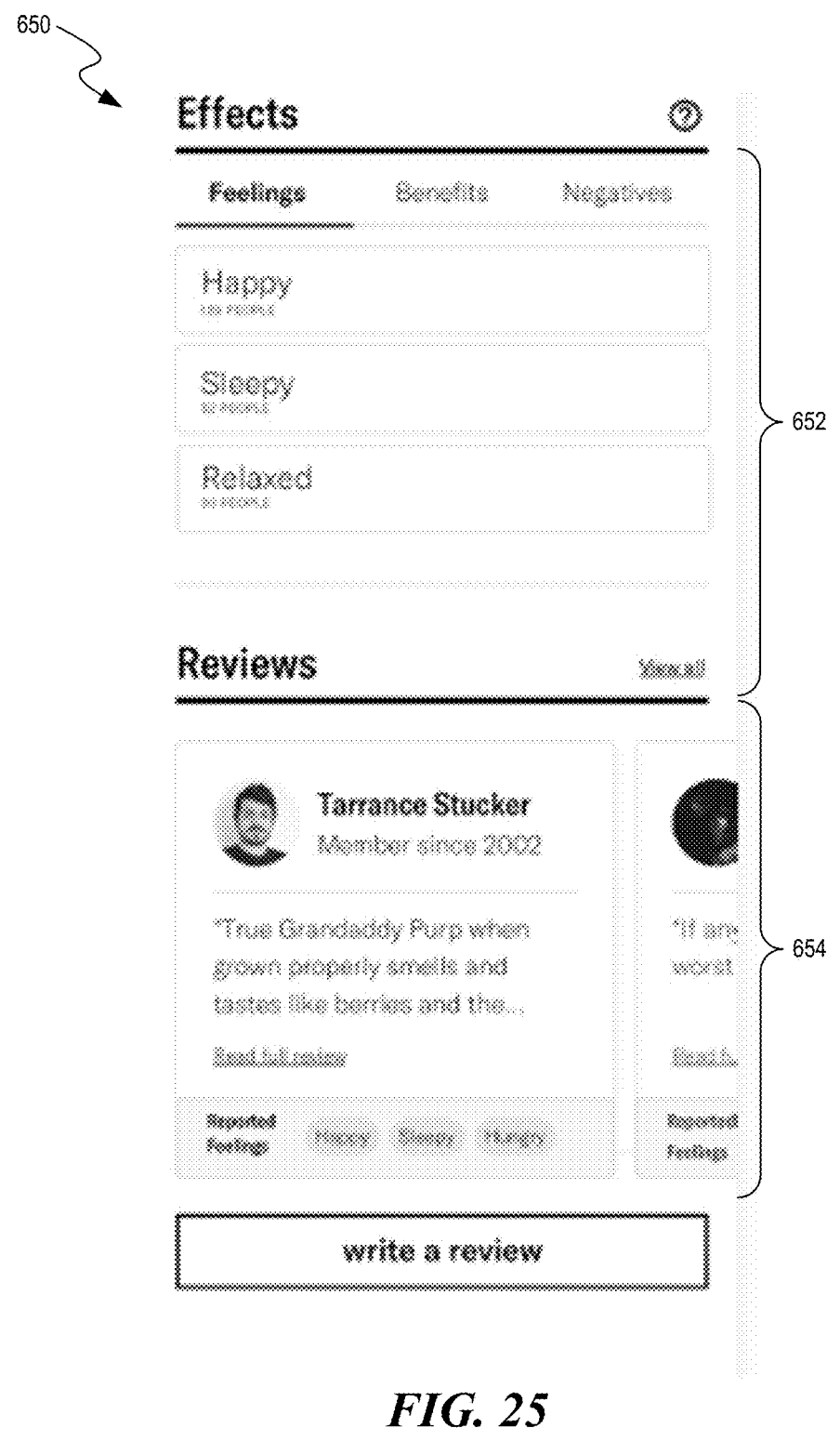

FIG. 25 shows a user interface screen 650 with effects information 652 and review information 654 for the cannabis strain of FIG. 20. The displayed information can include information about the effects of the cannabis strain from crowd sourced data, including feelings (e.g., happy, sleepy, relaxed, hungry, etc.), benefits (e.g., alleviation of headaches, insomnia, anxiety, etc.), negatives (e.g., low potency, too strong in potency, poor smell, etc.), and an icon for additional information (e.g., additional information about effects of the cannabis strain, where the information is sourced from, growing information, etc.). The displayed information can also include, without limitation, user reviews displayed in a slideshow view, including a user name and profile information, a review quote, a link for reading full review, reported feelings (e.g., happy, sleepy, hungry, etc.), a "write a review" button for writing a review, and a link for reading all reviews.

Figures 26, 27:
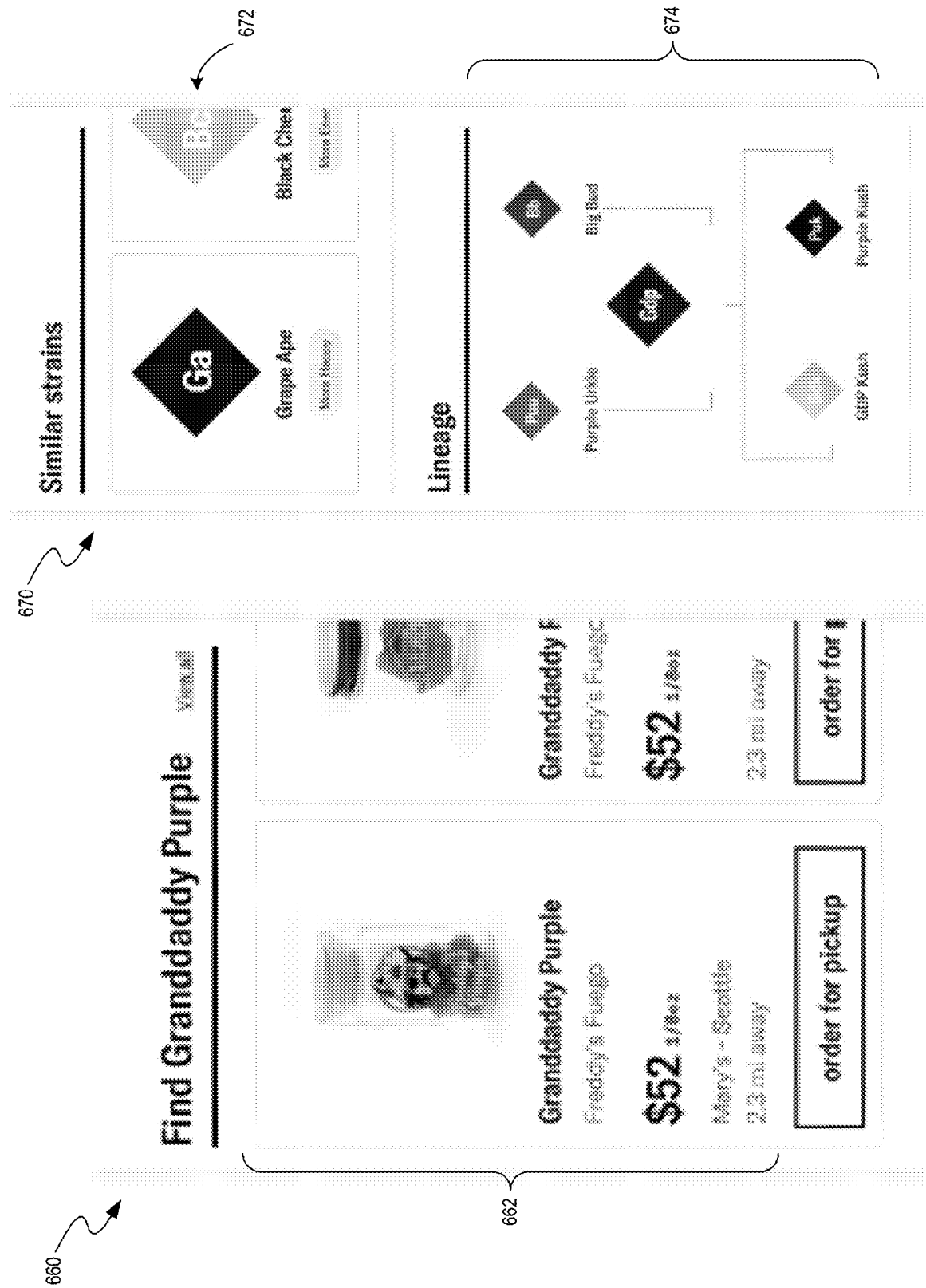

FIG. 26 shows a user interface screen 660 with purchasing information 662 for the cannabis strain of FIG. 20. The displayed information can include information on merchants who sell the cannabis strain displayed in a carousel view. The displayed information can also include, without limitation, the merchant's name, price information (e.g., a sales price, discounts, etc.), a distance from user's location, a map, a button for ordering the product for pickup, and a link for viewing all or selected merchants selling the strain.

FIG. 27 shows a user interface screen 670 with lineage information for the cannabis strain of FIG. 20. The displayed information can include similar strains 672 with a descriptor comparing the similar strain to the cannabis strain (e.g., more relaxed), shown in a carousel view, and the strains shown as shapes. The displayed information can also include lineage information 674, such as a family tree showing lineage of the cannabis strain, etc. The shape can also serve as a link to obtain additional information on the selected strain by bringing a user to a new UI screen with information on the strain. Visual representations (e.g., flower strains) can be shown in the family tree to provide additional information.

Figure 28:
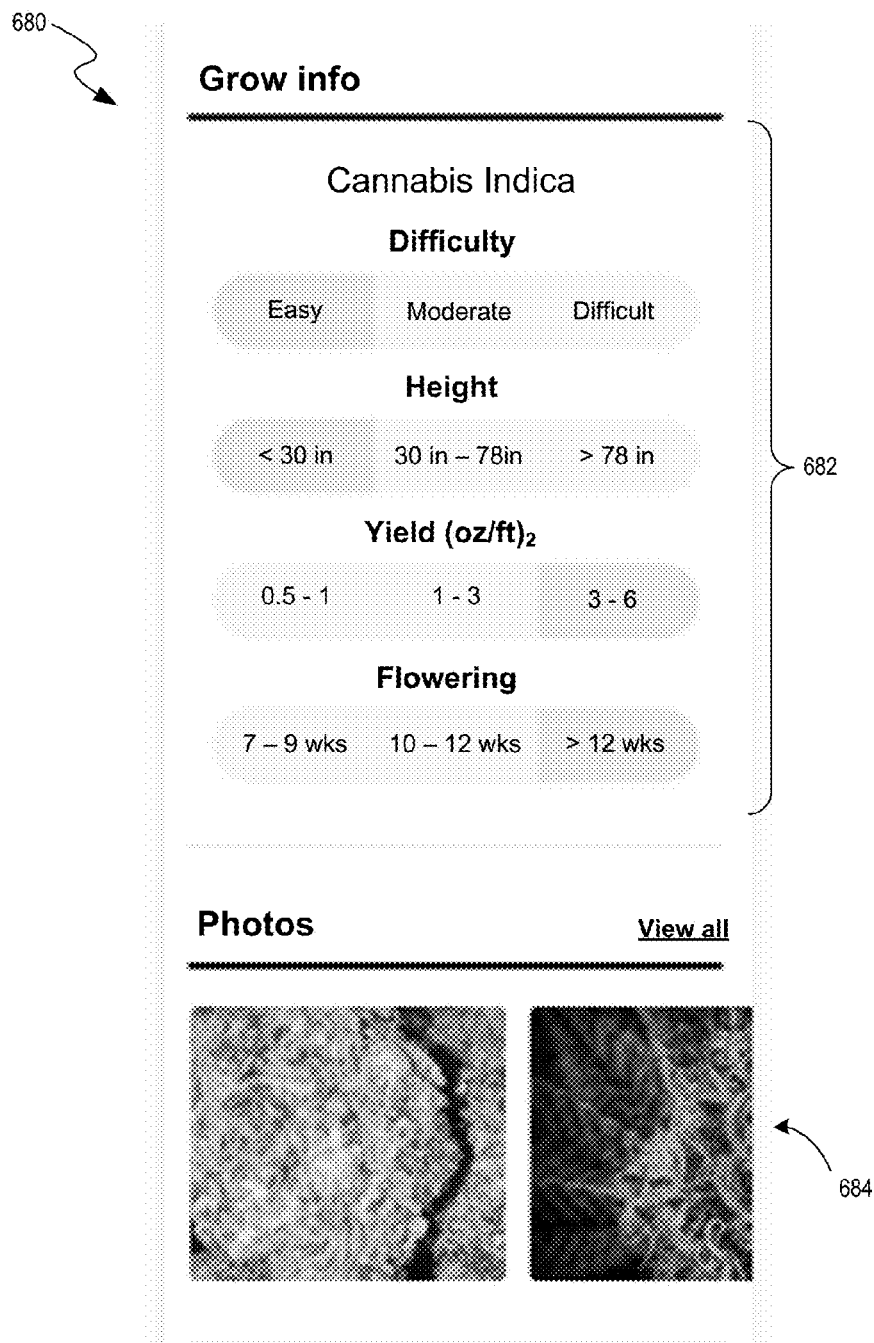

FIG. 28 shows a user interface screen 680 with grow information 682 and photos 684 for the cannabis strain of FIG. 20. The displayed information can include a difficulty level for growing the cannabis plant of the cannabis strain, a height range of the cannabis plant, a yield range of weight of cannabis flower per height of the cannabis plant, and a flowering timeframe. Such information can be crowd sourced or sourced from research, articles, etc.

Figure 29:
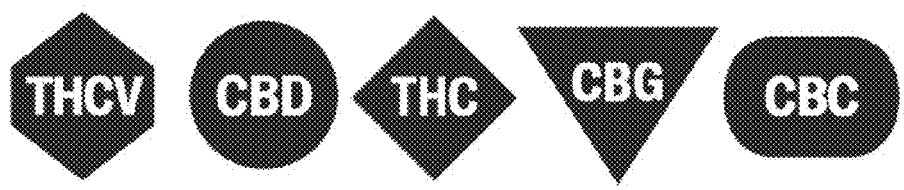
FIG. 29 shows cannabinoid shapes for visual representations in accordance with embodiments of the disclosed technology.

FIG. 29 shows the shapes of cannabinoids for visual representations. As discussed in connection with FIGS. 17C-17E, the visual representations can be designed to represent any number of cannabinoids. The shapes can be polygonal (including rounded polygonal), round, oval, regular, or irregular. The illustrated cannabinoids are examples selected from over 100 identified cannabinoids in the cannabis plant. Additional cannabinoids can be presented by other shapes or icons. In other embodiments, additional shapes may be used to represent other cannabinoids.

Figure 30:
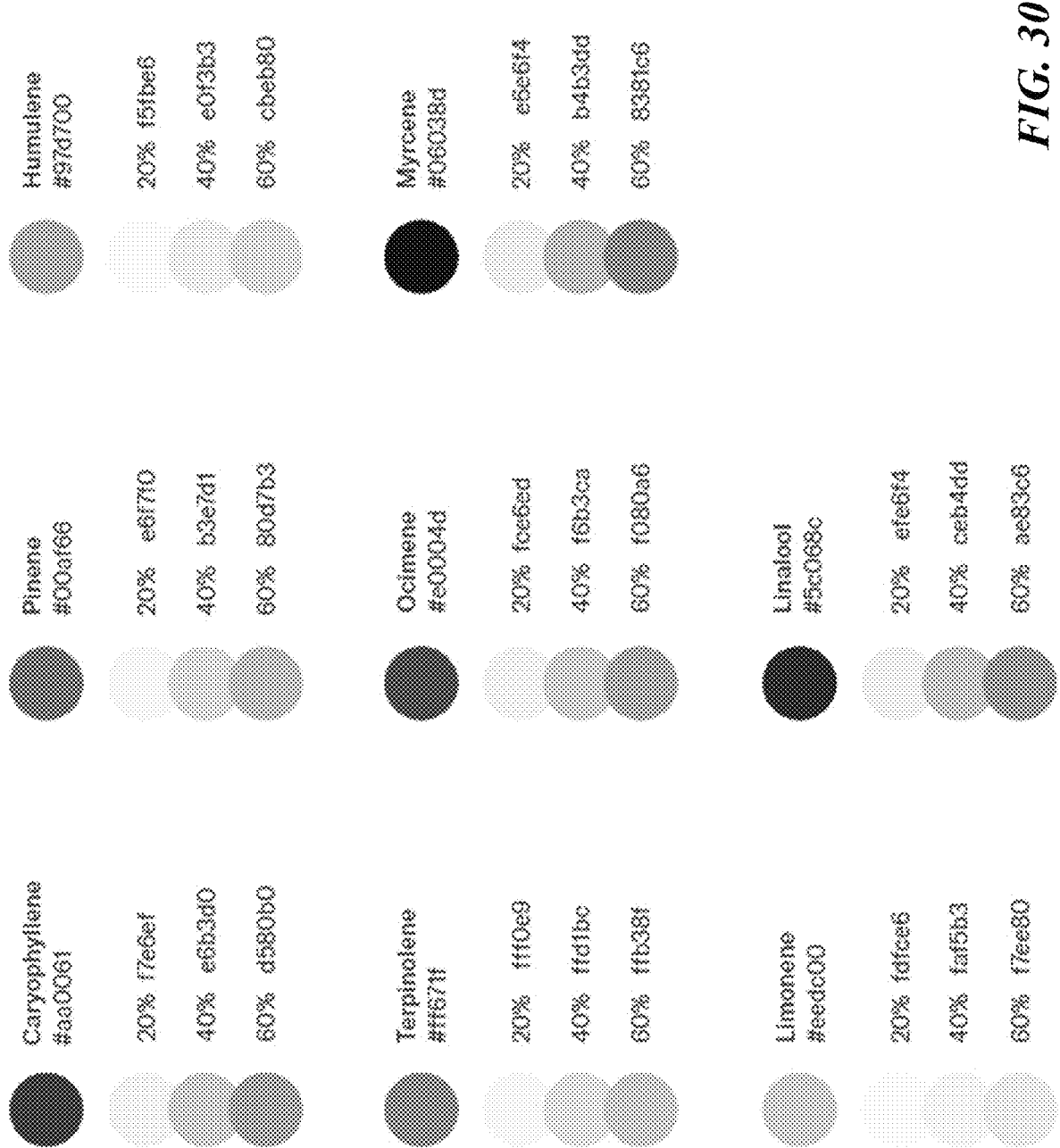
FIG. 30 shows colors for different terpenes suitable for visual representations in accordance with embodiments of the disclosed technology.

FIG. 30 shows a terpene legend listing colors corresponding to respective terpenes. The legend can be included in a brochure, webpage, or other materials. Each color and a Hex color code represent a terpene. The color opacity, along with a Hex code corresponding to that opacity, represents a percentage of the terpene in the cannabis strain.

FIGS. 31A-38C are representative screenshots of a strain generator for generating user-defined cannabis strains in accordance with embodiments of the disclosed technology. The strain generator can provide graphical user interfaces (GUIs) for real-time control of outputted strains. The strain generator can automatically generate visual representations of cannabis strains and associated information based on user-defined cannabis profiles and can also modify the visual representations and associated information in response to modifications of the user-defined cannabis profiles. The generated output can be displayed to, for example, research, select, and/or purchase cannabis products.

FIGS. 31A-31C are representative user interfaces showing a user-inputted THC-dominant cannabis profile in accordance with embodiments of the disclosed technology. The user interface 700 can include a cannabinoid input GUI 701 (FIG. 31A) for inputting cannabinoid information, a terpene input GUI 704 (FIG. 31B) for inputting terpene information, and a generated visual representation 706 (FIG. 32C) and associated information determined based, at least in part, on the cannabis profile inputted via one or both of the GUIs 701, 704.

Referring to FIG. 31A, the cannabinoid input GUI 701 can include selectors in the form of slidable controls or sliders 702a-f (collectively, "sliders 702"), each corresponding to a cannabis characteristic. The illustrated slider 702a corresponds to a THC level and position corresponds to 13.6% THC (shown in bold) and 0.158 milligrams (mg) (shown in parenthesis). The selector 702a can be moved along a continuum between ends 720, 722 of a track 712 to increase or decrease the amount of THC. The selector 702a can be moved to any location along the length of the track 712. In some embodiments, the selector 702a can be moved between present locations corresponding to different values. For example, the track 712 can have present locations corresponding to specific percentages of THC. The end 720 can correspond to a minimum amount of THC (e.g., 0% by w/w or v/v), and the end 722 can correspond to the maximum amount of THC (e.g., 25% by w/w or v/v). The maximum amount of the cannabinoid for different sliders 702 can be selected based on the characteristics of the cannabinoid. For example, the maximum amount of THC can be about 25% or about 30%, whereas the maximum amount of CBC, corresponding to slider 702e, can be about 20% or about 22%.

A user can set the minimum and maximum characteristics to customize the strain generator. In some embodiments, the amounts of cannabinoid at the ends 720, 722 can be fixed for all users. In other embodiments, the amounts of cannabinoid at the ends 720, 722 can be adapted to individual users. For example, the strain generator can include inputs for selecting experienced or unexperienced, which corresponds to the user being an experienced or unexperienced cannabis user. The amounts of cannabinoid at ends 720, 722 can be different for a user that selected experienced than for a user that selected unexperienced. For an experienced user, the ends 720, 722 may correspond to a minimum amount of THC of 10% by w/w or v/v and a maximum amount of THC of 40% by w/w or v/v, respectively. In another example, the ends 720, 722 may correspond to a minimum amount of THC of 0% by w/w or v/v and a maximum amount of THC of 25% by w/w or v/v, respectively. For an unexperienced user, the ends 720, 722 may correspond to a minimum amount of THC of 0% by w/w or v/v and a maximum amount of THC of 15% by w/w or v/v, respectively. In some embodiments, the ends 720, 722 can be automatically set based on the user's profile or experience level (e.g., unexperienced, moderate experience, or significant experience), which can be inputted by the user.

The selectors displayed on the GUIs 701, 704 may be adapted to individual users. For example, a first user (e.g., an experienced cannabis user) can be presented with more selectors than a second user (e.g., an unexperienced cannabis user). For the first cannabis, the GUIs 701, 704 may display the cannabinoid selector, the terpene selector, a selector for dosage, a selector for dose duration, a selector for strain type for the first user, whereas for the second user cannabis user, the GUIs 701, 704 may display the cannabinoid selector and the terpene selector.

The description of the slider 702a applies equally to the sliders 702b-f unless indicated otherwise. The sliders 702b-f are used to set the CBD level, THCV level, CBG level, CBC level, and psychoactive level, respectively. The generated output strain information can be determined as a function of the input provided by the sliders 702. As each slider 702 is moved along the respective track, the strain generator output (e.g., visual representation, strain recommendation, etc.) can be updated accordingly. A user can interact with the sliders 702 to set and modify chemical strain profiles used to generate the visual representation. In dynamically modified embodiments, the visual representation (e.g., visual representation 704 of FIG. 31C) can be updated in real time as the sliders are moved. In other embodiments, the visual representation can be updated based upon further input by the user. For example, the sliders 702 can be moved to desired positions. Once positioned, the user can indicate that strain output should be generated.

The sliders 702 can correspond to other user preferences, including, without limitation, desired effects (e.g., calm effects, energizing effects, effect duration, etc.), characteristics of cannabis (e.g., aromas, taste, effects, etc.), price, distance to dispensary with available product, ratings, and so forth. For example, the GUI 701 can include a calm-energizing slider 702f. The user can move the calm-energizing slider 702f, and the amounts of THC and CBD can be adjusted automatically. In this example, if the user moves the calm-energizing slider 702f towards energizing, the sliders 702a, 702b for THC and CBD, respectively, can be automatically moved in real time accordingly, such that the amount of THC will be proportionally higher than the amount of CBD (i.e., the THC to CBD ratio is proportionally higher). Predefined relationships can be used to automatically adjust the sliders 702. The sliders 702 can also correspond to other chemicals or characteristics. The number and configuration of selectors (e.g., sliders, fill-in boxes, drop-down menus, dials, combinations thereof, etc.) can be selected based on the number of constituents of the cannabis, selectable characteristics of the cannabis, level of user control, combinations thereof, or the like. For example, sliders 702 can correspond to a variety of cannabinoids, terpenes, or other constituents of cannabis. In one embodiment, the cannabinoid input GUI 701 includes sliders 702 corresponding to CBN, CBG, CBC, THC, or the like. Sliders 702 for characteristics of cannabis can correspond to aroma characteristics, flavor characteristics (e.g., sweet, sour, bitter, etc.), physiological and psychological characteristics (e.g., body high, mental high, etc.), health benefits (e.g., anxiety relief, muscle spasm relief, etc.), species of cannabis plant (e.g., sativa, indica, hybrid, etc.), or the like.

FIG. 31B is a screenshot of the terpene GUI 704 displaying a terpene list 730 at an available terpenes section 732. Selected terpenes can be displayed at a chosen terpene section 740. In the illustrated setting, the chosen terpene section 740 includes no terpenes. The terpene GUI 704 can also include terpene and ring tabs 750 for selecting primary (Ring 1 tab), secondary (Ring 2 tab), and tertiary terpenes (Ring 3 tab). In use, the user can select a terpene selector (e.g., an icon, a button, a box, etc.) in the available terpenes section 732. The selected terpene will then appear in the chosen terpene section 740. Alternatively, the user can drag an icon or box from the available terpenes section 732 into the chosen terpenes section 740. In some embodiments, the order in which the user selects the terpenes determines primary, secondary, and tertiary terpenes. In some embodiments, the user can use the tabs 750 to designate primary, secondary, and tertiary terpenes.

FIG. 31C shows the cannabis strain visual representation 704 along with associated strain information corresponding to the user-inputted information shown in FIGS. 31A and 31B. In some embodiments, visual representations can be shown in GUIs, such as those discussed in connection with FIGS. 31-38C and FIG. 20, and information can be shown in GUIs, such as those discussed in connection with FIGS. 21-28. With each selection made in the cannabinoid GUI 701, the corresponding shape and shape size for the selected cannabinoid in the visual representation can be automatically updated. Similarly, with each selection in the terpene GUI 704, the corresponding color for the selected terpene in the visual representation can be automatically updated.

In some embodiments, elements in the visual representation 704 can be a mathematical representation of the user selections. For example, the size of the cannabinoid shape can be an exact mathematical representation of the user-selected amount of the cannabinoid. In some embodiments, the generated flower ring can be an approximate representation. For example, the size of the cannabinoid shape can correspond to an amount of cannabinoid in an identified cannabis strain match, wherein the matching cannabis strain is identified based on an approximation to the user selections and/or other criteria.

The user can be presented with a matching strain, or a list of matching strains. If a list is to be presented, the user can select a number of cannabis strains to be displayed. The number of cannabis strains in the list can also be a default number (e.g., 3, 4, 5, etc.), which can be set by a user, an administrator, etc. The list of cannabis strains can be ranked. The ranking of the flower strains can be based on one or more criteria. The criteria can include, without limitation, closest match to user selections, user reviews, price, availability, location or distance of dispensary to user, or the like. The user can select a range (e.g., a percentage or an absolute value). For example, if the user selects a range of 10%, a THC amount of 1 mg, a CBD amount of 2 mg, then flower strains that have between 0.9 mg to 1.1 mg of THC and 1.8 mg to 2.2 mg of CBD will be presented in the generated list. In some embodiments, the number of cannabis strains in the list can include all results that satisfy at least one of the criteria.

Criteria can be applied to the input to identify a set of known strains of cannabis. The criteria can be automatically set by the system or by the user. In some embodiments, a database of known strains can be analyzed to identify known strains within a pre-defined value (e.g., percentage) of the user input value. The identified known strains can be on the list of matching strains. In some embodiments, the system can identify strains of cannabis using matching algorithms. In the illustrated setting, cannabinoid levels are less than one percent for CBD, THCV, CBG, CDC, and substantially no psychoactive effects. The THC levels in the identified strains of cannabinoid can be within 5%, 10%, or 15% of the illustrated 13.6%. The identified and known strains can then be outputted and displayed for the user. This informs the user of strains of cannabis that generally match the desired chemical profiles. Upon approval of the user, the system can search for known strains that match the visualization or are within the acceptable range. The results can be displayed in the interface 700 or a separate interface.

The user can select a GUI presented as a tile that represents one strain, bringing the user to at least one of another GUI or tile, such as those discussed in connection with FIGS. 20-24. The user can be presented with multiple GUIs or tiles that represent multiple flower strains. When adequate user selections are made such that a matching strain is identified, the name of the strain, associated information, and visual representations can automatically be generated and updated in real time. For example, a cannabis strain has not been identified based on user selections in FIGS. 31C, 32C, and 33C. In this example, a cannabis strain is identified based on user selections in FIGS. 34C, 35C, 36C, 37C, and 38C, and therefore the GUI is populated with the associated strain information and visual representations, as shown in FIGS. 34C, 35C, 36C, 37C, and 38C.

Figures 34A, 34B, 34C:
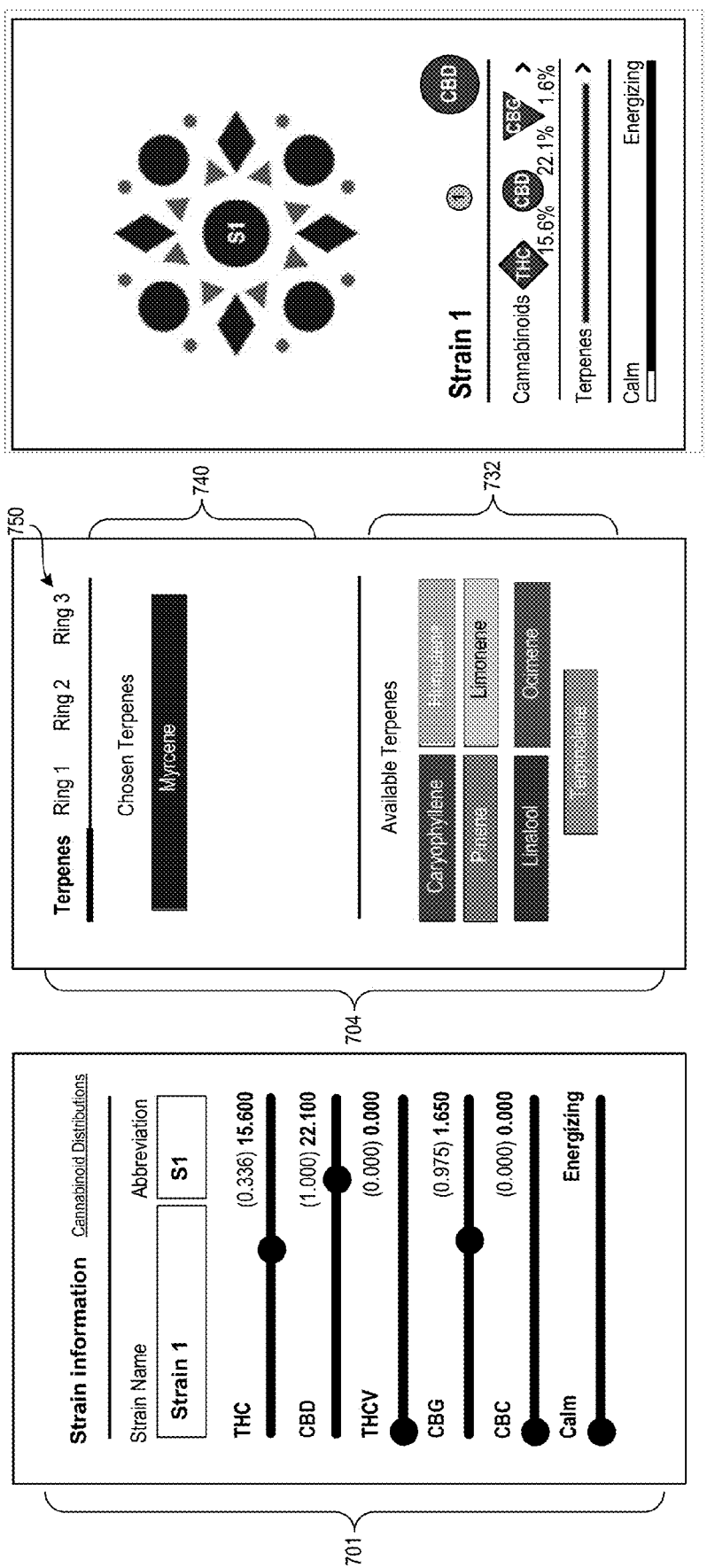
Figures 35A, 35B, 35C:
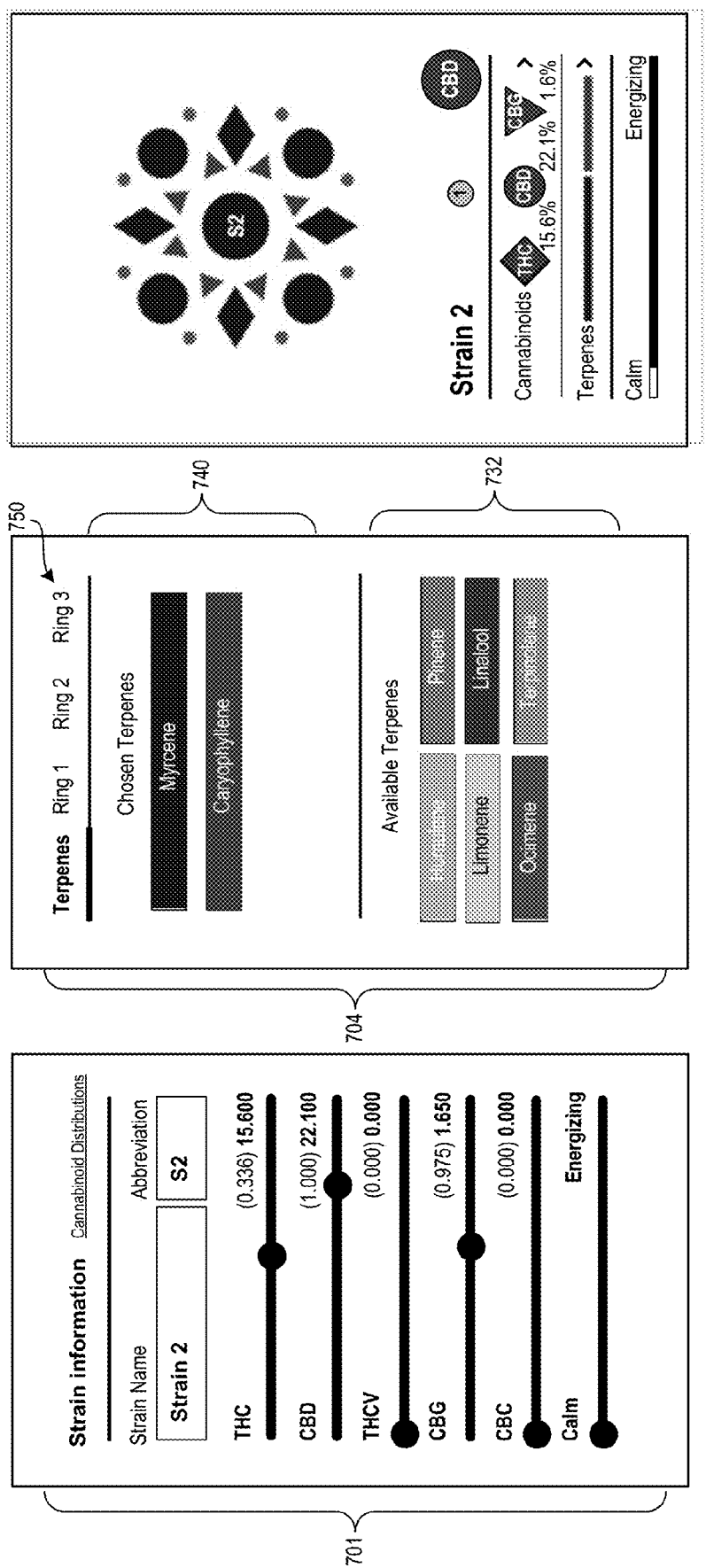
Figures 36A, 36B, 36C:
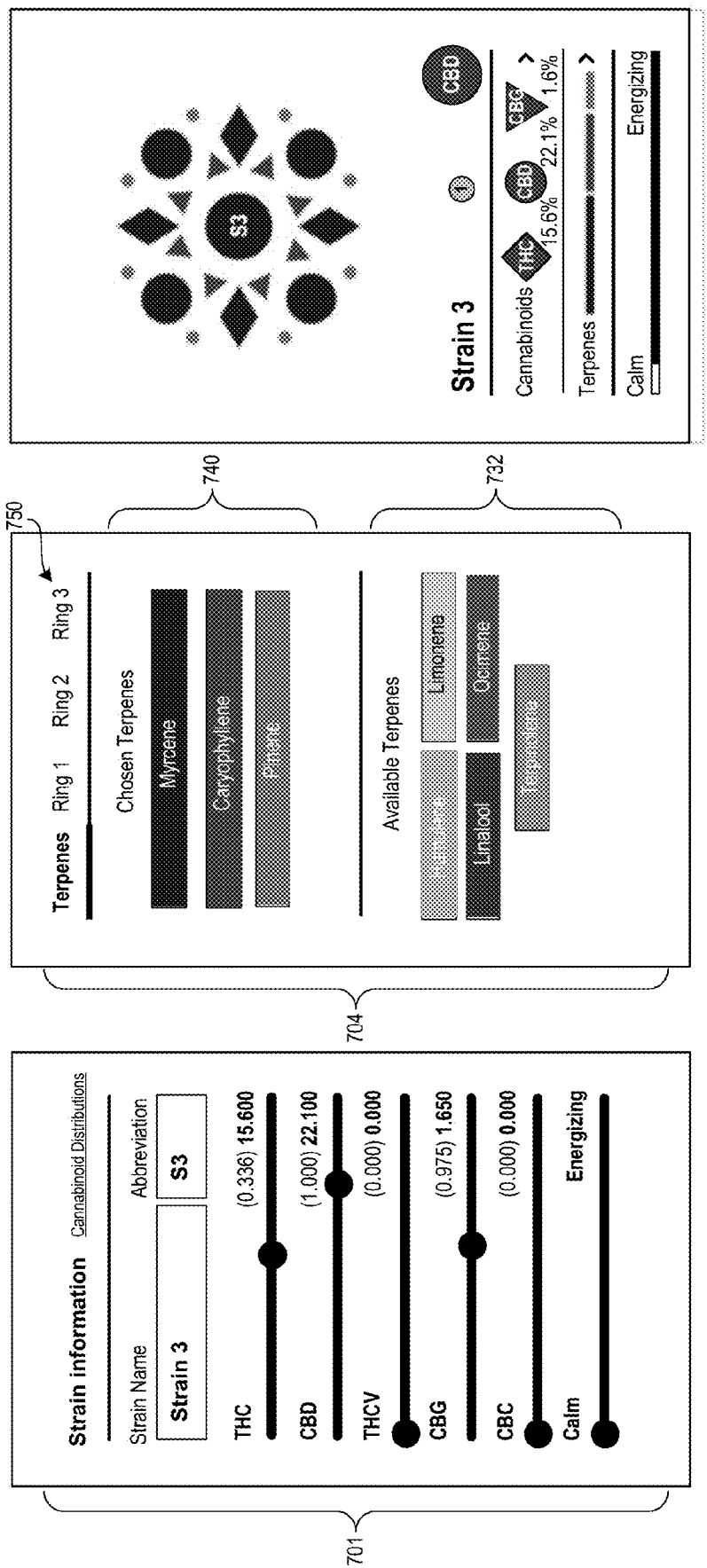

FIGS. 34B, 35B, and 36B show one method for selecting terpenes. FIG. 34B shows that myrcene is selected first and therefore is the primary terpene. FIG. 35B shows that caryophyllene is selected second and is the secondary terpene. FIG. 36B shows that pinene is selected third and is the tertiary terpene. The user can remove a terpene selection by dragging the terpene box back to the available terpenes section or by another mechanism of deletion. In some other embodiments, the user can select the terpenes in any order under the Ring 1, Ring 2, and Ring 3 tabs. For example, the user can select the Ring 3 tab and drag-and-drop a terpene into the chosen terpenes section 740 to indicate the terpene as a tertiary terpene, then the user can select the Ring 1 tab to drag-and-drop a primary terpene, and then lastly the user can select the Ring 2 tab to drag-and-drop a secondary terpene.

In some embodiments, the user can view the user selected terpene and associated information under each Ring 1, Ring 2, and Ring 3 tabs 750. The screens under each tab can include information associated with the terpenes, including, without limitation, the visual elements (e.g., rings in the flower symbol), a value associated with an amount of the terpene, color, etc. In some embodiments, when a Ring 1, Ring 2, or Ring 3 tab is selected, the visual elements associated with the user selected terpene can be visually highlighted in another GUI, such as the GUIs shown in FIGS. 31A-38C.

Figure 32C:
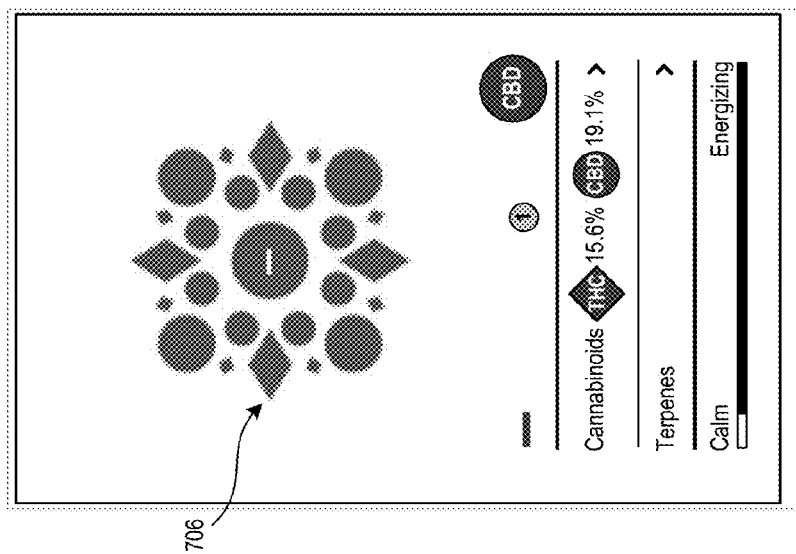
Figure 32B:
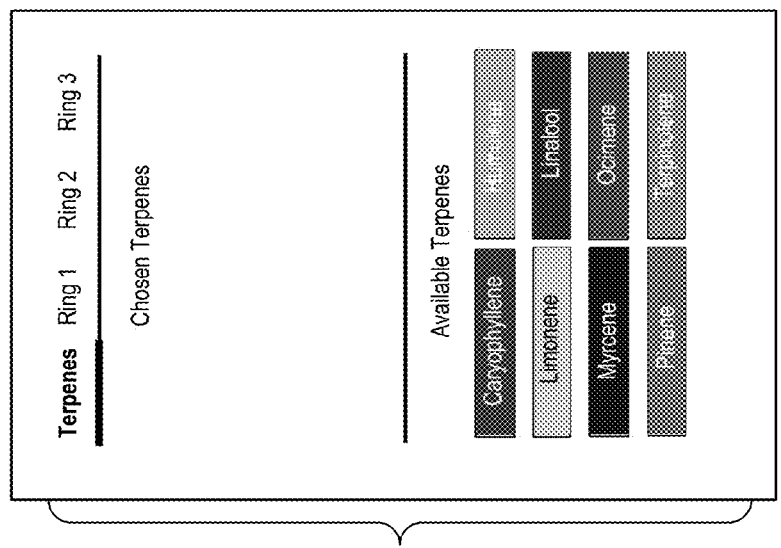
Figure 32A:
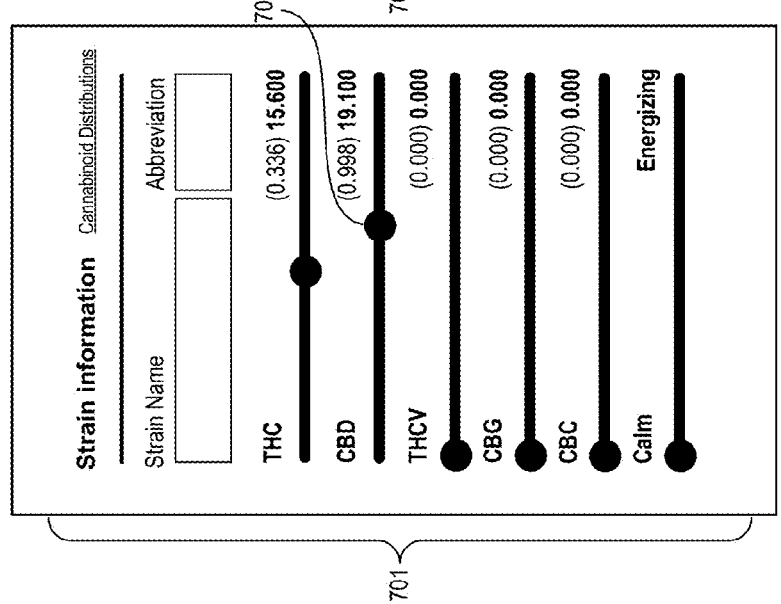
Figure 33C:
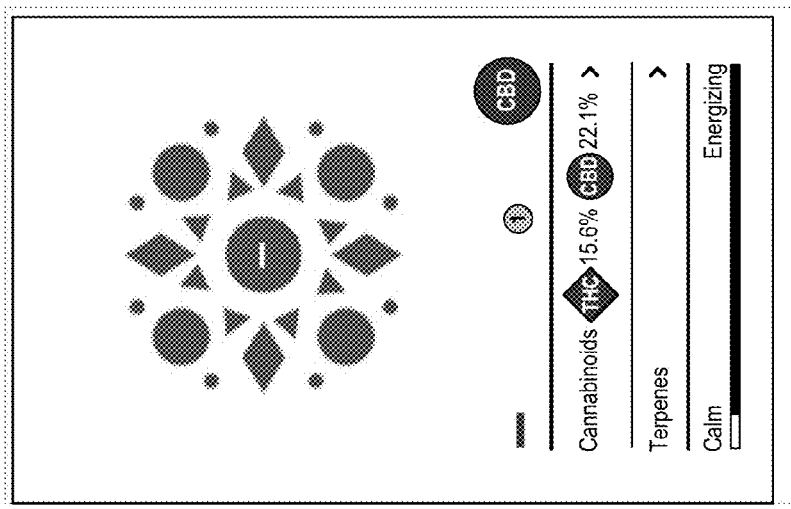
Figure 33B:
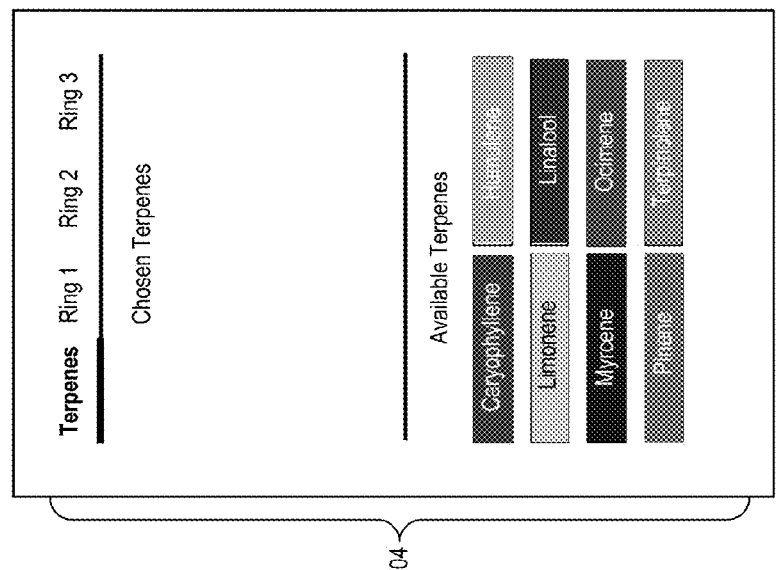
Figure 33A:
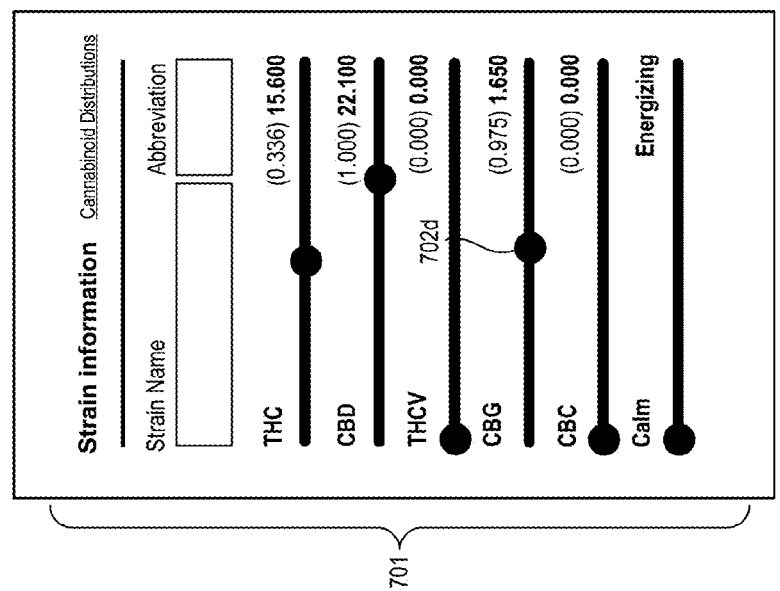

Referring now to FIGS. 32A-38C, different example user settings are illustrated to show how the strain generator can be used. In FIG. 32A, the cannabinoid GUI 701 has the slider 702b positioned to select a level of CBD (illustrated as 19.2%) and the visual representation 704 and associated information has been updated. In FIG. 33A, the cannabinoid GUI 701 has the selector 702d positioned to select a level of cannabinoid (CBG), and the visual representation 704 of FIG. 33C and associated information is updated. In FIGS. 34A-C, 35A-C, and 36A-C, terpene input GUI 704 a primary (myrcene), secondary (caryophyllene), and tertiary (pinene) terpene is respectively chosen via the terpene input GUI 704, and the visual representation of an identified cannabis strain and associated information is updated. FIGS. 37A-C and 38A-C show another set of user selections, corresponding visual representations, and associated information. The number and configuration of GUIs and selectors can be selected based on the selection input for the mode of administration, dosage, dose duration, effect duration, absorption rate, therapeutic effect, side effects, pharmacokinetic properties, pharmacological properties, compound levels, concentrations, and/or compound ratios.

The strain generator can be a smart generator that may utilize historical inputs (e.g., a user's previous selections and criteria) to automatically generate strain outputs. The historical inputs can include a user's selection history, which can be recorded and stored in a database. The strain generator can access the database to pre-generate selections in the cannabinoid selector, terpene selector, etc. and determine a strain output or a set of strain outputs based on the user's selection history. The strain generator can display these pre-generated selections to the user from which the user can continue to modify. The GUIs presented in FIGS. 31A-38C may be displayed via an end-user device. For example, the GUIs may be shown simultaneously on the screen (e.g., a tablet or computer), showing real-time generation of the visualization of the flower ring and information associated with a particular strain. In some other examples, the GUIs may be shown on separate screens (e.g., screens of mobile devices, such as user devices 114 or 115 of FIG. 1). The recommendation system 100 can include the strain generators that are run locally or via the cloud.

Figure 39:
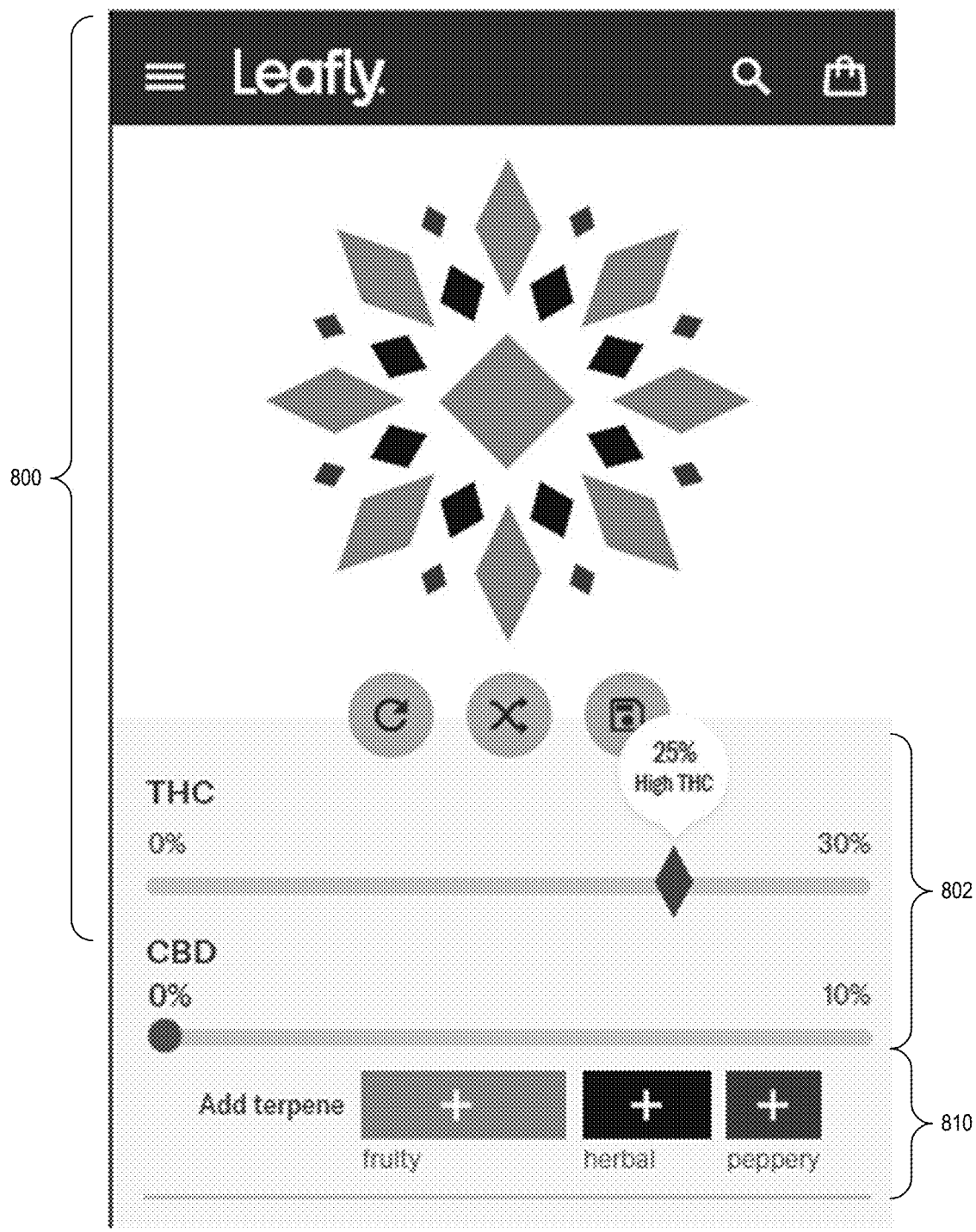
FIG. 39 is a screenshot of a representative user interface for a user-defined strain generator in accordance with another embodiment of the disclosed technology.

FIG. 39 is a representative screenshot of a strain generator for generating user-defined cannabis strains in accordance with another embodiment of the disclosed technology. The strain generator can provide a GUI 800 for real-time control of outputted strains based on information inputted via selectors 802. The GUI 800 also includes a selector 810 configured to allowed selection based on characteristics (e.g., aromas, flavors, effects, etc.). The illustrated selector 810 includes selection boxes for selecting aroma/flavor characteristic (e.g., fruity, herbal, peppery, etc.).

Figure 40:
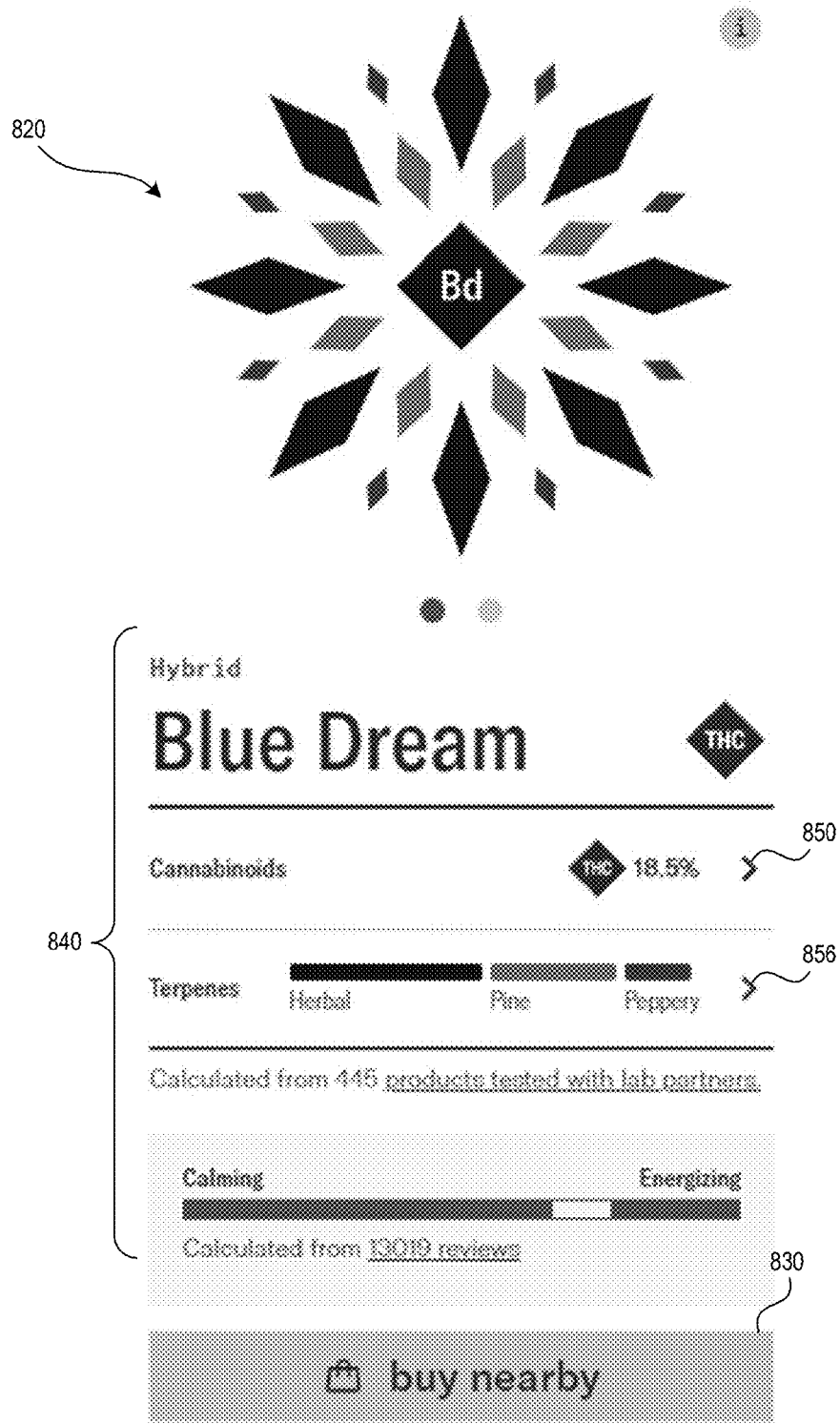
FIG. 40 is a screenshot of a representative user interface illustrating information for the Blue Dream strain in accordance with another embodiment of the disclosed technology.

FIG. 40 is a screenshot of a representative user interface showing visual representation 820 in accordance with an embodiment of the disclosed technology. A GUI 840 provides composition information for the illustrated example Blue Dream strain. The Blue Dream strain is a THC hybrid with a cannabinoid level of about 18.5% THC, three primary terpenes (myrcene, pinene, and caryophyllene), and a moderate to high energizing level. The GUI 840 has an optional cannabinoid navigation arrow 850 for accessing additional cannabinoid information and an optional terpene navigation arrow 856 for accessing additional terpenes information. The GUI 840 can have any number of arrows or other navigation features. A purchase button 830 (illustrated as a Buy Nearby button) can be selected to purchase the illustrated strain, contact a local seller, or initiate a purchasing process. A user can also share the strain information with another user, save/bookmark the strain, and/or provide a review.

Figure 41:
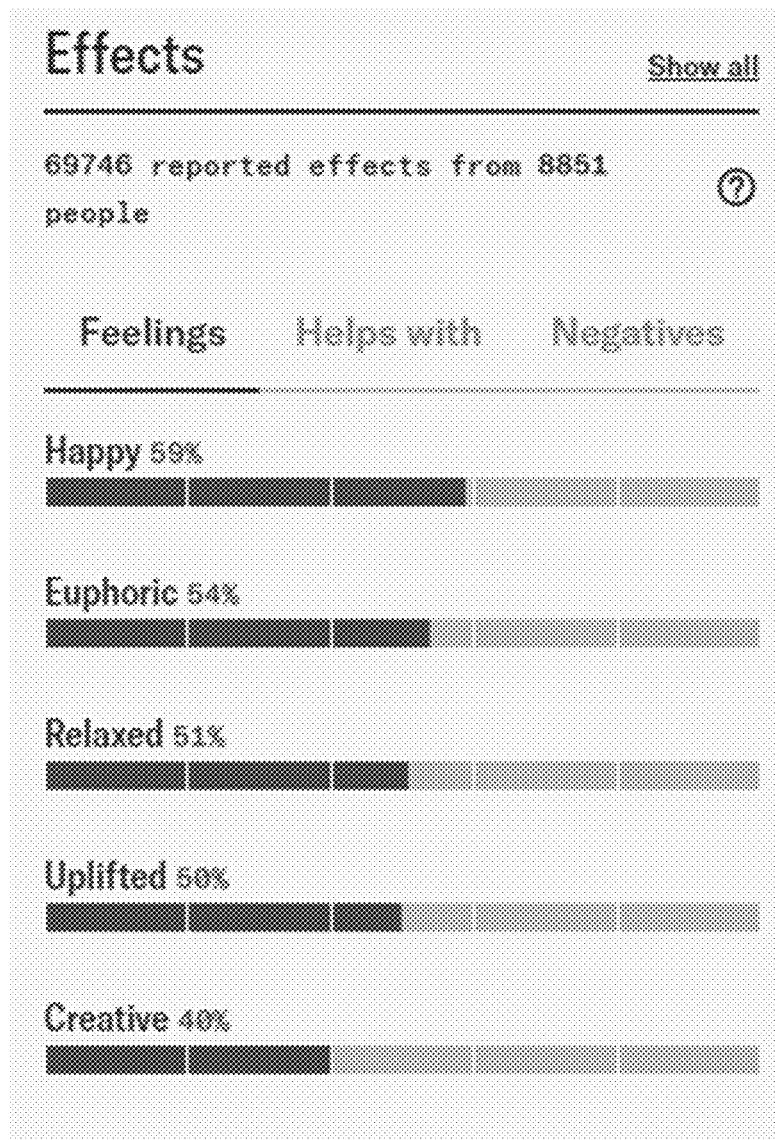
FIG. 41 is a user interface screen showing the effects associated with the Blue Dream strain.

FIG. 41 is a user interface screen showing effects associated with the Blue Dream strain. The effects can be based on crowd-sourced data (e.g., aggregated user input), lab data, algorithms, combinations thereof, or the like. In the illustrated embodiment, for example, 59% of reviewers reported experiencing happy effects. In some embodiments, users provide happiness levels (e.g., a happiness level on a scale of 1 to 10) to determine a happiness level score. Other metrics can be tracked, and composite scores can be generated based on predefined algorithms or user selected scoring criteria. The system can also provide information about helpful effects, negative effects, and other user effects. Effect indicators can be removed or added based on new reviews, thereby enabling tracking of effects over one or more periods of time.

The system can automatically identify events (e.g., statistically significant changes in user effects) to generate an alert or event notification. If the average reported level changes a predetermined amount, event notifications can be sent to, for example, growers, sellers, merchants, etc. For example, the reported effects of the current Blue Dream strain can be compared to the historical effects of the Blue Dream strain for continual or periodic product monitoring and refinement. Recommendation systems can generate reports listing aggregated data, alerts/events, and data for identifying and evaluating factors that may affect strains, including how light, water, growing temperatures, and nutrients affect composition levels (including THC levels, terpene levels, CBD levels), enhance or combine traits, or the like. The collected information can be used to breed strains, develop schedules (e.g., growing schedules, light schedules, etc.), generate fertilization protocols, or the like.

FIGS. 42A-42D are screenshots of user interfaces showing composition information for the Blue Dream strain. FIG.

Figure 42C:
Figure 42D:
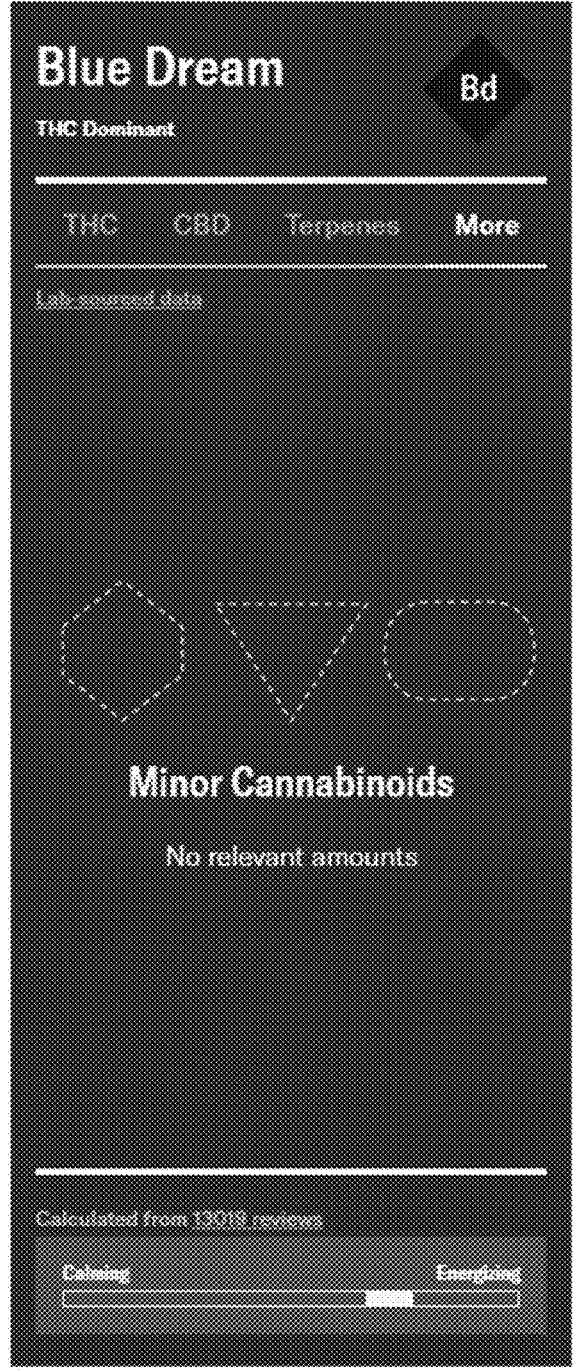

42A shows THC content information and a menu 862 usable to view cannabinoid information. FIGS. 42B-42D show screenshots of CBD information, terpene information, and additional information (e.g., minor cannabinoids), respectively. The user interfaces can display a wide range of information.

Figure 43:
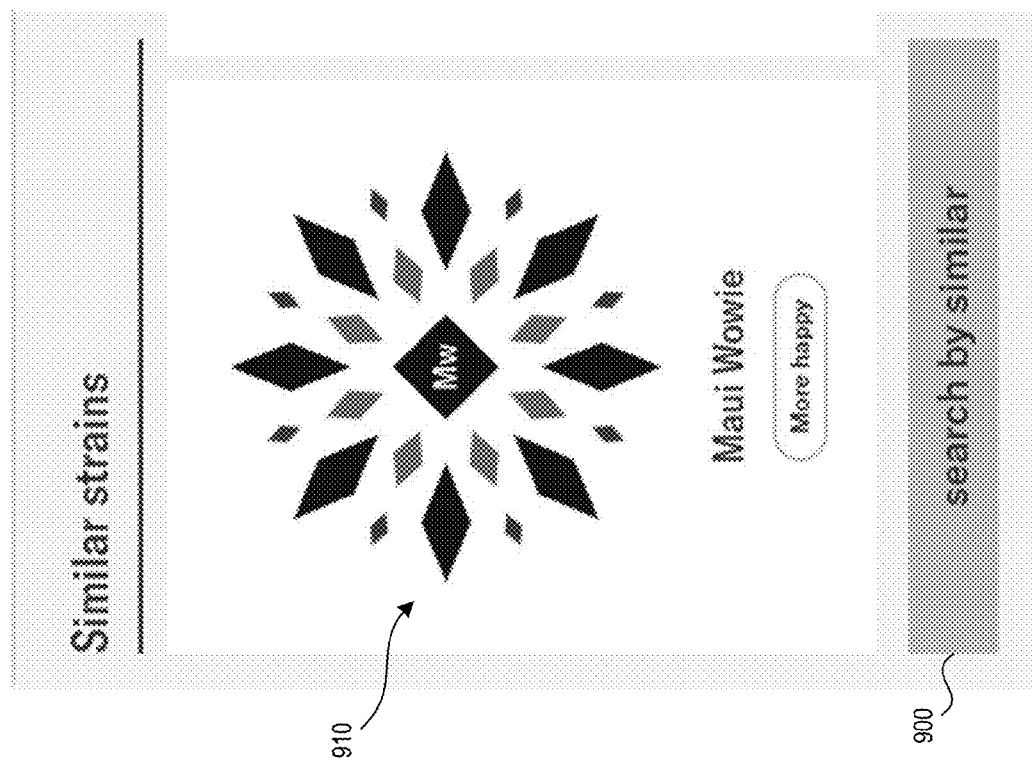
FIG. 43 is a screenshot of a user interface showing results of similar strains compared with the Blue Dream strain.

FIG. 43 is a screenshot of a user interface showing a result of a target strain search. A Search by Similar button 900 can be selected to search for similar strains. The system can search for strains similar to a reference strain (e.g., Blue Dream strain) and display the results for visual inspection. Since the illustrated Maui Wowie visual representation 910 is visually similar to the Blue Dream visual representation (e.g., Blue Dream visual representation 820 of FIG. 40), a user can anticipate that the Maui Wowie strain would provide experiences (or therapeutic effects) similar to Blue Dream strain. The user can select search parameters (e.g., similarity parameters, exclusions rules, available criteria, etc.), number of results displayed, etc. In some embodiments, user-specific searches can be performed based, at least in part, on the user profile, account information, viewing history (e.g., browser history), etc. Potential similar strains can be filtered based on one or more criteria indicating that the strain is not suitable for the user. Searches can also be performed to identify similar compositions or recommended formulations, modality of delivery, or the like.

Figure 44:
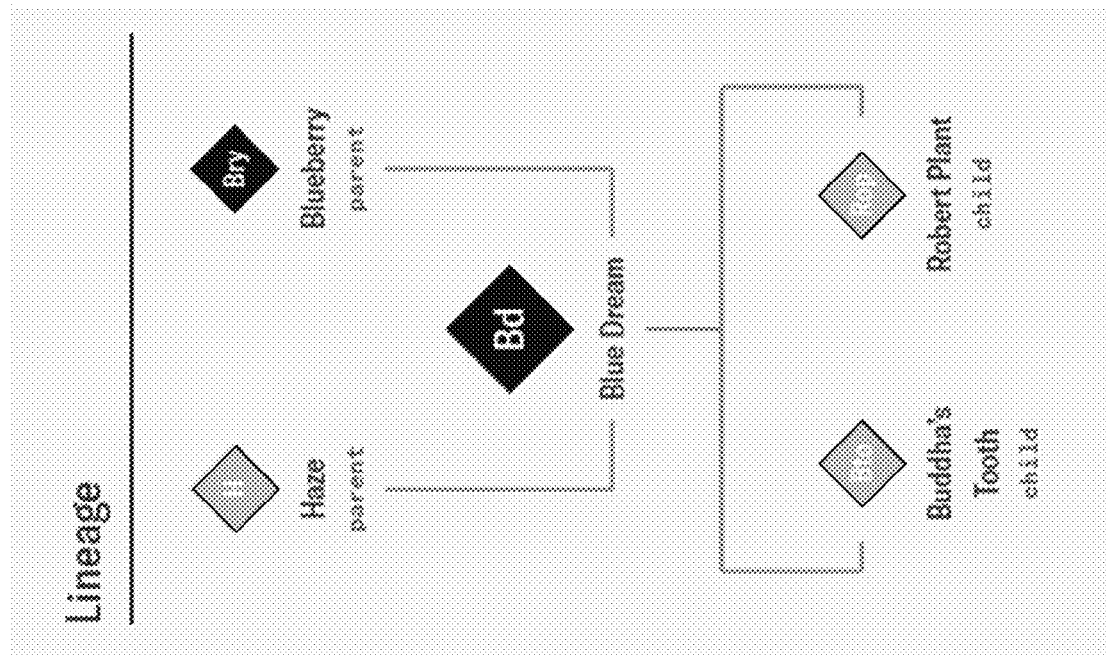
FIG. 44 is a screenshot of a user interface showing the lineage of the Blue Dream strain.

FIG. 44 is a screenshot of a user interface showing the lineage for the Blue Dream strain. Recommendation systems can take into account whether related strains should be recommended because close lineage members often share similar characteristics. Weighting of closely related strains can be more than weighting of non-related strains. For example, if a user likes a strain, the recommendation system can recommend related strains based, at least in part, on lineage information, strain characteristics, etc.

FIGS. 45A-45C are screenshots of representative user interface for user-defined strain generators in accordance with another embodiment of the disclosed technology. Referring to FIG. 45A, the Blue Dream visual representation 820 can be a reference strain or initial strain. Selectors 922, 924 can be moved to adjust cannabinoid levels. Upon adjustment, the recommendation system can determine recommended strains based on the user-inputted setting. FIG. 45B shows the THC and CBD levels set to zero. In some embodiments, a refresh button 930 can be used to update the visual representation with a match (or closest match) based on the user-inputted setting. An add terpene button 934 can be used to add terpenes. FIG. 45C shows terpenes that could be selected.

FIG. 46A is a screenshot of a user interface for searching and sorting strains in accordance with another embodiment of the disclosed technology. A drop-down selector can be used to select sorting arrangements. FIG. 46B is a screenshot of a user interface for filtering search results in accordance with an embodiment of the disclosed technology.

Figure 47:
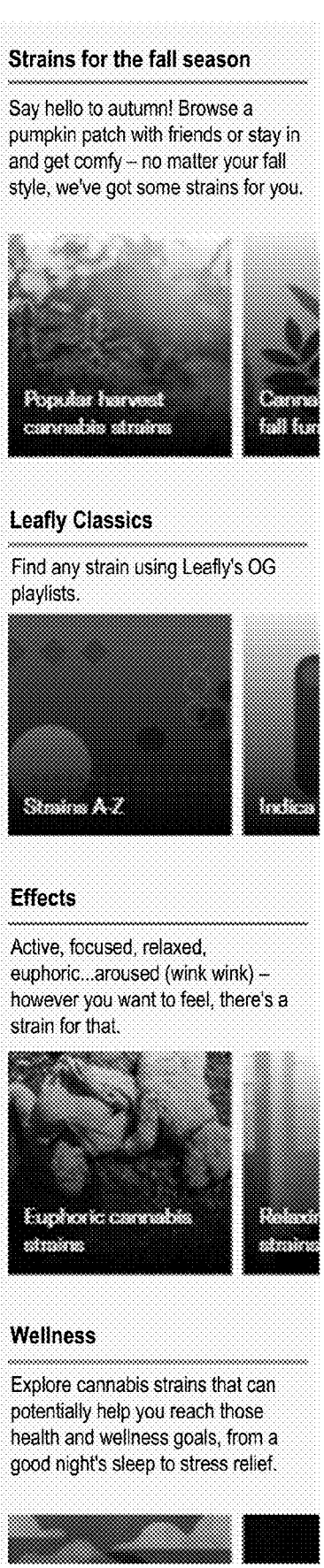
FIG. 47 shows product information associated with strains.

FIG. 47 shows product information associated with strains. Product information can include information about specific strains, classes of strains, effects, therapeutic effects, or other information.

The strain generators and interfaces can be used to select existing strains or define non-existing strains. In some embodiments, the user-inputted values may not correspond to a known strain. The strain generator can identify these user-defined strains as new or future strains ("new strains"), which can be used to develop new strains. For example, user-defined strain data for new strains and/or user search parameters can be collected to generate a demand database used by producers to breed and grow the new strains with user-desired characteristics. In some embodiments, the system can automatically categorize groups of new user-defined strains to identify classes or types of desired strains not currently available. Growers can develop new strains to meet user demand. In some embodiments, the system can evaluate whether a known strain of cannabis corresponds to the user-defined strain of cannabis. If the strain generator fails to identify a known strain of cannabis corresponding to the user-input (or within a close enough range based on user set criteria), the user-defined strain of cannabis can be identified as an unknown or future/new strain. If the strain generator identifies a known strain, the known strain (or strains) will be displayed. The output of the strain generator can be evaluated to determine buying trends, user preferences, or the like.

Figure 48:
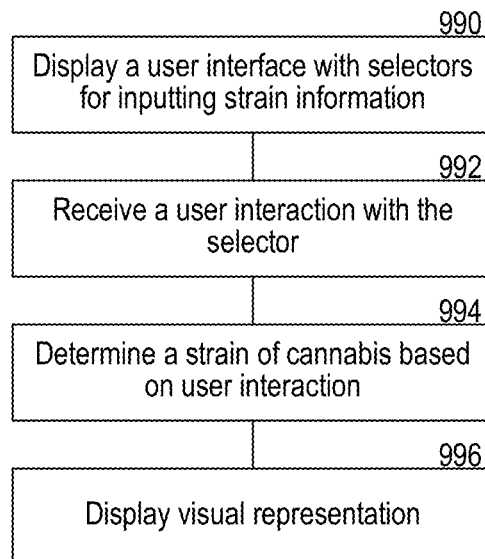
FIG. 48 is a flow chart illustrating a computer-implemented method for generating user-defined cannabis strains.

FIG. 48 is a flow chart illustrating a computer-implemented method for generating user-defined cannabis strains using the strain generator discussed in connection with FIGS. 31A-40 and 45A-45B. At block 990, a user interface that includes selectors for inputting strain information is displayed to a user. In some embodiments, the user interface can include a portion with the selectors for setting a cannabinoid profile, a portion for setting a terpene profile, and a portion for displaying the visual representation of the determined strain of cannabis. In some embodiments, the selectors can be usable to modify the strain information for dynamically changing the determined strain of cannabis and corresponding displayed visual representation. The selectors can include sliders, each movable to define a user-desired characteristic of the user-defined strain profile. Each slider can be movable to define a user-desired cannabinoid level. In some embodiments, the selectors can include a cannabinoid selector for selecting a cannabinoid. In some embodiments the selectors can include a terpene selector for selecting a terpene. In some embodiments the selectors can include a ring selector for selecting a terpene ring. There may be one, two, three, or more cannabinoid selectors for one, two, three, or more cannabinoids. The selectors can be usable to select for the cannabis strain profile one or more cannabinoids, cannabinoid levels, and/or terpenes. The cannabinoid selector can be slide movable between two positions, where each position corresponds to an amount of each cannabinoid. The strain information can define a user-defined strain profile.

At block 992, the strain generator receives the user interaction with the selector(s). The user interaction can include moving sliders, receiving values, or other input from the user.

At block 994, in response to the user interaction(s) with at least one of the selectors, a strain of cannabis based, at least in part, on the inputted strain information is determined. The strain of cannabis can be selected from a database, lookup table, or the like. In other embodiments, the strain of cannabis can be calculated based on the inputted strain information.

At block 996, output (e.g., visual representations, strain data, etc.) of the determined strain of cannabis is displayed. The output can be dynamically modified (e.g., in real time or at a selected times) based on the changes to the selectors. Visual representations can be shaped and color-encoded to provide cannabinoid and terpene level information, such as those discussed in connection with FIGS. 31C, 32C, 33C, 34C, 35C, 36C, 37C, 38C, 39-40, and 43-45B. The visual representation can be a color-coded identifier flower, such as those discussed in connection with FIGS. 10-17. In some embodiments, the name for the determined strain of cannabis (or list of strains) can be displayed. The inputted strain information can be combined to determine the strain(s) of cannabis. The strain generator can apply one or more criteria to the inputted strain information to determine a set of known strains of cannabis. The set can include the strain of cannabis for which the visual representation is displayed. In some embodiments, the user interface can include other input options for the user to select the criteria.

Figure 49:
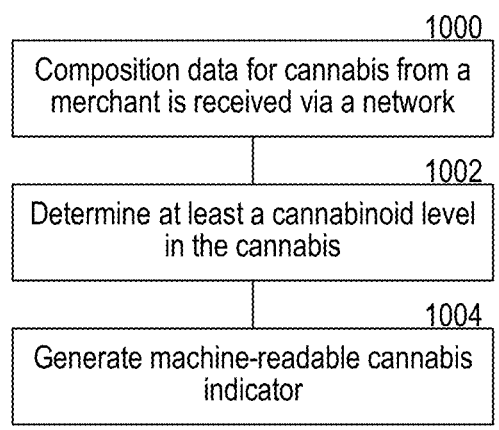
FIG. 49 is a flow chart illustrating a computer-implemented method for labelling cannabis.

FIG. 49 is a flow chart illustrating a computer-implemented method for labelling products suitable for the systems disclosed herein (e.g., system 400 of FIG. 6). At block 1000, composition data for cannabis from a merchant is received via a network. At block 1002, received composition data is used to determine at least a cannabinoid level in the cannabis, a plurality of terpenes in the cannabis, or the like. At block 1004, a machine-readable cannabis strain indicator can be generated based, at least in part, on the analysis of the composition data. The machine-readable cannabis strain indicator is configured to be applied to packaging for the cannabis and includes a nucleus with a shape encoding information regarding the determined cannabinoid level in the cannabis. The terpene rings surround the nucleus. Each terpene ring has a color encoding a corresponding terpene and a configuration encoding information regarding an amount of the corresponding terpene in the cannabis.

Having introduced aspects of the recommendation system for making recommendations, selections, and purchasing of regulated products, and systems for generating visual representations, some additional features and aspects are now introduced.

Advantageously, the recommendation system disclosed herein provides for recommendations that correlate well with user preferences. That is, for example, by implementation of a public system, a large set of user data and product data is attainable. This large data set, in combination with sophisticated algorithms such as a neural network, provides for recommendations with a degree of sophistication that is not attainable by a salesperson, medical practitioner, or other such individual. Further, such recommendations may be made with complete privacy, at any time of day. By employing the recommendation system with a regulation database, regulatory compliance may be assured, thus removing the responsibility for compliance assurance from sales staff, thus enhancing sales.

The recommendation system may be provided as a set of machine executable instructions on non-transitory machine-readable media. Generally, each user device is configured to store machine executable instructions on non-transitory machine-readable media (such as in read-only memory (ROM), random-access-memory (RAM), or in a non-volatile storage unit such as a hard disk, solid state drive, or the equivalent). The machine executable instructions may be referred to herein as "software," as an "application," as a "client," a "process," a "plug-in," an "add-in," an "add-on," an "extension," and by other similar terms. The machine executable instructions generally provide for functionality through operation of various methods as may be presented herein as well as others that may be apparent to those skilled in the art.

Some of the machine executable instructions stored on non-transitory machine readable media may include an operating environment also referred to as an operating system. For example, and as presented herein, a suitable operating environment is WINDOWS (available from Microsoft Corporation of Redmond, Washington). Other operating environments include iOS from Apple of Cupertino, California and ANDROID available from Alphabet of Mountain View, California Software as provided herein may be developed in, for example, SQL language, which is a cross-vendor query language for managing relational databases. Aspects of the software may be implemented with other software. For example, user interfaces may be provided in XML, HTML, a variety of scripting languages and the like.

More specifically, given the highly configurable nature of computing systems, the terms "computer" and "user device" as well as other similar terms are to be construed to include any configuration of components and/or software as needed to provide for the intended functions as well as extensions thereof. The architecture of the recommendation system may be modified as deemed appropriate for implementation.

The recommendation system may be implemented over a network, such as the Internet, and the network may be a wired and/or a wireless network. The network, if wireless, may be implemented using communication techniques such as Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Radio waves, and/or other communication techniques known in the art.

The biometric device may be a commercially available device, such as a FITBIT personal electronic device, an APPLE WATCH personal electronic device, or any other similar type of device. The biometric device may be a specialized device configured for operation with the recommendation system. The biometric device may include additional functionality. For example, the biometric device may provide user alerts, a screen or other user interface to facilitate user interaction with the recommendation system or other such functionality. The biometric device may have one or more processors. Processors suitable for the execution of a computer program or instructions may include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

The recommendation system may implement self-training algorithms such as artificial intelligence. For example, the recommendation system may implement a neural network. The neural network may accept, for example, personal data to correlate observed physiological effects of products with the physiology of the user. The correlation may be for the individual user, a segment of the user population, or the user population as a whole.

Supplier data, which may be useful for formulating recommendations, may include, without limitation, density, chemical composition, such as from laboratory analyses of regulated products, vintage, source, certification by an appropriate standard, a set of user experience feedback, reviews, and any other data deemed appropriate. The supplier data may be input through a standardized interface for communication between suppliers and merchants.

The recommendation system may implement user security, privileges, certificates, and other techniques to ensure integrity of the process and authenticity of the regulated products delivered to the user. The recommendation system may be operated with regard for privacy laws, such as HIPAA (i.e., the "Health Insurance Portability and Accountability Act") which sets forth requirements for control of medically sensitive information.

The recommendation system may include advertising. The recommendation system may be used to sell other items such as related paraphernalia. The recommendation system may be configured for facilitating routine or automatic ordering, as discussed in connection with FIG. 40, for example.

Various other components may be included and called upon for providing for aspects of the teachings herein. For example, additional materials, combinations of materials, and/or omission of materials may be used to provide for added embodiments that are within the scope of the teachings herein.

The foregoing detailed description has set forth various embodiments of the systems, devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Any readers of any patent issued on this application should note that Applicants do not intend any of the appended claims or claim elements to invoke means-plus-function terminology as related to 35 U.S.C. § 112(f) unless the words "means for" or "step for" are explicitly used in the particular claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. U.S. patent application Ser. No. 16/228,197 filed Dec. 20, 2018 and PCT Application No. PCT/US2019/067683 are incorporated by reference in their entireties. The methods, systems, and features disclosed in U.S. patent application Ser. No. 16/228,197 can be used with the methods, systems, and features of embodiments disclosed herein. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method, comprising:
    displaying a graphic user interface that includes one or more selectors for receiving user-desired characteristics representative of a desired cannabis product, wherein
        each of the one or more selectors is associated with incremental adjustments to shapes and/or colors of one or more corresponding visual indicators; and
    in response to an interaction with at least one of the one or more selectors:
        generating in real-time a visual representation of the desired cannabis product, the visual representation having the one or more visual indicators corresponding to the one or more selectors for displaying on a device, the displayed visual representation including:
            a center portion having a shape representative of a primary cannabinoid associated with at least one setting of the one or more selectors, and
            a surrounding portion having two or more polygonal or oval shapes associated with the at least one setting of the one or more selectors, the set of shapes representing additional details of the primary cannabinoid and/or one or more secondary traits of the desired cannabis product, wherein
            generating the visual representation includes dynamically updating one or more visual characteristics of the center portion and/or the surrounding portion based on settings of the one or more selectors and according to one or more thresholds and/or one or more conversion mechanisms configured to determine adjustments to the one or more visual characteristics according to the settings of the one or more selectors, wherein the displayed visual representation is dynamically updated to communicate to the user visual patterns that identify the desired cannabis product.

2. The computer-implemented method of claim 1, wherein the one or more selectors are usable to dynamically update the displayed visual representation in response to changes in the settings of the one or more selectors, wherein:
the center portion comprises a nucleus visually representing the primary cannabinoid of the desired cannabis product, and
the surrounding portion comprises one or more terpene rings concentrically surrounding the nucleus, wherein each terpene ring includes (1) a color and/or a shape indicative of a distinct terpene and (2) a visual configuration indicating an amount of the distinct terpene.

3. The computer-implemented method of claim 1, wherein the one or more selectors are usable in real-time to dynamically determining at least one product from a set of known cannabis products based, at least in part, on the received user-desired characteristics, wherein the determined product is a closest match among the set of known cannabis products to the desired cannabis product according to the one or more thresholds and/or the one or more conversion mechanisms.

4. The computer-implemented method of claim 1, wherein the visual representation is shaped and color-encoded across one or more sequences or ranges to indicate varying degrees or amounts of included cannabinoid and terpene level.

5. The computer-implemented method of claim 1, further comprising displaying a visual representation of the determined cannabis product, the visual representation including (1) a center portion representative of a primary cannabinoid of the determined cannabis product and (2) a surrounding portion representing additional details of the primary cannabinoid and/or one or more secondary traits of the determined cannabis product, wherein the visual representation of the determined cannabis product is shaped and color-encoded across the one or more sequences or ranges to indicate the varying degrees or amounts of included cannabinoid and terpene level.

6. The computer-implemented method of claim 1, further comprising displaying a name for the determined cannabis product.

7. The computer-implemented method of claim 1, further comprising:
evaluating whether a known strain of cannabis corresponds to the desired cannabis product; and
if the evaluation fails to identify a known strain of cannabis, identifying the desired cannabis product as a new strain of cannabis.

8. The computer-implemented method of claim 1, wherein the one or more selectors include:
one or more cannabinoid selectors for selecting an amount of a corresponding cannabinoid; and
one or more terpene selectors for selecting a corresponding terpene and/or an amount thereof.

9. The computer-implemented method of claim 1, wherein the one or more selectors include at least one of:
a first selector for selecting a psychoactive effect,
a second selector for selecting a physiological effect,
a third selector for selecting an aroma characteristic,
a fourth selector for selecting a flavor characteristic,
a fifth selector for selecting a user-defined characteristic, or
a combination thereof.

10. The computer-implemented method of claim 1, wherein the visual representation is a color-coded identifier flower including:
the center portion including a shape indicating the primary cannabinoid in the product information, wherein the shape is determined by graphically adjusting or combining a curved edge and a corner according to a relative concentration of the primary cannabinoid or one or more components thereof, and
the surrounding portion comprising a plurality of terpene rings surrounding the center portion and symmetric around at least one reflective axis, wherein each terpene ring has a visual trait selected to indicate a distinct terpene in the product information and a configuration selected to indicate an amount of the distinct terpene in the product information.

11. The computer-implemented method of claim 10, wherein the one or more selectors include terpene selectors displayed on the graphic user interface for selecting terpenes.

12. The computer-implemented method of claim 1, wherein the one or more selectors are usable to select for the cannabis product at least one of:
one or more cannabinoids;
cannabinoid levels; or
terpenes.

13. The computer-implemented method of claim 1, wherein the graphic user interface includes:
a first portion with the one or more selectors for setting a cannabinoid profile;
a second portion for setting a terpene profile; and
a third portion for displaying the visual representation of the determined cannabis product.

14. The computer-implemented method of claim 1, further comprising combining the inputted product information to determine the cannabis product.

15. The computer-implemented method of claim 1, wherein:
at least one of the one or more selectors is slidable between a first position and a second position that correspond to respective first and second amounts of a cannabinoid, and
dynamically adjusting the first and second amounts based on an experience level previously provided by the user.

16. A non-transitory computer-readable medium storing computer-executable instructions that, when executed by one or more processors, cause the one or more processors to perform operations, the operations comprising:
displaying, to a user, a graphic user interface that includes selectors for inputting user-desired characteristics representative of a desired cannabis product, wherein each of the selectors is associated with incremental adjustments to shapes and/or colors of a set of visual indicators; and
in response to a user interacting with at least one of the selectors,
generating in real-time a visual representation of the desired cannabis product having the one or more visual indicators corresponding to the one or more selectors for displaying on a device, the displayed visual representation including
a center portion representing a primary cannabinoid, and a surrounding portion around the center portion and having two or more polygonal or oval shapes associated with the at least one setting of the one or more selectors, the set of shapes representing additional details of the primary cannabinoid and/or one or more secondary trait of the desired cannabis product, wherein generating the visual representation includes dynamically updating one or more visual characteristics of the center portion and/or the surrounding portion based on settings of the selectors and one or more thresholds and/or one or more conversion mechanisms configured to determine adjustments to the one or more visual characteristics according to the settings of the one or more selectors, wherein the displayed visual representation is dynamically updated to communicate to the user visual patterns that identify details of one or more cannabis products according to predetermined patterns.

17. The non-transitory computer-readable medium of claim 16, wherein the instructions further cause the one or more processors to dynamically determine at least one product from a set of known cannabis products based, at least in part, on the received user-desired characteristics, wherein the determined product is a closest match among the set of known cannabis products to the desired cannabis product according to the one or more thresholds and/or the one or more conversion mechanisms.

18. The non-transitory computer-readable medium of claim 16, wherein the visual representation is a color-coded identifier flower including:

the surrounding portion comprising one or more terpene rings that each have (1) a color and/or a shape selected to indicate a distinct terpene and (2) a configuration selected to indicate an amount of the distinct terpene.

\* \* \* \* \*